(12) United States Patent
Ballard et al.

(10) Patent No.: US 6,398,166 B1
(45) Date of Patent: Jun. 4, 2002

(54) METHOD OF CONTROLLING ACCELERATION OF A SPACECRAFT REENTERING THE ATMOSPHERE TO ACCOMMODATE ADVENTURE TRAVELERS

(75) Inventors: Robert H. Ballard, Fairfax, VA (US); Maxwell W. Hunter, II, San Carlos, CA (US); Richard N. Jurmain, Eau Claire, WI (US); Charles P. Kelley, Vienna, VA (US)

(73) Assignee: Vela Technology Development, Inc., Vienna, VA (US)

( * ) Notice: Subject to any disclaimer, the term of this patent is extended or adjusted under 35 U.S.C. 154(b) by 0 days.

(21) Appl. No.: 09/509,141

(22) PCT Filed: Oct. 15, 1998

(86) PCT No.: PCT/US98/21844

§ 371 (c)(1),
(2), (4) Date: Mar. 20, 2000

(87) PCT Pub. No.: WO99/19211

PCT Pub. Date: Apr. 22, 1999

Related U.S. Application Data

(60) Provisional application No. 60/062,478, filed on Oct. 16, 1997, and provisional application No. 60/062,481, filed on Oct. 16, 1997.

(51) Int. Cl.[7] .............................................. B64G 1/14
(52) U.S. Cl. ........................................ 244/160; 244/162
(58) Field of Search .............................. 244/1 R, 158 R, 244/172, 2

(56) References Cited

U.S. PATENT DOCUMENTS

| | | | |
|---|---|---|---|
| 4,265,416 A | 5/1981 | Jackson et al. | 244/2 |
| 4,884,770 A | 12/1989 | Martin | 244/158 |
| 5,255,873 A | 10/1993 | Nelson | 244/63 |
| 5,322,248 A | 6/1994 | Ragab | 244/160 |
| 5,568,901 A | 10/1996 | Stiennon | 244/63 |

OTHER PUBLICATIONS

"The Threshold of Space," *Frontiers of Flight*, pp. 193–206, 1992.
Wilson, Andrew, "5: Man In Space," *The Eagle Has Wings: The Story of American Space Exploration* 1945–1975, pp. 41–47, 1982.
"Vehicle Designs," www.spacefuture.com/vehicles/designs/shtml, May 1, 2001.
Iannotta, Ben, "Ride the fireball," www.newscientist.com/ns/19990731/ridethefir.html. Jul. 31, 1999.
Hill, James V H, "Getting to Low Earth Orbit," www.spacefuture.com/archive/getting_to_low_earth_orbit.shtml, Apr. 1999.
Wichman, Harvey A., "Designing User–Friendly Civilian Spacecraft," www.spacefuture.com/archive/designing_user_friendly_civilian_spacecraft.shtml, Dec. 1995.
"Funtech Systems," www.xprize.org/~Xprize/teams/aurora/index.shtml, May 1, 2001.
"Flight Expolration," www.xprize.org/~Xprize/teams/dorrington/index.shtml. May 1, 2001.
"Canadian Arrow," www.xprize.org/~Xprize/teams/canadianarrow/index.shtml, May 1, 2001.
"X Prize Competition Guidelines," www.xprize.org/~Xprize/teams/rules.shtml, May 1, 2001.
Jackson, James O., "Destination: Outer Space," www.time.com/time/europe/magazine/2000/1030/travel/moon.html, Oct. 30, 2000.
"Ascender," www.bristolspaceplanes.com/projects/ascender.shtml, May 1, 2001.
Collins, Patrick, "The Prospects for Passenger Space Travel," www.spacefuture.com/archive/the_prospects_for_passenger_space_travel.shtml, Feb. 2001.

*Primary Examiner*—Galen L. Barefoot
(74) *Attorney, Agent, or Firm*—Michael S. Sherrill

(57) ABSTRACT

A method for controlling the acceleration of a vehicle (10) reentering the sensible atmosphere, comprising executing a lofting translational rocket burn at an altitude of greater than about 40 km whereby the vehicle (10) reenters the sensible atmosphere at a maximum accelerative force of less than 4 g.

13 Claims, 11 Drawing Sheets

SKYDIVER TRAJECTORY

METHOD OF CONTROLLING ACCELERATION OF A SPACECRAFT REENTERING THE ATMOSPHERE TO ACCOMMODATE ADVENTURE TRAVELERS

This application is a 371 of PCT/US98/21844 filed Oct. 15, 1998 and claims benefit of Provisional applications 60/062,478 and 60/062,481, both filed Oct. 16, 1997.

FIELD OF THE INVENTION

This invention relates to the trajectory of a spacecraft reentering the atmosphere.

BACKGROUND OF THE INVENTION

Controlling acceleration of a spacecraft reentering the atmosphere is not, in itself, a new concept. The usual reasons for controlling acceleration during reentry are to: (1) reduce g-loads on the payloads or humans in the vehicle, or (2) reduce the aeroheating (heating due to compression and friction from the air) experienced by the spacecraft. Historically, from Mercury through Shuttle, the only methods employed to control acceleration have been: (a) using rotations to control the vehicle's angle of attack, or (b) using rotations to control the vehicle's lift-to-drag ratio. The term "rotations" refers to controlling the direction in which the vehicle is facing, commonly called pitch yaw and roll, using relatively small rocket thrusters (attitude control system), shifting center of gravity, wing ailerons, body flaps, or combinations of these. The term "relatively small" means large enough to rotate the vehicle, but too small to provide significant translational movement (i.e., also referenced as longitudinal movement). Some small translational acceleration usually accompanies rotations, but it is usually orders of magnitude smaller than the vehicle's translational speed. The only translational rocket burns they have employed have been: (i) retro-rocket de-orbit burns. executed in space (above 100 km altitude), well above the atmosphere, to change their path to intersect the atmosphere, or (ii) landing deceleration, executed just above the ground, such as performed by the Apollo Lunar Lander, Mars Rover, or DC-X.

A need exists for trajectories capable of providing reentry of a spacecraft into the atmosphere under conditions designed to accommodate the special needs and/or interests of adventure travelers.

BRIEF DESCRIPTION OF THE DRAWINGS

FIG. 7b is a graphical depiction of the calculated thermal profile for the lofting trajectory shown in FIG. 7a.

FIG. 8b is a graphical depiction of the calculated thermal profile for the comparative trajectory shown in FIG. 8a.

SUMMARY OF THE INVENTION

Figure 1:
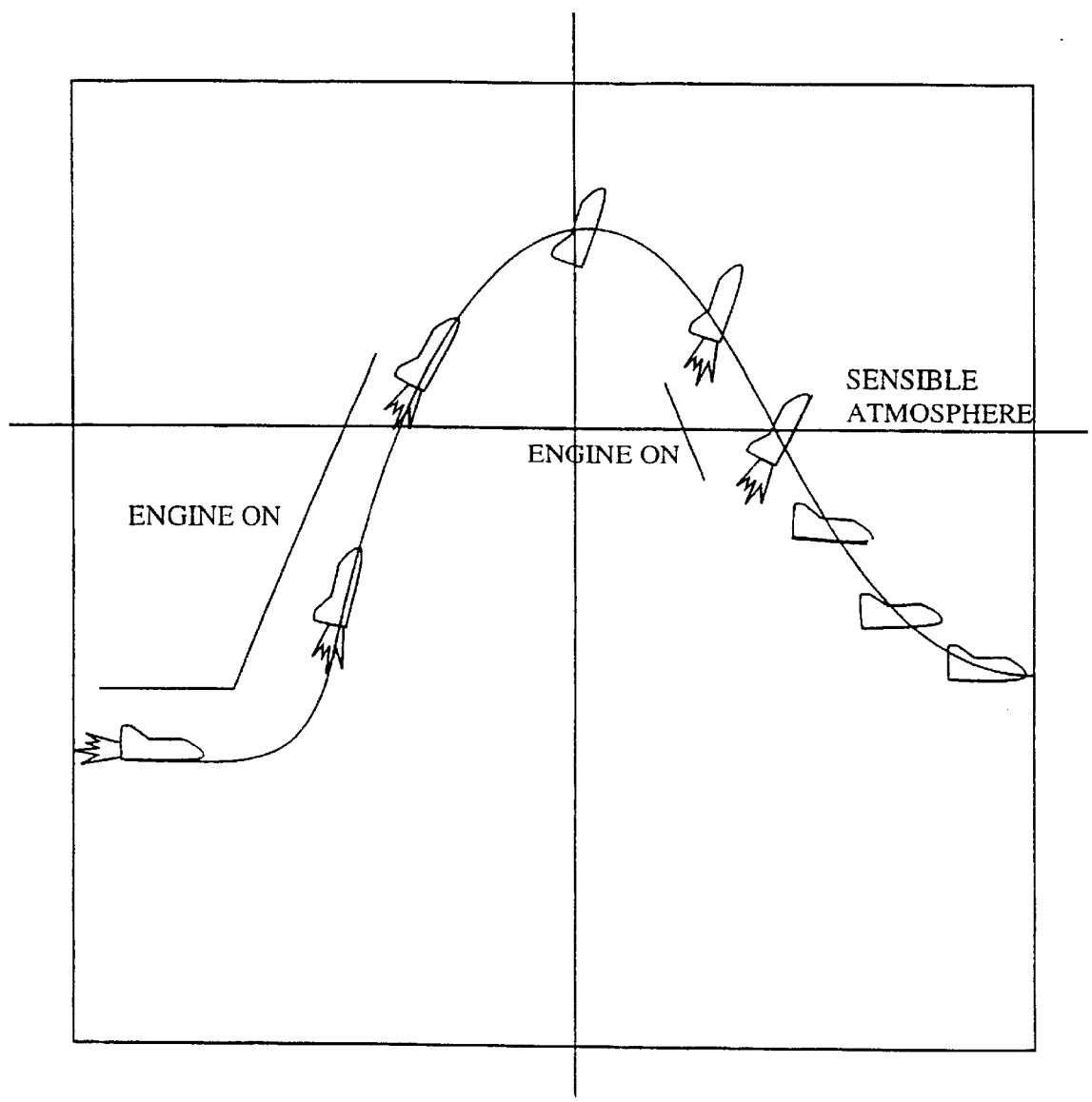
FIG. 1 is a graphical depiction of a first trajectory, referenced herein as a lofting trajectory.

A first trajectory, referenced herein as a lofting trajectory, provides for controlled deceleration of a vehicle reentering the sensible atmosphere by executing a lofting translational rocket burn at an altitude of greater than about 40 km whereby the vehicle reenters the sensible atmosphere at a maximum accelerative force of less than 4 g.

A second trajectory, referenced herein as a power dive trajectory, provides for controlled deceleration of a vehicle reentering the sensible atmosphere by executing a power dive rocket burn after entry of the vehicle into the sensible atmosphere, whereby the vehicle reenters the sensible atmosphere at a maximum accelerative force of less than 4 g.

The lofting translational rocket burn of the first trajectory and the power dive rocket burn of the second trajectory can be used sequentially to provide for controlled deceleration of a vehicle as the vehicle reenters the sensible atmosphere.

A third trajectory, referenced herein as a speed augmented challenge trajectory, provides adventure travelers an opportunity to experience an extreme challenge by initiating a downward translational rocket burn after achieving apogee and prior to reentering the sensible atmosphere, so as to increase the maximum decelerative drag force imposed upon the vehicle during reentry.

A fourth trajectory, referenced herein as a deceleration augmented challenge trajectory, provides adventure travelers an opportunity to experience an extreme challenge by executing an upward translational rocket burn after reentering the sensible atmosphere so as to augment the decelerative drag force imposed upon the vehicle during reentry.

A fifth trajectory, referenced herein as a skydiver trajectory, facilitates extreme altitude skydiving from a vehicle traveling proximate the edge of the sensible atmosphere, comprising executing a translational rocket burn through apogee wherein the thrust of the burn is sufficient to substantially counterbalance the downward accelerative force of gravity, and thereby extend the period of minimized dynamic pressure observed at apogee.

DETAILED DESCRIPTION OF THE INVENTION

Definitions

As utilized herein, including the claims, the term "downward" means pointed below the local horizontal plane. Specifically, a downward thrust means a thrust directed so as to accelerate a vehicle in a direction pointed below the local horizontal plane.

As utilized herein, including the claims. the term "upward" means pointed above the local horizontal plane. Specifically, an upward thrust means a thrust directed so as to accelerate a vehicle in a direction pointed above the local horizontal plane.

As utilized herein, including the claims, the term "lofting" means pointed above the local horizontal plane.

As utilized herein, including the claims, the term "power dive" means a descent into the atmosphere wherein the component of thrust of a rocket burn in the direction of descent counteracts atmospheric deceleration.

As utilized herein, including the claims. the term "sensible atmosphere" means that atmosphere having an air density effective for providing sufficient dynamic pressure to enable lift and/or drag to significantly affect a specified trajectory during a specified time interval. Hence, the altitude of the upper limits of the sensible atmosphere is dependent upon several variables including the primary factors of vehicle speed and design (i.e., streamlining of the vehicle). By way of example. for time intervals of several seconds to a few minutes, the sensible atmosphere would be that atmosphere capable of providing lift and/or drag sufficient to increase or decrease total g by more than about 5%.

As utilized herein, including the claims, the term "translational" means motion of a body in a straight line (i.e., movement of an entire body up, down. left, right, forward, backward), as opposed to rotational motion of a body about an axis (i.e., pitch, yaw or roll).

Trajectories

Controlled Deceleration Trajectories

In order to accommodate adventure travelers (i.e., persons of varying physical capabilities and physical limitations having an interest in participating in an exotic and challenging experience), we have developed flight trajectories capable of safely providing passengers with an extended period of weightlessness (e.g., at least 1 minute and preferably at least 2 minutes) while subjecting the passengers to a maximum g force of less than 4 g, preferably less than 2 g, at a relatively reasonable expense.

Lofting Trajectory

As shown in FIG. 1. the lofting trajectory provides for controlled deceleration of a vehicle reentering the sensible atmosphere by executing a lofting translational rocket burn at an altitude of greater than about 40 km, preferably at an altitude of greater than about 50 km. The execution of a lofting translational rocket burn at this altitude counteracts vertical acceleration of the vehicle due to gravity, and can enhance lift (wing lift and/or body lift) by changing the horizontal velocity and increasing the time in the upper atmosphere during which lift can be effective. A vehicle reentering the sensible atmosphere on a lofting trajectory can readily achieve reentry with a maximum accelerative force of less than 4 g, with reentry achievable with a maximum accelerative force of less than 2 g through the use of an amount of additional fuel capable of being reasonably accommodated aboard a modestly sized vehicle (e.g., a vehicle capable of landing on an ordinary commercial runway).

Those skilled in the art of space flight can readily calculate the specific strength, timing, duration and direction of the thrust produced during the lofting translational rocket burn necessary and appropriate for achieving the desired decelerative effect for a given vehicle traveling along a specified flight path.

Without intending to be unduly limited thereby, it is generally desired to initiate and complete the lofting translational rocket burn at an altitude of greater than about 40 km, preferably at an altitude of greater than about 50 km. A lofting translational rocket burn continued after the vehicle reaches about 40 km tends to actually augment certain components of the decelerative drag imposed upon the vehicle by the atmosphere at such altitudes (i.e., the lofting translational rocket burn begins to mimic the effect of a deceleration augmented challenge trajectory).

In a preferred embodiment, the specific direction of the lofting translational rocket burn also serves to increase the downrange velocity of the vehicle and thereby provide a positive increase in the amount of aerodynamic lift.

Power Dive Trajectory

Figure 2:
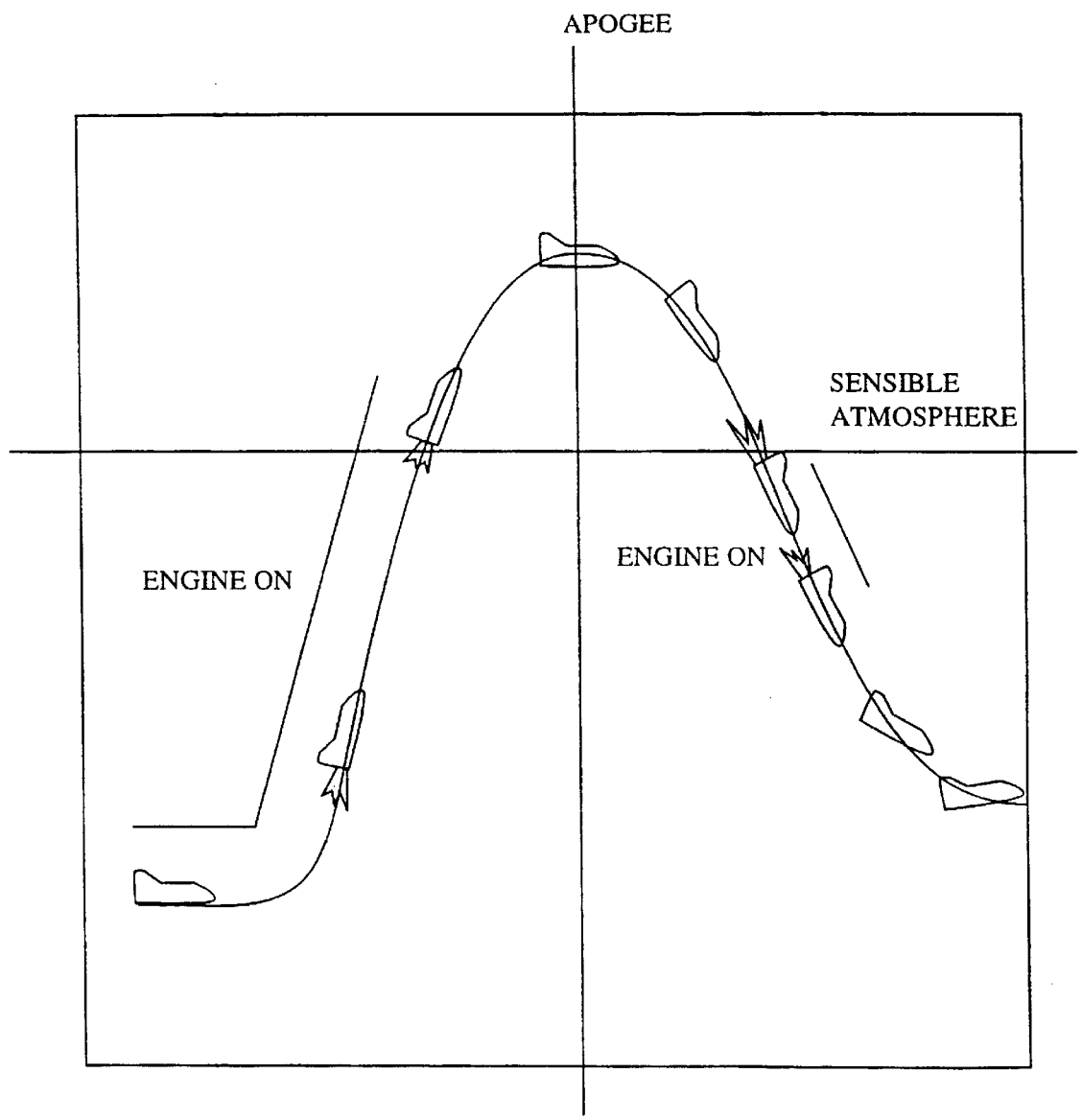
FIG. 2 is a graphical depiction of a second trajectory, referenced herein as a power dive trajectory.

As shown in FIG. 2. the power dive trajectory provides for controlled deceleration of a vehicle upon reentry into the sensible atmosphere by executing a power dive rocket burn after the vehicle has entered the sensible atmosphere. The execution of a power dive rocket burn after entering the sensible atmosphere counteracts deceleration of the vehicle imposed by atmospheric drag. A vehicle reentering the sensible atmosphere on a power dive trajectory can readily achieve reentry with a maximum accelerative force of less than 4 g, with reentry achievable with a maximum accelerative force of less than 2 g through the use of an amount of additional fuel capable of being reasonably accommodated aboard a modestly sized vehicle (e.g., a vehicle capable of landing on an ordinary commercial runway).

Those skilled in the art of space flight can readily calculate the specific strength, timing, duration and direction of the thrust produced during the power dive rocket burn necessary and appropriate e for achieving the desired decelerative effect for a given vehicle traveling along a specified flight path.

Challenge Trajectories

In order to accommodate those adventure travelers desiring an extreme challenge, we have developed flight trajectories capable of safely providing passengers with an extended period of weightlessness (e.g., at least 1 minute and preferably at least 2 minutes) while subjecting the passengers to an elevated g force of greater than 4 g, preferably less than 6 g, upon reentry into the atmosphere at relatively reasonable expense. Such elevated g force can be achieved without significantly compromising the overall safety of the flight.

Speed Augmented Challenge Trajectory

Figure 3:
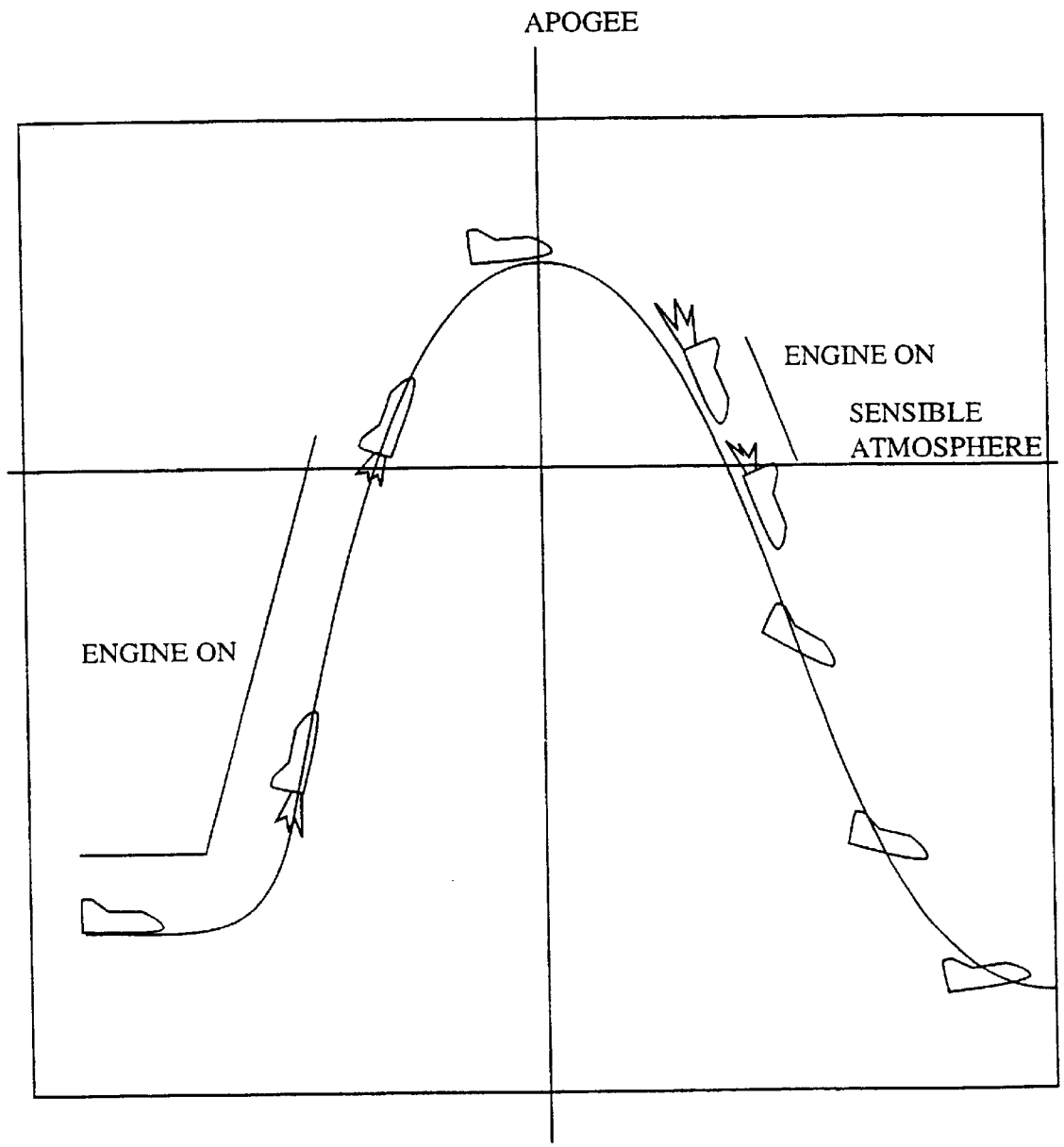
FIG. 3 is a graphical depiction of a third trajectory, referenced herein as a speed augmented challenge trajectory.

As shown in FIG. 3. the speed augmented challenge trajectory provides adventure travelers an opportunity to experience an extreme challenge (i.e., increased g force deceleration) by initiating a downward translational rocket burn after achieving apogee and prior to reentering the sensible atmosphere. The execution of a downward translational rocket burn after achieving apogee and prior to reentering the sensible atmosphere increases the velocity of the vehicle prior to reentry into the atmosphere and thereby increases the maximum decelerative drag force imposed upon the vehicle during reentry. A vehicle reentering the sensible atmosphere on a speed augmented challenge trajectory can readily achieve reentry with a maximum accelerative force of greater than 4 g, with reentry achievable with a maximum accelerative force of greater than 6 g through the use of an amount of additional fuel capable of being reasonably accommodated aboard a modestly sized vehicle (e.g., a vehicle capable of landing on an ordinary commercial runway) and without significantly compromising the safety of the flight.

Those skilled in the art of space flight can readily calculate the specific strength, timing, duration and direction of the thrust produced during the downward translational rocket burn necessary an d appropriate for achieving the desired decelerative effect upon reentry into the atmosphere for a given vehicle traveling along a specified flight path.

Deceleration Augmented Challenge Trajectory

Figure 4:
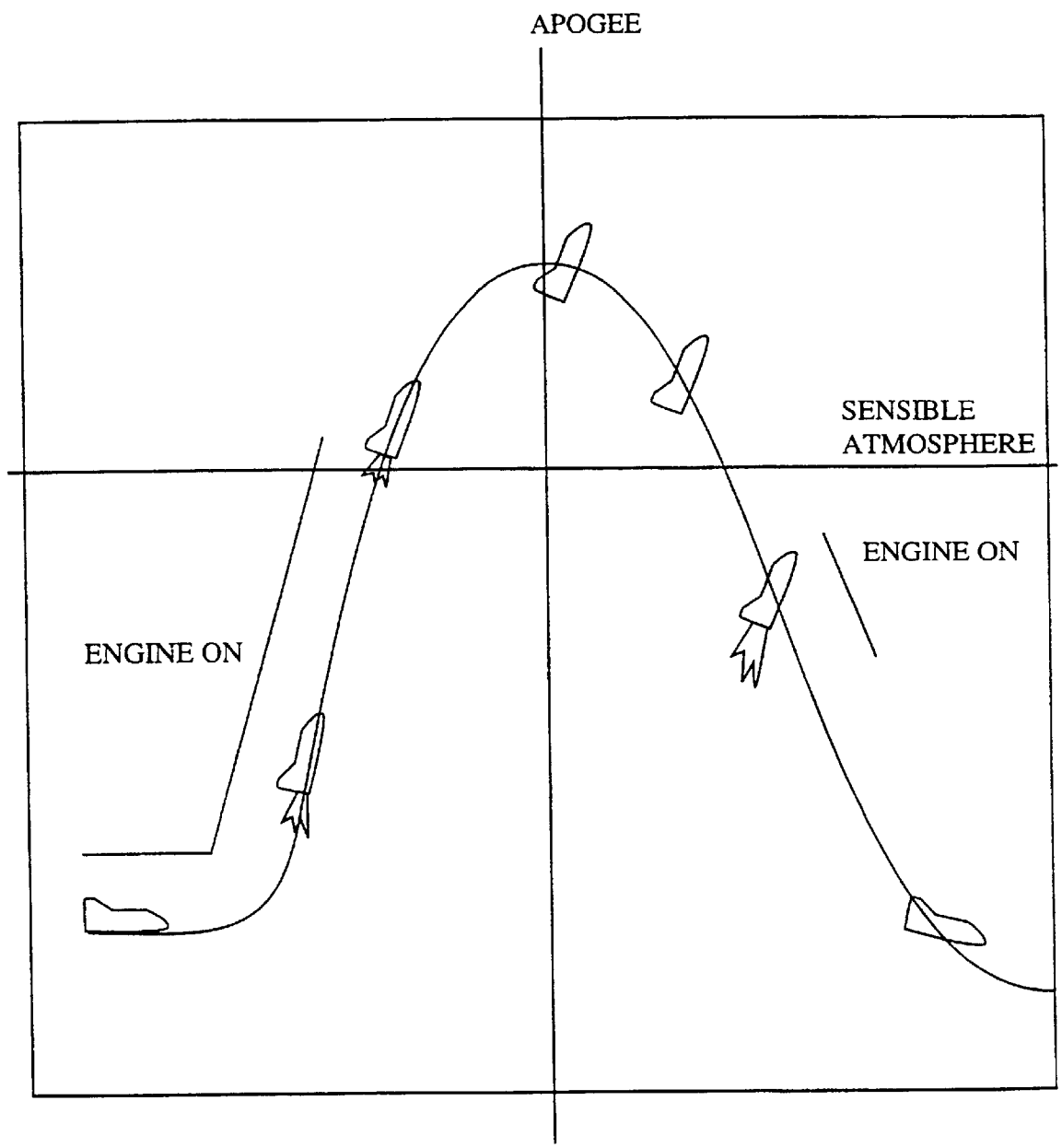
FIG. 4 is a graphical depiction of a fourth trajectory, referenced herein as a deceleration augmented challenge trajectory.

As shown in FIG. 4. the deceleration augmented challenge trajectory provides adventure travelers an opportunity to experience an extreme challenge (i. e., increased g force deceleration) by executing an upward translational rocket burn after reentering the sensible atmosphere so as to augment the decelerative drag force imposed upon the vehicle during reentry. The deceleration augmented challenge trajectory can readily produce a maximum decelerative force of greater than 4 g, with a maximum decelerative force of greater than 6 g readily achievable through the use of an amount of additional fuel capable of being reasonably accommodated aboard a modestly sized vehicle (e.g., a vehicle capable of landing on an ordinary commercial runway) and without significantly compromising the safety of the flight.

Those skilled in the art of space flight can readily calculate the specific strength, timing, duration and direction of the thrust produced during the upward translational rocket burn necessary and appropriate for achieving the desired decelerative effect for a given vehicle traveling along a specified flight path.

Skydiver Trajectory

In order to accommodate persons seeking an extreme skydiving experience. we have developed a flight trajectory capable of safely providing an extended period of minimized dynamic pressure observed at apogee (i.e., about 10 to 30 seconds of nearly zero vertical velocity) during which a skydiver can jump from the vehicle.

Figure 5:
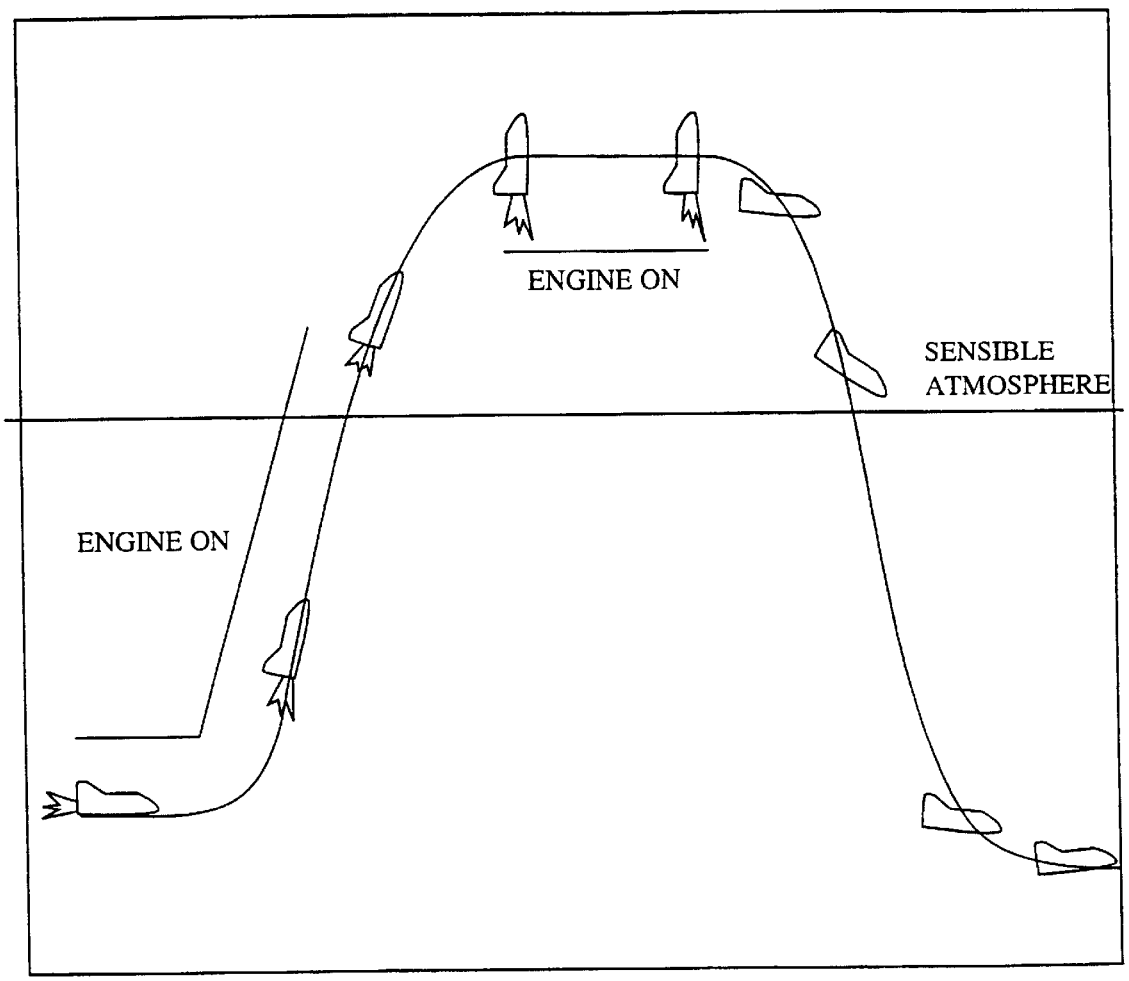
FIG. 5 is a graphical depiction of a fifth trajectory, referenced herein as a skydiver trajectory.

As shown in FIG. 5. the skydiver trajectory facilitates extreme altitude skydiving from a vehicle traveling proximate the edge of the sensible atmosphere by executing an upward translational rocket burn through apogee wherein the thrust of the burn is sufficient to substantially counterbalance the downward accelerative force of gravity, and thereby extend the period of minimized dynamic pressure observed at apogee.

Those skilled in the art of space flight can readily calculate the specific strength, timing, duration and direction of the thrust produced during the upward translational rocket burn necessary and appropriate for counterbalancing the downward accelerative force of gravity and extending the period of minimized dynamic pressure observed at apogee for a given vehicle traveling along a specified flight path.

EXAMPLES

Example 1

Figure 6A:
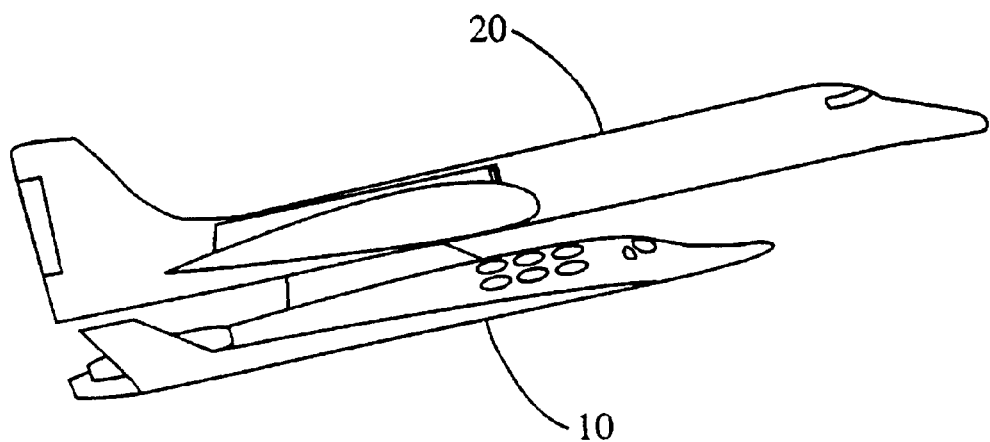
FIG. 6a is a schematic side view of one embodiment of a space vehicle attached beneath a carrier vehicle during lifting of the space vehicle for launch.

The space vehicle (hereinafter "Cruiser") 10 is mated underneath a carrier vehicle (hereinafter "Lifter") 20 equipped to accommodate the Cruiser 10. As shown in FIG. 6a, the Lifter 20, powered by two above-the-wing mounted turbojet engines and augmented by the Cruiser's two air breathing jet engines, takes off at an initial climb angle of 20–25° after a 1,500 to 2,000 foot take-off roll. The Lifter 20 climbs to approximately 40,000 feet in about 30 minutes and then gradually proceeds to the launch window at 50,000 feet.

Figure 6B:
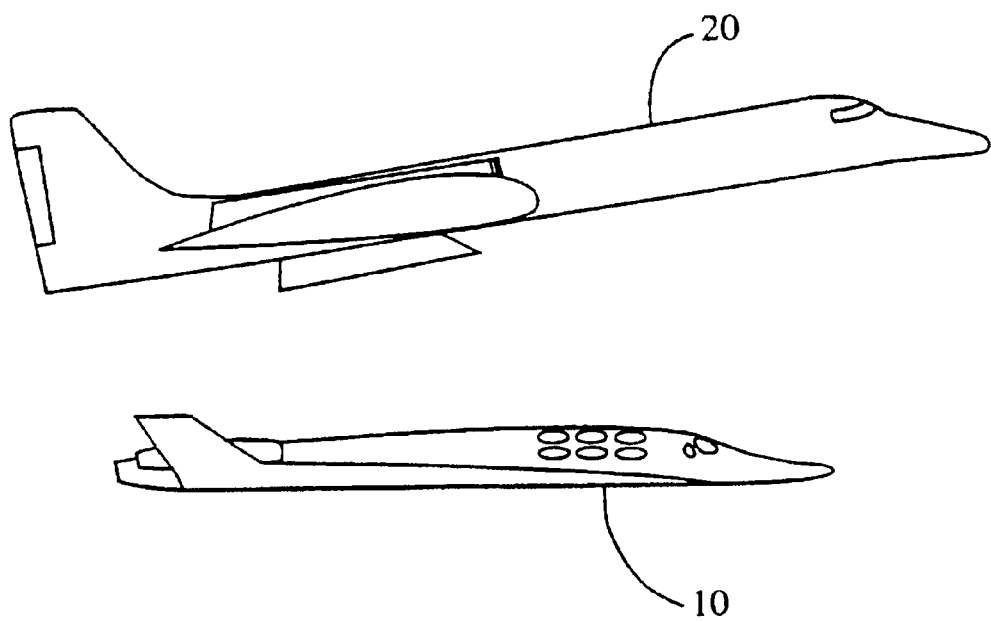
FIG. 6b is a schematic side view of the space vehicle and carrier vehicle shown in FIG. 6a after separation of the space vehicle from the carrier vehicle.

As shown in FIG. 6b the Cruiser 10 is separated from the Lifter 20 and the Cruiser's three rocket motors ignited. Upon confirmation that the rocket motors are operational, the Cruiser's two jet engines are shut down. The three rockets accelerate the Cruiser 10 into a steep 2 g climb at a gamma angle of approximately 57° up to a rocket cut-out altitude of approx. 63 km. The 2 g boost phase lasts approximately 100 sec.

After rocket cut out, passengers begin a free fall phase during which the passengers experience near weightlessness. The free fall phase lasts approximately 2½ minutes.

The Cruiser 10 continues along a ballistic trajectory to an altitude of approximately 100 km. The Cruiser 10 is slowly rotated about the longitudinal axis using maneuvering rockets on the Cruiser 10 to invert the Cruiser 10, nose high, just prior to apogee. The Cruiser's slow rotation about the longitudinal axis continues until the Cruiser 10 is right side up just prior to initiation of the lofting rocket burn.

The desired lofting attitude is achieved with the maneuvering rockets and the main rocket motors ignited to initiate the lofting rocket burn. The lofting rocket burn lasts approximately 30 seconds with a maximum of 2 g exerted upon the Cruiser 10 by the rockets. The main rocket motors are then shut down and the Cruiser 10 allowed to glide back into the thicker atmosphere.

The Cruiser 10 begins to experience some aerodynamic effects at an altitude of approximately 45 to 50 km, resulting in an approximate 2 g decelerative force exerted upon the Cruiser 10 for approximately 60 seconds. The Cruiser 10 recovers to level flight at an altitude of approximately 22 to 25 km, and thereafter decelerates to a target airspeed for final descent and landing.

Figure 7A:
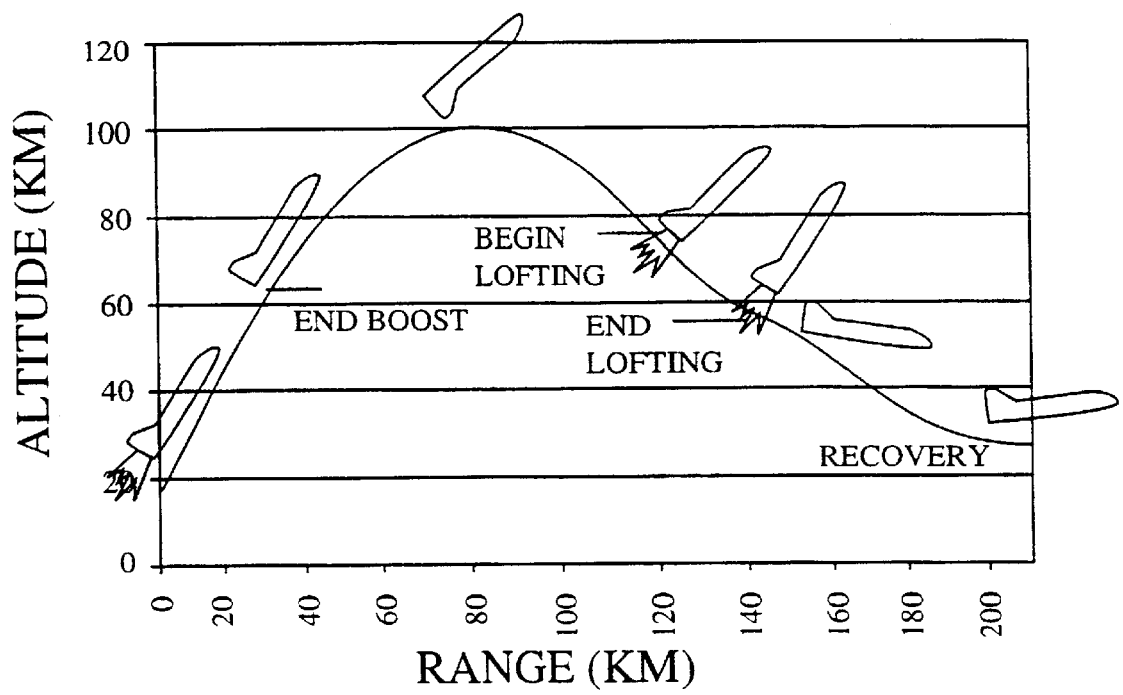
FIG. 7a is a graphical depiction of the altitude vs. range for a specific embodiment of the lofting trajectory.
Figure 7B:
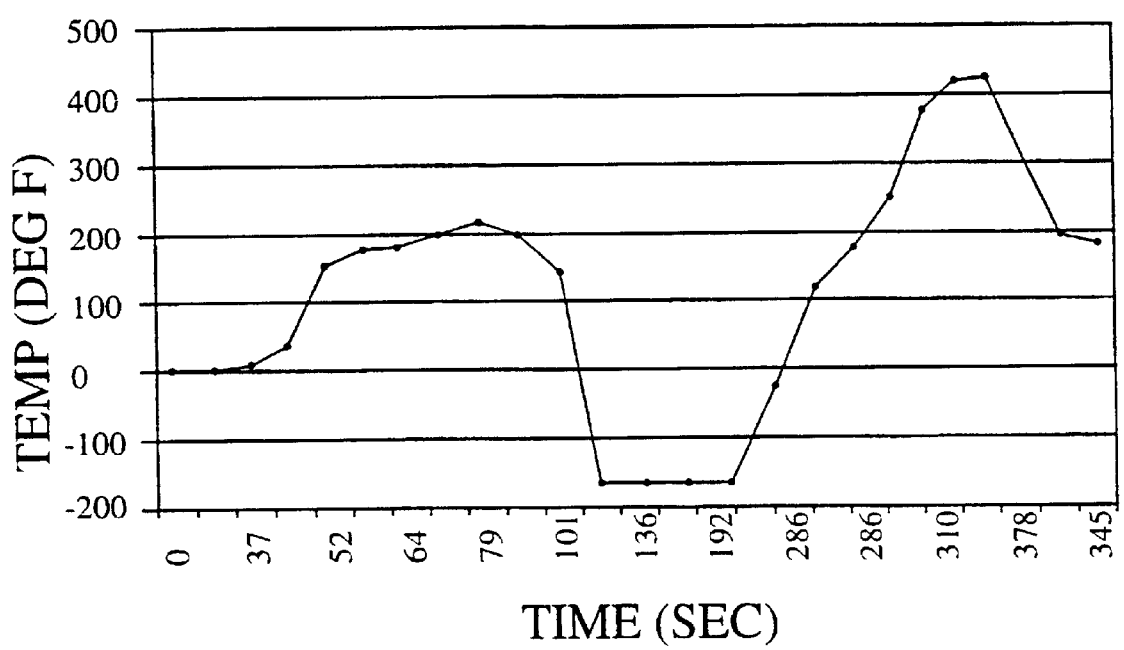
Figure 8A:
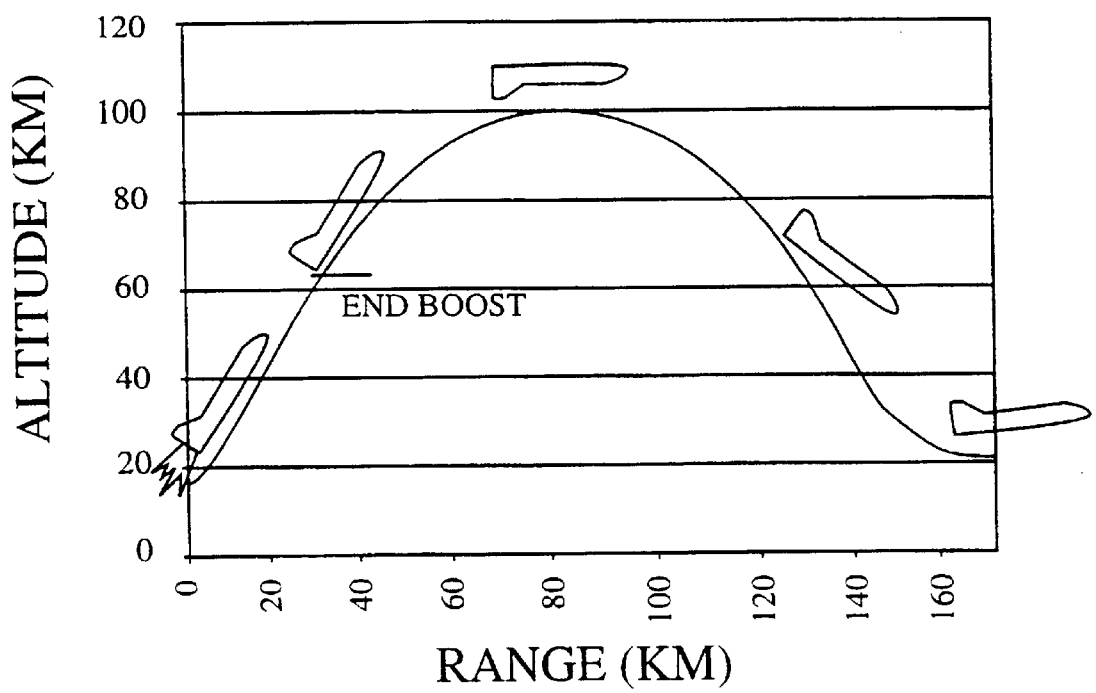
FIG. 8a is a graphical depiction of the altitude vs. range for a comparative trajectory without lofting.
Figure 8B:
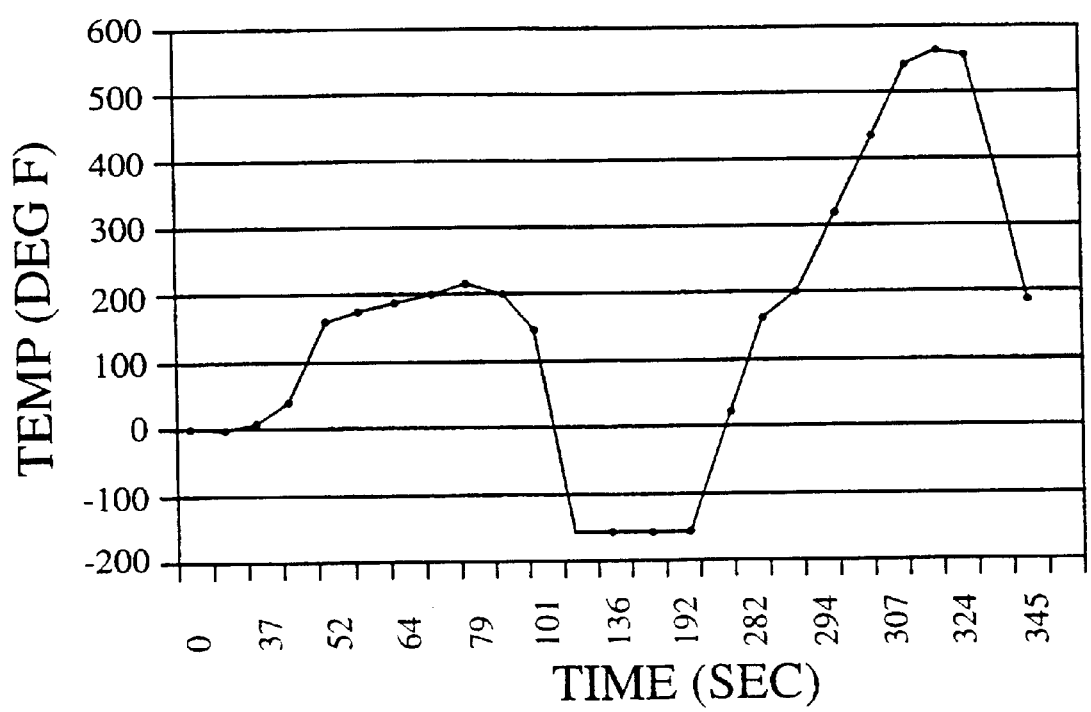

The theoretical flight data for such a flight, under the specific flight parameters specified below in Table 1, are provided in Tables 2a, 2b and 2c. A schematic diagram of the flight trajectory (altitude vs. range) is shown in FIG. 7a, with the calculated thermal profile of the flight graphically depicted in FIG. 7b. Also provided for comparative purposes in Tables 3a, 3b and 3c is the theoretical flight data for an identical flight absent execution of the lofting rocket burn. A schematic diagram of the comparative flight trajectory (altitude vs. range) is shown in FIG. 8a, with the calculated thermal profile of the comparative flight graphically depicted in FIG. 8b. As can be seen from this data, execution of the lofting rocket bum prior to reentry into the sensible atmosphere significantly reduces the maximum g forces and the maximum temperature experienced by the Cruiser with a modest expenditure of fuel.

GLOSSARY

| TERM | DEFINITION AND UNITS |
| --- | --- |
| axial | Axial Vector of Force (g) extending tail to nose through the space vehicle. |
| g vector | Angle of total g relative to the axial vector (i.e., axis of space vehicle extending tail to nose). |
| h | Altitude (height above sea level) (m) |
| $\Delta h$ | Change in Altitude (m). |
| norm | Normal Vector of Force (g) extending floor to ceiling through the space vehicle. |
| q | Dynamic Pressure (Pa) |
| Range | Distance of downrange ground distance travel. |
| t | Time (sec) |
| total g | Total Force (g) (total $g^2$ = axial$^2$ + norm$^2$) |
| v | Velocity (m/sec) |
| $\Delta v$ | Change in Velocity (m/sec). |
| $\alpha$ (alpha) | Angle of Attack. |
| $\gamma$ (gamma) | Flight Path Angle (i.e., angle of velocity vector relative to local horizontal) |
| $\Delta \gamma$ (delta gamma) | Change in Flight Path Angle. |
| $\rho$ (rho) | Air Density (kg/m$^3$) |

TABLE 1

Assumptions and Flight Parameters

Figure 9:
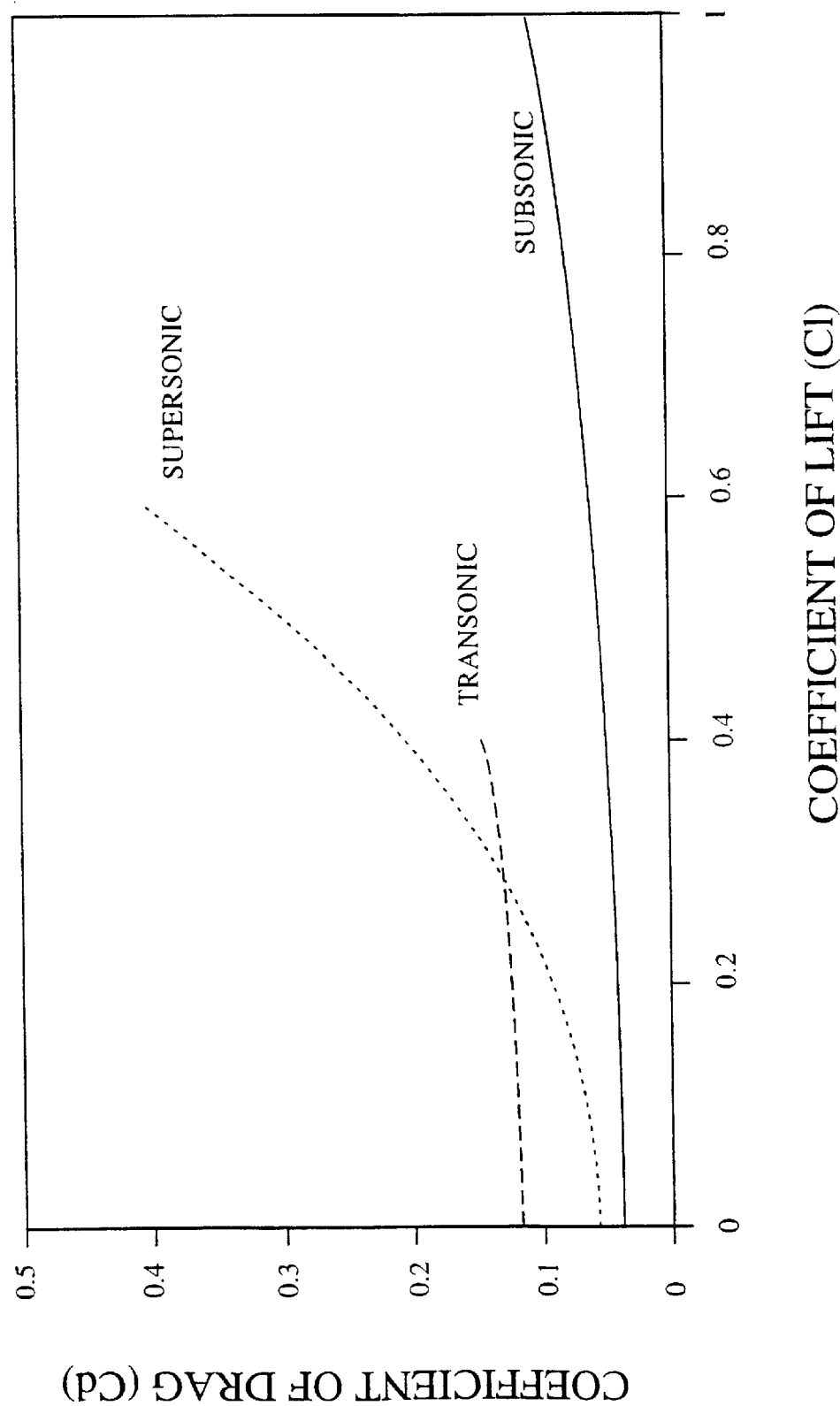
FIG. 9 is a graphical depiction of commonly achievable ratios of coefficient of drag to coefficient of lift for subsonic. transonic and supersonic speeds.

Ratio of Coefficient of Drag to Coefficient of Lift selected from the commonly achievable design curve in FIG. 9 as appropriate to provide the 2 g or 4 g acceleration limit.
Reference Area (0° Angle of Attack) = 52 m$^2$
Initial Mass = 11,750 kg

TABLE 1-continued

Assumptions and Flight Parameters

Wing Loading @ Take-Off = 225.9 kg/m$^2$
Specific Impulse = 2,700 m/sec

TABLE 2A

| t s | h (m) m | v m/s | q Pa | norm g m/s/s | axial g m/s/s | total g m/s/s | h vector rel Cruiser |
|---|---|---|---|---|---|---|---|
| 0 | 15000 | 236 | 4125 | 1.12 | −0.12 | 1.12 | −93.93 |
| 1 | 15041 | 233 | 4002 | 1.08 | −0.12 | 1.09 | −93.93 |
| 2 | 15083 | 230 | 3881 | 1.05 | −0.11 | 1.06 | −93.93 |
| 3 | 15125 | 227 | 3761 | 1.02 | −0.11 | 1.02 | −93.93 |
| 4 | 15186 | 224 | 3645 | 0.99 | −0.11 | 0.99 | −93.93 |
| 5 | 15209 | 222 | 3531 | 1.47 | 0.98 | 1.77 | −133.74 |
| 6 | 15251 | 229 | 3762 | 1.56 | 0.98 | 1.85 | −132.18 |
| 7 | 15299 | 237 | 3988 | 1.65 | 0.98 | 1.92 | −130.75 |
| 8 | 15354 | 244 | 4206 | 1.74 | 0.98 | 2.00 | −129.47 |
| 9 | 15418 | 251 | 4414 | 1.62 | 0.98 | 1.89 | −131.29 |
| 10 | 15491 | 258 | 4608 | 1.69 | 0.98 | 1.95 | −130.22 |
| 11 | 15572 | 265 | 4789 | 1.75 | 0.98 | 2.01 | −129.27 |
| 12 | 15663 | 271 | 4956 | 1.58 | 0.98 | 1.86 | −131.86 |
| 13 | 15763 | 277 | 5105 | 1.63 | 0.98 | 1.90 | −131.09 |
| 14 | 15872 | 283 | 5240 | 1.68 | 0.98 | 1.94 | −130.41 |
| 15 | 15989 | 288 | 5360 | 1.72 | 0.98 | 1.98 | −129.81 |
| 16 | 16115 | 294 | 5462 | 1.75 | 0.98 | 2.01 | −129.30 |
| 17 | 16251 | 299 | 5545 | 1.78 | 0.98 | 2.04 | −128.87 |
| 18 | 16398 | 304 | 5610 | 1.81 | 0.98 | 2.06 | −128.52 |
| 19 | 16554 | 308 | 5655 | 1.83 | 0.98 | 2.08 | −128.26 |
| 20 | 16720 | 313 | 5680 | 1.84 | 0.98 | 2.09 | −128.07 |
| 21 | 16898 | 317 | 5686 | 1.85 | 0.98 | 2.10 | −127.95 |
| 22 | 17085 | 321 | 5672 | 1.86 | 0.98 | 2.10 | −127.91 |
| 23 | 17284 | 324 | 5639 | 1.85 | 0.98 | 2.10 | −127.95 |
| 24 | 17492 | 327 | 5588 | 1.84 | 0.98 | 2.09 | −128.05 |
| 25 | 17711 | 330 | 5521 | 1.83 | 0.98 | 2.08 | −128.22 |
| 26 | 17940 | 333 | 5438 | 1.81 | 0.98 | 2.06 | −128.43 |
| 27 | 18179 | 336 | 5341 | 1.79 | 0.98 | 2.04 | −128.75 |
| 28 | 18427 | 338 | 5231 | 1.76 | 0.98 | 2.02 | −129.12 |
| 29 | 18685 | 341 | 5111 | 1.73 | 0.98 | 1.99 | −129.54 |
| 30 | 18950 | 342 | 4980 | 1.50 | 1.28 | 1.98 | −140.52 |
| 31 | 19225 | 347 | 4925 | 1.50 | 1.31 | 1.99 | −141.11 |
| 32 | 19508 | 352 | 4865 | 1.49 | 1.33 | 2.00 | −141.71 |
| 33 | 19800 | 357 | 4800 | 0.76 | 1.84 | 1.99 | −165.47 |
| 34 | 20102 | 367 | 4854 | 0.71 | 1.88 | 2.01 | −165.37 |
| 35 | 20413 | 377 | 4906 | 0.65 | 1.92 | 2.02 | −165.29 |
| 36 | 20733 | 387 | 4953 | 0.59 | 1.95 | 2.04 | −165.24 |
| 37 | 21063 | 398 | 4996 | 0.60 | 1.99 | 2.08 | −165.26 |
| 38 | 21403 | 409 | 5033 | 0.61 | 1.98 | 2.08 | −165.02 |
| 39 | 21752 | 420 | 5054 | 0.69 | 1.98 | 2.09 | −164.88 |
| 40 | 22111 | 431 | 5059 | 0.62 | 1.98 | 2.07 | −164.67 |
| 41 | 22481 | 442 | 5050 | 0.62 | 1.97 | 2.07 | −164.56 |
| 42 | 22861 | 453 | 5026 | 0.62 | 1.97 | 2.07 | −164.49 |
| 43 | 23250 | 464 | 4989 | 0.62 | 1.97 | 2.06 | −164.46 |
| 44 | 23650 | 475 | 4939 | 0.62 | 1.96 | 2.06 | −164.48 |
| 45 | 24059 | 486 | 4877 | 0.62 | 1.96 | 2.06 | −164.54 |
| 46 | 24478 | 496 | 4803 | 0.61 | 1.96 | 2.05 | −164.63 |
| 47 | 24907 | 507 | 4719 | 0.34 | 1.96 | 1.99 | −172.17 |
| 48 | 25346 | 518 | 4626 | 0.34 | 1.96 | 1.99 | −172.26 |
| 49 | 25793 | 529 | 4526 | 0.33 | 1.96 | 1.99 | −172.37 |
| 50 | 26249 | 539 | 4419 | 0.33 | 1.96 | 1.98 | −172.48 |
| 51 | 26713 | 550 | 4306 | 0.32 | 1.96 | 1.98 | −172.62 |
| 52 | 27186 | 561 | 4188 | 0.32 | 1.96 | 1.99 | −172.77 |
| 53 | 27666 | 572 | 4066 | 0.55 | 1.96 | 2.03 | −166.18 |
| 54 | 28155 | 583 | 3940 | 0.54 | 1.96 | 2.03 | −166.50 |
| 55 | 28654 | 593 | 3810 | 0.64 | 1.95 | 2.05 | −166.90 |
| 56 | 29162 | 604 | 3677 | 0.63 | 1.95 | 2.05 | −167.25 |
| 57 | 29679 | 615 | 3541 | 0.61 | 1.96 | 2.05 | −167.62 |
| 58 | 30207 | 626 | 3404 | 0.60 | 1.96 | 2.05 | −168.01 |
| 59 | 30744 | 636 | 3265 | 0.58 | 1.96 | 2.04 | −168.40 |
| 60 | 31290 | 647 | 3127 | 0.57 | 1.96 | 2.04 | −168.79 |
| 61 | 31847 | 658 | 2988 | 0.55 | 1.96 | 2.04 | −169.19 |
| 62 | 32413 | 669 | 2850 | 0.54 | 1.96 | 2.03 | −169.60 |
| 63 | 32988 | 679 | 2713 | 0.52 | 1.96 | 2.03 | −170.01 |
| 64 | 33573 | 690 | 2579 | 0.51 | 1.96 | 2.02 | −170.42 |
| 65 | 34167 | 701 | 2446 | 0.67 | 1.94 | 2.05 | −170.89 |
| 66 | 34771 | 711 | 2315 | 0.66 | 1.94 | 2.04 | −171.30 |
| 67 | 35384 | 722 | 2186 | 0.64 | 1.93 | 2.04 | −171.70 |
| 68 | 36007 | 732 | 2061 | 0.62 | 1.93 | 2.03 | −171.10 |
| 69 | 36640 | 743 | 1940 | 0.61 | 1.93 | 2.03 | −172.50 |
| 70 | 37283 | 753 | 1822 | 0.60 | 1.93 | 2.02 | −172.89 |
| 71 | 37935 | 764 | 1709 | 0.58 | 1.93 | 2.02 | −173.27 |
| 72 | 38597 | 774 | 1600 | 0.57 | 1.93 | 2.01 | −173.64 |
| 73 | 39268 | 785 | 1495 | 0.55 | 1.93 | 2.01 | −174.00 |
| 74 | 39949 | 795 | 1395 | 0.54 | 1.93 | 2.01 | −174.35 |
| 75 | 40639 | 806 | 1299 | 0.53 | 1.94 | 2.01 | −174.70 |
| 76 | 41338 | 816 | 1208 | 0.52 | 1.94 | 2.01 | −175.04 |
| 77 | 42046 | 827 | 1122 | 0.51 | 1.94 | 2.01 | −175.36 |
| 78 | 42764 | 837 | 1040 | 0.42 | 1.95 | 1.99 | −177.75 |
| 79 | 43491 | 848 | 963 | 0.42 | 1.95 | 1.99 | −177.90 |
| 80 | 44227 | 858 | 890 | 0.41 | 1.95 | 2.00 | −178.05 |
| 81 | 44971 | 869 | 821 | 0.41 | 1.95 | 2.00 | −178.19 |
| 82 | 45725 | 880 | 757 | 0.40 | 1.96 | 2.00 | −178.32 |
| 83 | 46487 | 890 | 696 | 0.23 | 1.98 | 1.99 | −178.47 |
| 84 | 47258 | 901 | 640 | 0.22 | 1.98 | 2.00 | −178.59 |
| 85 | 48037 | 912 | 588 | 0.22 | 1.99 | 2.00 | −178.69 |
| 86 | 48824 | 923 | 539 | 0.26 | 1.99 | 2.00 | −177.63 |
| 87 | 49619 | 934 | 493 | 0.25 | 1.99 | 2.00 | −177.82 |
| 88 | 50422 | 945 | 451 | 0.24 | 1.99 | 2.01 | −177.99 |
| 89 | 51234 | 956 | 412 | 0.24 | 1.99 | 2.01 | −178.16 |
| 90 | 52054 | 968 | 375 | 0.23 | 1.99 | 2.01 | −178.31 |
| 91 | 52881 | 979 | 342 | 0.23 | 2.00 | 2.01 | −178.45 |
| 92 | 53717 | 990 | 311 | 0.22 | 2.00 | 2.01 | −178.58 |
| 93 | 54561 | 1001 | 282 | 0.22 | 2.00 | 2.01 | −178.70 |
| 94 | 55413 | 1012 | 256 | 0.20 | 2.00 | 2.01 | −179.40 |
| 95 | 56273 | 1024 | 232 | 0.16 | 1.61 | 1.62 | −179.32 |
| 96 | 57141 | 1031 | 208 | 0.13 | 1.30 | 1.30 | −179.23 |
| 97 | 58014 | 1036 | 186 | 0.11 | 1.04 | 1.05 | −179.14 |
| 98 | 58888 | 1038 | 165 | 0.09 | 0.84 | 0.84 | −179.05 |
| 99 | 59761 | 1038 | 146 | 0.07 | 0.67 | 0.67 | −178.95 |
| 100 | 60632 | 1036 | 129 | 0.06 | 0.54 | 0.54 | −178.84 |
| 101 | 61499 | 1033 | 113 | 0.05 | 0.43 | 0.43 | −178.72 |
| 102 | 62360 | 1029 | 99 | 0.04 | 0.34 | 0.35 | −178.60 |
| 103 | 63216 | 1024 | 87 | 0.03 | 0.28 | 0.28 | −178.46 |
| 104 | 64065 | 1019 | 77 | 0.03 | 0.22 | 0.22 | −178.31 |
| 105 | 64907 | 1013 | 67 | 0.01 | −0.00 | 0.01 | −72.85 |
| 106 | 65741 | 1005 | 59 | 0.00 | −0.00 | 0.01 | −72.85 |
| 107 | 66565 | 997 | 52 | 0.00 | −0.00 | 0.00 | −72.85 |
| 108 | 67379 | 989 | 45 | 0.00 | −0.00 | 0.00 | 72.85 |
| 109 | 68183 | 981 | 40 | 0.00 | −0.00 | 0.00 | −72.85 |
| 110 | 68978 | 973 | 35 | 0.00 | −0.00 | 0.00 | −72.85 |
| 111 | 69763 | 965 | 31 | 0.00 | −0.00 | 0.00 | −72.85 |
| 112 | 70538 | 957 | 27 | 0.00 | −0.00 | 0.00 | −72.85 |
| 113 | 71303 | 949 | 24 | 0.00 | −0.00 | 0.00 | −72.85 |
| 114 | 72059 | 941 | 21 | 0.00 | −0.00 | 0.00 | −72.85 |
| 115 | 72805 | 933 | 19 | 0.00 | −0.00 | 0.00 | −72.85 |
| 116 | 73541 | 926 | 17 | 0.00 | −0.00 | 0.00 | 0.00 |
| 117 | 74267 | 918 | 15 | 0.00 | −0.00 | 0.00 | 0.00 |
| 118 | 74983 | 910 | 13 | 0.00 | −0.00 | 0.00 | 0.00 |
| 119 | 75890 | 903 | 12 | 0.00 | −0.00 | 0.00 | 0.00 |
| 120 | 76387 | 895 | 10 | 0.00 | −0.00 | 0.00 | 0.00 |
| 121 | 77074 | 888 | 9 | 0.00 | −0.00 | 0.00 | 0.00 |
| 122 | 77751 | 880 | 8 | 0.00 | −0.00 | 0.00 | 0.00 |
| 123 | 78419 | 873 | 7 | 0.00 | −0.00 | 0.00 | 0.00 |
| 124 | 79076 | 865 | 7 | 0.00 | −0.00 | 0.00 | 0.00 |
| 125 | 79724 | 858 | 6 | 0.00 | −0.00 | 0.00 | 0.00 |
| 126 | 80362 | 851 | 5 | 0.00 | −0.00 | 0.00 | 0.00 |
| 127 | 80991 | 843 | 5 | 0.00 | −0.00 | 0.00 | 0.00 |
| 128 | 81609 | 836 | 4 | 0.00 | −0.00 | 0.00 | 0.00 |
| 129 | 82218 | 829 | 4 | 0.00 | −0.00 | 0.00 | 0.00 |
| 130 | 82817 | 822 | 4 | 0.00 | −0.00 | 0.00 | 0.00 |
| 131 | 83406 | 815 | 3 | 0.00 | −0.00 | 0.00 | 0.00 |
| 132 | 83986 | 808 | 3 | 0.00 | −0.00 | 0.00 | 0.00 |
| 133 | 84555 | 801 | 3 | 0.00 | −0.00 | 0.00 | 0.00 |
| 134 | 85115 | 794 | 2 | 0.00 | −0.00 | 0.00 | 0.00 |
| 135 | 85665 | 788 | 2 | 0.00 | −0.00 | 0.00 | 0.00 |
| 136 | 86206 | 781 | 2 | 0.00 | −0.00 | 0.00 | 0.00 |
| 137 | 88736 | 774 | 2 | 0.00 | −0.00 | 0.00 | 0.00 |
| 138 | 87257 | 768 | 2 | 0.00 | −0.00 | 0.00 | 0.00 |
| 139 | 87768 | 761 | 2 | 0.00 | −0.00 | 0.00 | 0.00 |
| 140 | 88269 | 755 | 1 | 0.00 | −0.00 | 0.00 | 0.00 |
| 141 | 88761 | 748 | 1 | 0.00 | −0.00 | 0.00 | 0.00 |

TABLE 2A-continued

| t s | h (m) m | v m/s | q Pa | norm g m/s/s | axial g m/s/s | total g m/s/s | h vector rel Cruiser |
|---|---|---|---|---|---|---|---|
| 142 | 89242 | 742 | 1 | 0.00 | −0.00 | 0.00 | 0.00 |
| 143 | 89714 | 736 | 1 | 0.00 | −0.00 | 0.00 | 0.00 |
| 144 | 90176 | 730 | 1 | 0.00 | −0.00 | 0.00 | 0.00 |
| 145 | 90629 | 723 | 1 | 0.00 | −0.00 | 0.00 | 0.00 |
| 146 | 91071 | 717 | 1 | 0.00 | −0.00 | 0.00 | 0.00 |
| 147 | 91504 | 712 | 1 | 0.00 | −0.00 | 0.00 | 0.00 |
| 148 | 91927 | 706 | 1 | 0.00 | −0.00 | 0.00 | 0.00 |
| 149 | 92340 | 700 | 1 | 0.00 | −0.00 | 0.00 | 0.00 |
| 150 | 92744 | 694 | 1 | 0.00 | −0.00 | 0.00 | 0.00 |
| 151 | 93137 | 689 | 1 | 0.00 | −0.00 | 0.00 | 0.00 |
| 152 | 93521 | 683 | 1 | 0.00 | −0.00 | 0.00 | 0.00 |
| 153 | 93895 | 678 | 1 | 0.00 | −0.00 | 0.00 | 0.00 |
| 154 | 94260 | 673 | 0 | 0.00 | −0.00 | 0.00 | 0.00 |
| 155 | 94614 | 667 | 0 | 0.00 | −0.00 | 0.00 | 0.00 |
| 156 | 94959 | 662 | 0 | 0.00 | −0.00 | 0.00 | 0.00 |
| 157 | 95294 | 657 | 0 | 0.00 | −0.00 | 0.00 | 0.00 |
| 158 | 95819 | 653 | 0 | 0.00 | −0.00 | 0.00 | 0.00 |
| 159 | 95935 | 648 | 0 | 0.00 | −0.00 | 0.00 | 0.00 |
| 160 | 96241 | 643 | 0 | 0.00 | −0.00 | 0.00 | 0.00 |
| 161 | 96537 | 639 | 0 | 0.00 | −0.00 | 0.00 | 0.00 |
| 162 | 96823 | 634 | 0 | 0.00 | −0.00 | 0.00 | 0.00 |
| 163 | 97099 | 630 | 0 | 0.00 | −0.00 | 0.00 | 0.00 |
| 164 | 97366 | 626 | 0 | 0.00 | −0.00 | 0.00 | 0.00 |
| 165 | 97623 | 622 | 0 | 0.00 | −0.00 | 0.00 | 0.00 |
| 166 | 97870 | 618 | 0 | 0.00 | −0.00 | 0.00 | 0.00 |
| 167 | 98107 | 614 | 0 | 0.00 | −0.00 | 0.00 | 0.00 |
| 168 | 98335 | 611 | 0 | 0.00 | −0.00 | 0.00 | 0.00 |
| 169 | 98552 | 607 | 0 | 0.00 | −0.00 | 0.00 | 0.00 |
| 170 | 98760 | 604 | 0 | 0.00 | −0.00 | 0.00 | 0.00 |
| 171 | 98959 | 601 | 0 | 0.00 | −0.00 | 0.00 | 0.00 |
| 172 | 99147 | 597 | 0 | 0.00 | −0.00 | 0.00 | 0.00 |
| 173 | 99326 | 595 | 0 | 0.00 | −0.00 | 0.00 | 0.00 |
| 174 | 99495 | 592 | 0 | 0.00 | −0.00 | 0.00 | 0.00 |
| 175 | 99654 | 589 | 0 | 0.00 | −0.00 | 0.00 | 0.00 |
| 176 | 99803 | 587 | 0 | 0.00 | −0.00 | 0.00 | 0.00 |
| 177 | 99943 | 584 | 0 | 0.00 | −0.00 | 0.00 | 0.00 |
| 178 | 100072 | 582 | 0 | 0.00 | −0.00 | 0.00 | 0.00 |
| 179 | 100192 | 580 | 0 | 0.00 | −0.00 | 0.00 | 0.00 |
| 180 | 100303 | 578 | 0 | 0.00 | −0.00 | 0.00 | 0.00 |
| 181 | 100403 | 577 | 0 | 0.00 | −0.00 | 0.00 | 0.00 |
| 182 | 100494 | 575 | 0 | 0.00 | −0.00 | 0.00 | 0.00 |
| 183 | 100575 | 574 | 0 | 0.00 | −0.00 | 0.00 | 0.00 |
| 184 | 100646 | 572 | 0 | 0.00 | −0.00 | 0.00 | 0.00 |
| 185 | 100707 | 571 | 0 | 0.00 | −0.00 | 0.00 | 0.00 |
| 186 | 100758 | 570 | 0 | 0.00 | −0.00 | 0.00 | 0.00 |
| 187 | 100800 | 570 | 0 | 0.00 | −0.00 | 0.00 | 0.00 |
| 188 | 100832 | 569 | 0 | 0.00 | −0.00 | 0.00 | 0.00 |
| 189 | 100854 | 569 | 0 | 0.00 | −0.00 | 0.00 | 0.00 |
| 190 | 100866 | 569 | 0 | 0.00 | −0.00 | 0.00 | 0.00 |
| 191 | 100869 | 569 | 0 | 0.00 | −0.00 | 0.00 | 0.00 |
| 192 | 100862 | 569 | 0 | 0.00 | −0.00 | 0.00 | 0.00 |
| 193 | 100844 | 569 | 0 | 0.00 | −0.00 | 0.00 | 0.00 |
| 194 | 100818 | 569 | 0 | 0.00 | −0.00 | 0.00 | 0.00 |
| 195 | 100781 | 570 | 0 | 0.00 | −0.00 | 0.00 | 0.00 |
| 196 | 100734 | 571 | 0 | 0.00 | −0.00 | 0.00 | 0.00 |
| 197 | 100678 | 572 | 0 | 0.00 | −0.00 | 0.00 | 0.00 |
| 198 | 100612 | 573 | 0 | 0.00 | −0.00 | 0.00 | 0.00 |
| 199 | 100536 | 574 | 0 | 0.00 | −0.00 | 0.00 | 0.00 |
| 200 | 100450 | 576 | 0 | 0.00 | −0.00 | 0.00 | 0.00 |
| 201 | 100355 | 577 | 0 | 0.00 | −0.00 | 0.00 | 0.00 |
| 202 | 100249 | 579 | 0 | 0.00 | −0.00 | 0.00 | 0.00 |
| 203 | 100134 | 581 | 0 | 0.00 | −0.00 | 0.00 | 0.00 |
| 204 | 100009 | 583 | 0 | 0.00 | −0.00 | 0.00 | 0.00 |
| 205 | 99874 | 586 | 0 | 0.00 | −0.00 | 0.00 | −85.89 |
| 206 | 99730 | 588 | 0 | 0.00 | −0.00 | 0.00 | −85.89 |
| 207 | 99575 | 590 | 0 | 0.00 | −0.00 | 0.00 | −85.89 |
| 208 | 99411 | 593 | 0 | 0.00 | −0.00 | 0.00 | −85.89 |
| 209 | 99237 | 596 | 0 | 0.00 | −0.00 | 0.00 | −85.89 |
| 210 | 99053 | 599 | 0 | 0.00 | −0.00 | 0.00 | −85.89 |
| 211 | 98859 | 602 | 0 | 0.00 | −0.00 | 0.00 | −85.89 |
| 212 | 98656 | 606 | 0 | 0.00 | −0.00 | 0.00 | −85.89 |
| 213 | 98442 | 609 | 0 | 0.00 | −0.00 | 0.00 | −85.89 |
| 214 | 98219 | 613 | 0 | 0.00 | −0.00 | 0.00 | −85.89 |
| 215 | 97986 | 616 | 0 | 0.00 | −0.00 | 0.00 | −85.89 |
| 216 | 97743 | 620 | 0 | 0.00 | −0.00 | 0.00 | −85.89 |
| 217 | 97491 | 624 | 0 | 0.00 | −0.00 | 0.00 | −85.89 |
| 218 | 97228 | 628 | 0 | 0.00 | −0.00 | 0.00 | −85.89 |
| 219 | 96956 | 633 | 0 | 0.00 | −0.00 | 0.00 | −85.89 |
| 220 | 96674 | 637 | 0 | 0.00 | −0.00 | 0.00 | −85.89 |
| 221 | 96382 | 641 | 0 | 0.00 | −0.00 | 0.00 | −85.89 |
| 222 | 96080 | 646 | 0 | 0.00 | −0.00 | 0.00 | −85.89 |
| 223 | 95768 | 651 | 0 | 0.00 | −0.00 | 0.00 | −85.89 |
| 224 | 95447 | 656 | 0 | 0.00 | −0.00 | 0.00 | −85.89 |
| 225 | 95116 | 661 | 0 | 0.00 | −0.00 | 0.00 | −85.89 |
| 226 | 94775 | 668 | 0 | 0.00 | −0.00 | 0.00 | −85.89 |
| 227 | 94424 | 671 | 0 | 0.00 | −0.00 | 0.00 | −85.89 |
| 228 | 94063 | 676 | 0 | 0.00 | −0.00 | 0.00 | −85.89 |
| 229 | 93692 | 681 | 1 | 0.00 | −0.00 | 0.00 | −85.89 |
| 230 | 93312 | 687 | 1 | 0.00 | −0.00 | 0.00 | −85.89 |
| 231 | 92922 | 692 | 1 | 0.00 | −0.00 | 0.00 | −85.89 |
| 232 | 92522 | 698 | 1 | 0.00 | −0.00 | 0.00 | −85.89 |
| 233 | 92112 | 704 | 1 | 0.00 | −0.00 | 0.00 | −85.89 |
| 234 | 91692 | 710 | 1 | 0.00 | −0.00 | 0.00 | −85.89 |
| 235 | 91263 | 716 | 1 | 0.00 | −0.00 | 0.00 | −85.89 |
| 236 | 90824 | 722 | 1 | 0.00 | −0.00 | 0.00 | −85.89 |
| 237 | 90374 | 728 | 1 | 0.00 | −0.00 | 0.00 | −85.89 |
| 238 | 89915 | 734 | 1 | 0.00 | −0.00 | 0.00 | −85.89 |
| 239 | 89447 | 740 | 1 | 0.00 | −0.00 | 0.00 | −85.89 |
| 240 | 88968 | 747 | 1 | 0.00 | −0.00 | 0.00 | −85.89 |
| 241 | 88480 | 753 | 1 | 0.00 | −0.00 | 0.00 | −85.89 |
| 242 | 87981 | 759 | 1 | 0.00 | −0.00 | 0.00 | −85.89 |
| 243 | 87473 | 766 | 2 | 0.00 | −0.00 | 0.00 | −85.89 |
| 244 | 86956 | 773 | 2 | 0.00 | −0.00 | 0.00 | −155.89 |
| 245 | 86428 | 779 | 2 | 0.00 | −0.00 | 0.00 | −155.89 |
| 246 | 85890 | 786 | 2 | 0.00 | −0.00 | 0.00 | −155.89 |
| 247 | 85343 | 793 | 2 | 0.00 | −0.00 | 0.00 | −155.89 |
| 248 | 84786 | 800 | 3 | 0.00 | −0.00 | 0.00 | −155.89 |
| 249 | 84219 | 807 | 3 | 0.00 | −0.00 | 0.00 | −155.89 |
| 250 | 83642 | 814 | 3 | 0.00 | −0.00 | 0.00 | −155.89 |
| 251 | 83056 | 821 | 3 | 0.00 | −0.00 | 0.00 | −155.89 |
| 252 | 82460 | 828 | 4 | 0.00 | −0.00 | 0.00 | −155.89 |
| 253 | 81853 | 835 | 4 | 0.00 | −0.00 | 0.00 | −155.89 |
| 254 | 81237 | 842 | 5 | 0.00 | −0.00 | 0.00 | −155.89 |
| 255 | 80612 | 849 | 5 | 0.00 | −0.00 | 0.00 | −155.89 |
| 256 | 79976 | 857 | 6 | 0.00 | −0.00 | 0.00 | −155.89 |
| 257 | 79331 | 864 | 6 | 0.00 | −0.00 | 0.00 | −155.89 |
| 258 | 78676 | 872 | 7 | 0.00 | −0.00 | 0.00 | −155.89 |
| 259 | 78011 | 879 | 8 | 0.00 | −0.00 | 0.00 | −155.89 |
| 260 | 77336 | 886 | 9 | 0.00 | −0.00 | 0.01 | −155.89 |
| 261 | 76652 | 894 | 10 | 0.00 | −0.00 | 0.01 | −155.89 |
| 262 | 75958 | 902 | 11 | 0.00 | −0.00 | 0.01 | −155.89 |
| 263 | 75254 | 909 | 13 | 1.98 | −0.35 | 2.01 | −179.91 |
| 264 | 74540 | 913 | 14 | 1.98 | −0.35 | 2.01 | −179.90 |
| 265 | 73831 | 918 | 16 | 1.98 | −0.35 | 2.01 | −179.89 |
| 266 | 73128 | 922 | 18 | 1.98 | −0.35 | 2.01 | −179.87 |
| 267 | 72430 | 926 | 19 | 1.98 | −0.35 | 2.01 | −179.86 |
| 268 | 71738 | 929 | 22 | 1.98 | −0.36 | 2.01 | −179.84 |
| 269 | 71051 | 933 | 24 | 1.98 | −0.36 | 2.02 | −179.82 |
| 270 | 70370 | 937 | 27 | 1.99 | −0.36 | 2.02 | −179.80 |
| 271 | 69696 | 940 | 30 | 1.99 | −0.36 | 2.02 | −179.78 |
| 272 | 69028 | 944 | 33 | 1.99 | −0.36 | 2.02 | −179.76 |
| 273 | 68366 | 947 | 36 | 1.99 | −0.36 | 2.02 | −179.73 |
| 274 | 67711 | 951 | 40 | 1.99 | −0.36 | 2.03 | −179.70 |
| 275 | 67062 | 954 | 44 | 1.99 | −0.36 | 2.03 | −179.67 |
| 276 | 66421 | 957 | 49 | 2.00 | −0.37 | 2.03 | −179.63 |
| 277 | 65787 | 960 | 53 | 2.00 | −0.37 | 2.03 | −179.59 |
| 278 | 65160 | 962 | 59 | 2.00 | −0.37 | 2.04 | −179.55 |
| 279 | 64541 | 965 | 64 | 2.01 | −0.37 | 2.04 | −179.50 |
| 280 | 63929 | 968 | 70 | 2.01 | −0.37 | 2.05 | −179.45 |
| 281 | 63325 | 970 | 77 | 2.01 | −0.38 | 2.05 | −179.40 |
| 282 | 62729 | 972 | 84 | 2.02 | −0.38 | 2.05 | −179.34 |
| 283 | 62141 | 975 | 92 | 2.02 | −0.38 | 2.06 | −179.27 |
| 284 | 61562 | 977 | 100 | 2.03 | −0.39 | 2.07 | −179.20 |
| 285 | 60991 | 979 | 109 | 2.03 | −0.39 | 2.07 | −179.13 |
| 286 | 60428 | 980 | 118 | 2.04 | −0.39 | 2.08 | −179.05 |
| 287 | 59875 | 982 | 129 | 2.05 | −0.40 | 2.09 | −178.97 |
| 288 | 59330 | 984 | 139 | 2.05 | −0.40 | 2.09 | −178.88 |
| 289 | 58794 | 985 | 151 | 2.06 | −0.41 | 2.10 | −178.78 |
| 290 | 58268 | 986 | 163 | 2.07 | −0.41 | 2.11 | −178.68 |
| 291 | 57751 | 987 | 175 | 2.08 | −0.42 | 2.12 | −178.57 |
| 292 | 57244 | 988 | 188 | 2.09 | −0.43 | 2.13 | −178.46 |
| 293 | 56746 | 989 | 202 | 2.10 | −0.43 | 2.14 | −178.34 |

TABLE 2A-continued

| t s | h (m) m | v m/s | q Pa | norm g m/s/s | axial g m/s/s | total g m/s/s | h vector rel Cruiser |
|---|---|---|---|---|---|---|---|
| 294 | 56259 | 990 | 217 | 2.11 | −0.44 | 2.15 | −178.22 |
| 295 | 55782 | 990 | 232 | 2.12 | −0.45 | 2.16 | −178.09 |
| 296 | 55315 | 990 | 248 | 0.16 | −0.11 | 0.19 | −150.89 |
| 297 | 54859 | 994 | 267 | 0.17 | −0.11 | 0.20 | −145.89 |
| 298 | 54395 | 997 | 287 | 0.18 | −0.12 | 0.22 | −140.89 |
| 299 | 53923 | 1001 | 308 | 0.20 | −0.13 | 0.24 | −135.89 |
| 300 | 53443 | 1004 | 332 | 0.21 | −0.14 | 0.25 | −130.89 |
| 301 | 52956 | 1007 | 358 | 0.23 | −0.15 | 0.27 | −125.89 |
| 302 | 52461 | 1011 | 387 | 0.24 | −0.17 | 0.30 | −120.89 |
| 303 | 51960 | 1014 | 418 | 0.26 | −0.18 | 0.32 | −115.89 |
| 304 | 51451 | 1017 | 451 | 0.29 | −0.19 | 0.35 | −110.89 |
| 305 | 50936 | 1020 | 488 | 0.31 | −0.21 | 0.37 | −105.89 |
| 306 | 50415 | 1023 | 529 | 0.33 | −0.23 | 0.40 | −100.89 |
| 307 | 49887 | 1026 | 573 | 0.36 | −0.25 | 0.44 | −95.89 |
| 308 | 49353 | 1029 | 620 | 0.39 | −0.27 | 0.47 | −90.89 |
| 309 | 48814 | 1031 | 673 | 0.43 | −0.29 | 0.51 | −85.89 |
| 310 | 48270 | 1033 | 730 | 0.46 | −0.31 | 0.56 | −85.89 |
| 311 | 47721 | 1036 | 792 | 0.50 | −0.34 | 0.61 | −85.89 |
| 312 | 47167 | 1037 | 859 | 0.54 | −0.37 | 0.66 | −85.89 |
| 313 | 46610 | 1039 | 932 | 0.59 | −0.40 | 0.71 | −85.89 |
| 314 | 46049 | 1041 | 1011 | 0.64 | −0.43 | 0.77 | −85.89 |
| 315 | 45486 | 1042 | 1097 | 0.69 | −0.47 | 0.84 | −85.89 |
| 316 | 44920 | 1042 | 1190 | 0.75 | −0.51 | 0.91 | −85.89 |
| 317 | 44353 | 1043 | 1289 | 0.82 | −0.55 | 0.99 | −85.89 |
| 318 | 43785 | 1043 | 1396 | 0.88 | −0.60 | 1.07 | −85.89 |
| 319 | 43217 | 1042 | 1511 | 0.96 | −0.65 | 1.16 | −85.89 |
| 320 | 42649 | 1041 | 1634 | 1.04 | −0.70 | 1.25 | −85.89 |
| 321 | 42083 | 1039 | 1764 | 1.12 | −0.76 | 1.35 | −85.89 |
| 322 | 41520 | 1037 | 1902 | 1.21 | −0.82 | 1.46 | −85.89 |
| 323 | 40959 | 1035 | 2048 | 1.30 | −0.88 | 1.57 | −85.89 |
| 324 | 40404 | 1031 | 2200 | 1.39 | −0.94 | 1.68 | −85.89 |
| 325 | 39854 | 1027 | 2359 | 1.49 | −1.01 | 1.81 | −85.89 |
| 326 | 39310 | 1023 | 2523 | 1.60 | −1.08 | 1.93 | −85.89 |
| 327 | 38774 | 1017 | 2692 | 1.59 | −1.16 | 1.97 | −83.13 |
| 328 | 38248 | 1011 | 2863 | 1.68 | −0.89 | 1.90 | −90.35 |
| 329 | 37731 | 1007 | 3057 | 1.68 | −0.95 | 1.93 | −88.02 |
| 330 | 37222 | 1003 | 3256 | 1.68 | −1.01 | 1.96 | −85.89 |
| 331 | 36723 | 998 | 3459 | 1.68 | −1.07 | 1.99 | −83.28 |
| 332 | 36233 | 992 | 3664 | 1.67 | −1.13 | 2.02 | −80.88 |
| 333 | 35753 | 986 | 3870 | 1.66 | −1.20 | 2.05 | −78.46 |
| 334 | 35283 | 979 | 4076 | 1.65 | −1.26 | 2.07 | −76.04 |
| 335 | 34822 | 971 | 4280 | 1.62 | −1.33 | 2.10 | −73.61 |
| 336 | 34372 | 962 | 4481 | 1.67 | −0.97 | 1.93 | −81.86 |
| 337 | 33933 | 957 | 4717 | 1.72 | −1.02 | 2.00 | −80.69 |
| 338 | 33502 | 952 | 4954 | 1.72 | −1.08 | 2.02 | −78.74 |
| 339 | 33081 | 946 | 5188 | 1.71 | −1.13 | 2.05 | −76.77 |
| 340 | 32670 | 939 | 5418 | 1.77 | −0.80 | 1.94 | −85.11 |
| 341 | 32269 | 935 | 5688 | 1.76 | −0.84 | 1.95 | −83.40 |
| 342 | 31877 | 931 | 5958 | 1.75 | −0.88 | 1.96 | −81.87 |
| 343 | 31495 | 926 | 6225 | 1.74 | −0.92 | 1.97 | −79.91 |
| 344 | 31122 | 921 | 6489 | 1.72 | 0.96 | 1.97 | −78.14 |
| 345 | 30758 | 916 | 6748 | 1.70 | −1.00 | 1.97 | −76.36 |
| 346 | 30404 | 910 | 7000 | 1.68 | −1.04 | 1.97 | −74.55 |
| 347 | 30059 | 903 | 7245 | 1.65 | −1.07 | 1.97 | −72.73 |
| 348 | 29723 | 896 | 7480 | 1.68 | −0.75 | 1.85 | −81.27 |
| 349 | 29396 | 893 | 7766 | 1.73 | −0.78 | 1.90 | −80.60 |
| 350 | 29078 | 888 | 8047 | 1.78 | −0.81 | 1.95 | −79.93 |
| 351 | 28768 | 884 | 8320 | 1.82 | −0.84 | 2.00 | −79.28 |
| 352 | 28468 | 879 | 8584 | 1.82 | −0.86 | 2.01 | −78.19 |
| 353 | 28177 | 874 | 8837 | 1.82 | −0.89 | 2.02 | −77.10 |
| 354 | 27896 | 868 | 9077 | 1.81 | −0.91 | 2.03 | −76.01 |
| 355 | 27625 | 862 | 9303 | 1.80 | −0.94 | 2.03 | −74.92 |
| 356 | 27364 | 856 | 9513 | 1.79 | −0.96 | 2.03 | −73.83 |
| 357 | 27113 | 850 | 9707 | 1.78 | −0.98 | 2.03 | −72.86 |
| 358 | 26871 | 843 | 9883 | 1.76 | −0.99 | 2.02 | −71.89 |
| 359 | 26638 | 836 | 10042 | 1.75 | −1.01 | 2.02 | −70.93 |
| 360 | 26415 | 828 | 10182 | 1.75 | −1.02 | 2.03 | −70.35 |
| 361 | 26202 | 821 | 10304 | 1.86 | −0.75 | 2.01 | −78.47 |
| 362 | 25998 | 816 | 10479 | 1.88 | −0.76 | 2.02 | −77.96 |
| 363 | 25803 | 811 | 10635 | 1.88 | −0.77 | 2.04 | −77.46 |
| 364 | 25618 | 806 | 10773 | 1.89 | −0.78 | 2.05 | −76.96 |
| 365 | 25443 | 800 | 10891 | 1.89 | −0.79 | 2.05 | −76.48 |
| 366 | 25278 | 794 | 10988 | 1.89 | −0.80 | 2.05 | −76.00 |
| 367 | 25123 | 788 | 11065 | 1.88 | −0.80 | 2.05 | −75.52 |
| 368 | 24978 | 782 | 11120 | 1.87 | −0.81 | 2.04 | −75.06 |
| 369 | 24842 | 776 | 11156 | 1.88 | −0.81 | 2.05 | −74.81 |
| 370 | 24716 | 770 | 11171 | 1.88 | −0.81 | 2.05 | −74.56 |
| 371 | 24600 | 763 | 11166 | 1.88 | −0.81 | 2.05 | −74.72 |
| 372 | 24493 | 757 | 11141 | 1.88 | −0.81 | 2.04 | −74.88 |
| 373 | 24395 | 750 | 11097 | 1.87 | −0.81 | 2.04 | −75.04 |
| 374 | 24307 | 743 | 11034 | 1.86 | −0.80 | 2.02 | −75.21 |
| 375 | 24229 | 737 | 10954 | 1.85 | −0.79 | 2.01 | −75.38 |
| 376 | 24159 | 730 | 10857 | 1.83 | −0.79 | 1.99 | −75.55 |
| 377 | 24098 | 723 | 10744 | 1.85 | −0.78 | 2.00 | −76.14 |
| 378 | 24046 | 716 | 10616 | 1.86 | −0.77 | 2.01 | −76.72 |
| 379 | 24003 | 709 | 10475 | 1.87 | −0.76 | 2.02 | −77.31 |

TABLE 2B

| t s | Gamma deg | m kg | Range km | Lift N | Drag N |
|---|---|---|---|---|---|
| 0 | 10.0 | 11750 | 0 | 128695 | 13685 |
| 1 | 10.3 | 11750 | 0 | 124865 | 13277 |
| 2 | 10.6 | 11750 | 0 | 121080 | 12875 |
| 3 | 10.7 | 11750 | 1 | 117358 | 12479 |
| 4 | 10.8 | 11750 | 1 | 113718 | 12092 |
| 5 | 10.8 | 11750 | 1 | 146900 | 15094 |
| 6 | 12.1 | 11702 | 1 | 156500 | 16080 |
| 7 | 13.5 | 11653 | 2 | 165899 | 17046 |
| 8 | 15.1 | 11605 | 2 | 174977 | 17979 |
| 9 | 16.9 | 11556 | 2 | 160657 | 16594 |
| 10 | 18.4 | 11508 | 2 | 167715 | 17323 |
| 11 | 20.0 | 11459 | 3 | 174319 | 18005 |
| 12 | 21.7 | 11411 | 3 | 154614 | 16441 |
| 13 | 23.1 | 11364 | 3 | 159285 | 16937 |
| 14 | 24.5 | 11316 | 3 | 163503 | 17386 |
| 15 | 26.0 | 11269 | 4 | 167224 | 17781 |
| 16 | 27.6 | 11221 | 4 | 170405 | 18120 |
| 17 | 29.3 | 11174 | 4 | 173016 | 18397 |
| 18 | 31.0 | 11126 | 4 | 175031 | 18612 |
| 19 | 32.7 | 11079 | 5 | 176435 | 18761 |
| 20 | 34.5 | 11032 | 5 | 177221 | 18844 |
| 21 | 36.4 | 10985 | 5 | 177391 | 18863 |
| 22 | 38.2 | 10938 | 5 | 176957 | 18816 |
| 23 | 40.1 | 10891 | 6 | 175938 | 18708 |
| 24 | 42.0 | 10845 | 6 | 174361 | 18540 |
| 25 | 43.9 | 10798 | 6 | 172260 | 18317 |
| 26 | 45.7 | 10752 | 6 | 169673 | 18042 |
| 27 | 47.6 | 10707 | 7 | 166645 | 17720 |
| 28 | 49.5 | 10661 | 7 | 163221 | 17356 |
| 29 | 51.3 | 10616 | 7 | 159450 | 16955 |
| 30 | 53.2 | 10571 | 7 | 129484 | 14632 |
| 31 | 54.7 | 10516 | 7 | 128055 | 14470 |
| 32 | 56.1 | 10459 | 8 | 126486 | 14293 |
| 33 | 57.6 | 10403 | 8 | 49915 | 10632 |
| 34 | 58.0 | 10329 | 8 | 50486 | 10753 |
| 35 | 58.3 | 10254 | 8 | 51020 | 10867 |
| 36 | 58.4 | 10178 | 8 | 51512 | 10972 |
| 37 | 58.5 | 10102 | 9 | 51955 | 11066 |
| 38 | 58.7 | 10025 | 9 | 52338 | 11148 |
| 39 | 58.8 | 9949 | 9 | 52559 | 11195 |
| 40 | 59.0 | 9873 | 9 | 52613 | 11206 |
| 41 | 59.1 | 9798 | 9 | 52517 | 11186 |
| 42 | 59.3 | 9723 | 10 | 52272 | 11134 |
| 43 | 59.4 | 9650 | 10 | 51886 | 11052 |
| 44 | 59.5 | 9577 | 10 | 51366 | 10941 |
| 45 | 59.7 | 9504 | 10 | 50718 | 10803 |
| 46 | 59.8 | 9433 | 11 | 49953 | 10640 |
| 47 | 59.9 | 9362 | 11 | 24539 | 9988 |
| 48 | 59.7 | 9261 | 11 | 24057 | 9791 |
| 49 | 59.6 | 9221 | 11 | 23535 | 9579 |
| 50 | 59.4 | 9152 | 12 | 22979 | 9352 |
| 51 | 59.2 | 9084 | 12 | 22391 | 9113 |
| 52 | 59.0 | 9016 | 12 | 21778 | 8864 |
| 53 | 58.8 | 8948 | 13 | 42288 | 9007 |
| 54 | 58.8 | 8881 | 13 | 40977 | 8728 |
| 55 | 58.9 | 8815 | 13 | 39628 | 8441 |
| 56 | 59.0 | 8749 | 13 | 38241 | 8145 |

TABLE 2B-continued

| t s | Gamma deg | m kg | Range km | Lift N | Drag N |
|---|---|---|---|---|---|
| 57 | 59.1 | 8684 | 14 | 36829 | 7845 |
| 58 | 59.2 | 8619 | 14 | 35399 | 7540 |
| 59 | 59.2 | 8555 | 14 | 33960 | 7233 |
| 60 | 59.3 | 8491 | 15 | 32517 | 6926 |
| 61 | 59.4 | 8428 | 15 | 31075 | 6619 |
| 62 | 59.4 | 8365 | 15 | 29641 | 6313 |
| 63 | 59.4 | 8303 | 16 | 28220 | 6011 |
| 64 | 59.4 | 8242 | 16 | 26818 | 5712 |
| 65 | 59.4 | 8181 | 16 | 25440 | 5419 |
| 66 | 59.6 | 8120 | 17 | 24074 | 5128 |
| 67 | 59.7 | 8061 | 17 | 22739 | 4843 |
| 68 | 59.8 | 8001 | 17 | 21439 | 4566 |
| 69 | 59.9 | 7943 | 18 | 20176 | 4297 |
| 70 | 60.0 | 7884 | 18 | 18954 | 4037 |
| 71 | 60.0 | 7827 | 19 | 17774 | 3786 |
| 72 | 60.1 | 7769 | 19 | 16639 | 3544 |
| 73 | 60.1 | 7713 | 19 | 15549 | 3312 |
| 74 | 60.2 | 7657 | 20 | 14506 | 3090 |
| 75 | 60.2 | 7601 | 20 | 13511 | 2878 |
| 76 | 60.2 | 7545 | 21 | 12564 | 2676 |
| 77 | 60.2 | 7491 | 21 | 11666 | 2485 |
| 78 | 60.3 | 7436 | 21 | 5407 | 2201 |
| 79 | 60.2 | 7382 | 22 | 5005 | 2037 |
| 80 | 60.2 | 7328 | 22 | 4626 | 1883 |
| 81 | 60.1 | 7275 | 23 | 4269 | 1738 |
| 82 | 60.0 | 7221 | 23 | 3934 | 1601 |
| 83 | 60.0 | 7169 | 24 | 3620 | 1473 |
| 84 | 59.8 | 7116 | 24 | 3328 | 1354 |
| 85 | 59.6 | 7065 | 24 | 3055 | 1243 |
| 86 | 59.5 | 7013 | 25 | 5602 | 1193 |
| 87 | 59.3 | 6962 | 25 | 5129 | 1092 |
| 88 | 59.1 | 6911 | 26 | 4689 | 999 |
| 89 | 59.0 | 6860 | 26 | 4282 | 912 |
| 90 | 58.8 | 6810 | 27 | 3904 | 832 |
| 91 | 58.7 | 6760 | 27 | 3555 | 757 |
| 92 | 58.5 | 6711 | 28 | 3233 | 689 |
| 93 | 58.3 | 6662 | 28 | 2936 | 625 |
| 94 | 58.2 | 6613 | 29 | 1331 | 542 |
| 95 | 58.0 | 6565 | 29 | 1206 | 491 |
| 96 | 57.8 | 6526 | 30 | 1083 | 441 |
| 97 | 57.5 | 6495 | 30 | 966 | 393 |
| 98 | 57.3 | 6470 | 31 | 857 | 349 |
| 99 | 57.1 | 6450 | 32 | 758 | 308 |
| 100 | 56.8 | 6434 | 32 | 668 | 272 |
| 101 | 56.6 | 6422 | 33 | 588 | 239 |
| 102 | 56.3 | 6412 | 33 | 517 | 210 |
| 103 | 56.0 | 6403 | 34 | 454 | 185 |
| 104 | 55.7 | 6397 | 34 | 399 | 162 |
| 105 | 55.4 | 6392 | 35 | 350 | 142 |
| 106 | 55.1 | 6392 | 36 | 306 | 125 |
| 107 | 54.8 | 6392 | 36 | 268 | 109 |
| 108 | 54.5 | 6392 | 37 | 235 | 96 |
| 109 | 54.1 | 6392 | 37 | 207 | 84 |
| 110 | 53.8 | 6392 | 38 | 182 | 74 |
| 111 | 53.5 | 6392 | 38 | 160 | 65 |
| 112 | 53.1 | 6392 | 39 | 141 | 58 |
| 113 | 52.8 | 6392 | 40 | 125 | 51 |
| 114 | 52.4 | 6392 | 40 | 110 | 45 |
| 115 | 52.0 | 6392 | 41 | 98 | 40 |
| 116 | 51.7 | 6392 | 41 | 0 | 52 |
| 117 | 51.3 | 6392 | 42 | 0 | 46 |
| 118 | 50.9 | 6392 | 42 | 0 | 41 |
| 119 | 50.5 | 6392 | 43 | 0 | 37 |
| 120 | 50.1 | 6392 | 44 | 0 | 33 |
| 121 | 49.7 | 6392 | 44 | 0 | 29 |
| 122 | 49.3 | 6392 | 45 | 0 | 26 |
| 123 | 48.9 | 6392 | 45 | 0 | 23 |
| 124 | 48.5 | 6392 | 46 | 0 | 21 |
| 125 | 48.0 | 6392 | 47 | 0 | 19 |
| 126 | 47.6 | 6392 | 47 | 0 | 17 |
| 127 | 47.2 | 6392 | 48 | 0 | 15 |
| 128 | 46.7 | 6392 | 48 | 0 | 14 |
| 129 | 46.3 | 6392 | 49 | 0 | 12 |
| 130 | 45.8 | 6392 | 49 | 0 | 11 |
| 131 | 45.3 | 6392 | 50 | 0 | 10 |
| 132 | 44.8 | 6392 | 51 | 0 | 9 |
| 133 | 44.3 | 6392 | 51 | 0 | 8 |
| 134 | 43.8 | 6392 | 52 | 0 | 7 |
| 135 | 43.3 | 6392 | 52 | 0 | 7 |
| 136 | 42.8 | 6392 | 53 | 0 | 6 |
| 137 | 42.3 | 6392 | 53 | 0 | 6 |
| 138 | 41.7 | 6392 | 54 | 0 | 5 |
| 139 | 41.2 | 6392 | 55 | 0 | 5 |
| 140 | 40.6 | 6392 | 55 | 0 | 4 |
| 141 | 40.1 | 6392 | 56 | 0 | 4 |
| 142 | 39.5 | 6392 | 56 | 0 | 4 |
| 143 | 38.9 | 6392 | 57 | 0 | 3 |
| 144 | 38.3 | 6392 | 57 | 0 | 3 |
| 145 | 37.7 | 6392 | 58 | 0 | 3 |
| 146 | 37.1 | 6392 | 59 | 0 | 3 |
| 147 | 36.5 | 6392 | 59 | 0 | 2 |
| 148 | 35.8 | 6392 | 60 | 0 | 2 |
| 149 | 35.2 | 6392 | 60 | 0 | 2 |
| 150 | 34.5 | 6392 | 61 | 0 | 2 |
| 151 | 33.9 | 6392 | 61 | 0 | 2 |
| 152 | 33.2 | 6392 | 62 | 0 | 2 |
| 153 | 32.5 | 6392 | 63 | 0 | 2 |
| 154 | 31.8 | 6392 | 63 | 0 | 1 |
| 155 | 31.1 | 6392 | 64 | 0 | 1 |
| 156 | 30.4 | 6392 | 64 | 0 | 1 |
| 157 | 29.7 | 6392 | 65 | 0 | 1 |
| 158 | 28.9 | 6392 | 65 | 0 | 1 |
| 159 | 28.2 | 6392 | 66 | 0 | 1 |
| 160 | 27.4 | 6392 | 67 | 0 | 1 |
| 161 | 26.6 | 6392 | 67 | 0 | 1 |
| 162 | 25.8 | 6392 | 68 | 0 | 1 |
| 163 | 25.0 | 6392 | 68 | 0 | 1 |
| 164 | 24.2 | 6392 | 69 | 0 | 1 |
| 165 | 23.4 | 6392 | 69 | 0 | 1 |
| 166 | 22.6 | 6392 | 70 | 0 | 1 |
| 167 | 21.7 | 6392 | 71 | 0 | 1 |
| 168 | 20.9 | 6392 | 71 | 0 | 1 |
| 169 | 20.0 | 6392 | 72 | 0 | 1 |
| 170 | 19.2 | 6392 | 72 | 0 | 1 |
| 171 | 18.3 | 6392 | 73 | 0 | 1 |
| 172 | 17.4 | 6392 | 73 | 0 | 1 |
| 173 | 16.5 | 6392 | 74 | 0 | 1 |
| 174 | 15.6 | 6392 | 75 | 0 | 1 |
| 175 | 14.7 | 6392 | 75 | 0 | 1 |
| 176 | 13.8 | 6392 | 76 | 0 | 1 |
| 177 | 12.8 | 6392 | 76 | 0 | 1 |
| 178 | 11.9 | 6392 | 77 | 0 | 0 |
| 179 | 11.0 | 6392 | 77 | 0 | 0 |
| 180 | 10.0 | 6392 | 78 | 0 | 0 |
| 181 | 9.0 | 6392 | 79 | 0 | 0 |
| 182 | 8.1 | 6392 | 79 | 0 | 0 |
| 183 | 7.1 | 6392 | 80 | 0 | 0 |
| 184 | 6.1 | 6392 | 80 | 0 | 0 |
| 185 | 5.2 | 6392 | 81 | 0 | 0 |
| 186 | 4.2 | 6392 | 81 | 0 | 0 |
| 187 | 3.2 | 6392 | 82 | 0 | 0 |
| 188 | 2.2 | 6392 | 82 | 0 | 0 |
| 189 | 1.2 | 6392 | 83 | 0 | 0 |
| 190 | 0.3 | 6392 | 84 | 0 | 0 |
| 191 | −0.7 | 6392 | 84 | 0 | 0 |
| 192 | −1.7 | 6392 | 85 | 0 | 0 |
| 193 | −2.7 | 6392 | 85 | 0 | 0 |
| 194 | −3.7 | 6392 | 86 | 0 | 0 |
| 195 | −4.7 | 6392 | 86 | 0 | 0 |
| 196 | −5.7 | 6392 | 87 | 0 | 0 |
| 197 | −6.6 | 6392 | 88 | 0 | 0 |
| 198 | −7.6 | 6392 | 88 | 0 | 0 |
| 199 | −8.6 | 6392 | 89 | 0 | 0 |
| 200 | −9.6 | 6392 | 89 | 0 | 0 |
| 201 | −10.5 | 6392 | 90 | 0 | 0 |
| 202 | −11.5 | 6392 | 90 | 0 | 0 |
| 203 | −12.4 | 6392 | 91 | 0 | 0 |
| 204 | −13.4 | 6392 | 92 | 0 | 0 |
| 205 | −14.3 | 6392 | 92 | 5 | 3 |
| 206 | −15.2 | 6392 | 93 | 5 | 4 |
| 207 | −16.2 | 6392 | 93 | 5 | 4 |
| 208 | −17.1 | 6392 | 94 | 6 | 4 |

TABLE 2B-continued

| t s | Gamma deg | m kg | Range km | Lift N | Drag N |
|---|---|---|---|---|---|
| 209 | −18.0 | 6392 | 94 | 6 | 4 |
| 210 | −18.9 | 6392 | 95 | 6 | 4 |
| 211 | −19.8 | 6392 | 96 | 6 | 4 |
| 212 | −20.6 | 6392 | 96 | 6 | 4 |
| 213 | −21.5 | 6392 | 97 | 7 | 5 |
| 214 | −22.4 | 6392 | 97 | 7 | 5 |
| 215 | −23.2 | 6392 | 98 | 7 | 5 |
| 216 | −24.0 | 6392 | 98 | 8 | 5 |
| 217 | −24.9 | 6392 | 99 | 8 | 5 |
| 218 | −25.7 | 6392 | 100 | 9 | 6 |
| 219 | −26.5 | 6392 | 100 | 9 | 6 |
| 220 | −27.3 | 6392 | 101 | 9 | 6 |
| 221 | −28.1 | 6392 | 101 | 10 | 7 |
| 222 | −28.8 | 6392 | 102 | 11 | 7 |
| 223 | −29.6 | 6392 | 102 | 11 | 8 |
| 224 | −30.3 | 6392 | 103 | 12 | 8 |
| 225 | −31.1 | 6392 | 103 | 13 | 9 |
| 226 | −31.8 | 6392 | 104 | 14 | 9 |
| 227 | −32.5 | 6392 | 105 | 14 | 10 |
| 228 | −33.2 | 6392 | 105 | 15 | 10 |
| 229 | −33.9 | 6392 | 106 | 16 | 11 |
| 230 | −34.6 | 6392 | 106 | 18 | 12 |
| 231 | −35.3 | 6392 | 107 | 19 | 13 |
| 232 | −35.9 | 6392 | 107 | 20 | 14 |
| 233 | −36.6 | 6392 | 108 | 22 | 15 |
| 234 | −37.2 | 6392 | 109 | 24 | 16 |
| 235 | −37.9 | 6392 | 109 | 26 | 17 |
| 236 | −38.5 | 6392 | 110 | 28 | 19 |
| 237 | −39.1 | 6392 | 110 | 30 | 20 |
| 238 | −39.7 | 6392 | 111 | 33 | 22 |
| 239 | −40.3 | 6392 | 111 | 35 | 24 |
| 240 | −40.9 | 6392 | 112 | 38 | 26 |
| 241 | −41.4 | 6392 | 113 | 42 | 28 |
| 242 | −42.0 | 6392 | 113 | 46 | 31 |
| 243 | −42.5 | 6392 | 114 | 50 | 34 |
| 244 | −43.1 | 6392 | 114 | 55 | 37 |
| 245 | −43.6 | 6392 | 115 | 60 | 41 |
| 246 | −44.1 | 6392 | 115 | 66 | 45 |
| 247 | −44.6 | 6392 | 116 | 72 | 49 |
| 248 | −45.1 | 6392 | 116 | 80 | 54 |
| 249 | −45.6 | 6392 | 117 | 88 | 59 |
| 250 | −46.1 | 6392 | 118 | 97 | 66 |
| 251 | −46.6 | 6392 | 118 | 107 | 72 |
| 252 | −47.1 | 6392 | 119 | 118 | 80 |
| 253 | −47.5 | 6392 | 119 | 131 | 89 |
| 254 | −48.0 | 6392 | 120 | 146 | 99 |
| 255 | −48.4 | 6392 | 120 | 162 | 110 |
| 256 | −48.9 | 6392 | 121 | 180 | 122 |
| 257 | −49.3 | 6392 | 122 | 200 | 136 |
| 258 | −49.7 | 6392 | 122 | 224 | 151 |
| 259 | −50.1 | 6392 | 123 | 250 | 169 |
| 260 | −50.5 | 6392 | 123 | 279 | 189 |
| 261 | −50.9 | 6392 | 124 | 313 | 212 |
| 262 | −51.3 | 6392 | 124 | 351 | 238 |
| 263 | −51.7 | 6392 | 125 | 394 | 267 |
| 264 | −50.9 | 6345 | 125 | 440 | 298 |
| 265 | −50.0 | 6299 | 126 | 490 | 332 |
| 266 | −49.2 | 6253 | 127 | 546 | 370 |
| 267 | −48.4 | 6208 | 127 | 608 | 412 |
| 268 | −47.6 | 6163 | 128 | 676 | 458 |
| 269 | −46.8 | 6118 | 129 | 750 | 508 |
| 270 | −46.1 | 6074 | 129 | 832 | 564 |
| 271 | −45.3 | 6030 | 130 | 922 | 625 |
| 272 | −44.5 | 5986 | 130 | 1021 | 691 |
| 273 | −43.8 | 5942 | 131 | 1128 | 764 |
| 274 | −43.0 | 5899 | 132 | 1246 | 844 |
| 275 | −42.3 | 5856 | 133 | 1374 | 931 |
| 276 | −41.5 | 5814 | 133 | 1513 | 1025 |
| 277 | −40.8 | 5772 | 134 | 1665 | 1128 |
| 278 | −40.1 | 5730 | 135 | 1829 | 1239 |
| 279 | −39.3 | 5688 | 135 | 2007 | 1359 |
| 280 | −38.6 | 5647 | 136 | 2199 | 1490 |
| 281 | −37.9 | 5606 | 137 | 2406 | 1630 |
| 282 | −37.2 | 5565 | 138 | 2630 | 1781 |
| 283 | −36.5 | 5525 | 138 | 2870 | 1944 |
| 284 | −35.8 | 5484 | 139 | 3127 | 2118 |
| 285 | −35.1 | 5445 | 140 | 3402 | 2305 |
| 286 | −34.4 | 5405 | 141 | 3696 | 2504 |
| 287 | −33.7 | 5366 | 142 | 4010 | 2716 |
| 288 | −33.0 | 5327 | 142 | 4343 | 2942 |
| 289 | −32.3 | 5288 | 143 | 4697 | 3181 |
| 290 | −31.6 | 5250 | 144 | 5071 | 3434 |
| 291 | −30.9 | 5211 | 145 | 5465 | 3702 |
| 292 | −30.2 | 5174 | 146 | 5881 | 3983 |
| 293 | −29.5 | 5136 | 147 | 6318 | 4279 |
| 294 | −28.8 | 5099 | 148 | 6775 | 4589 |
| 295 | −28.1 | 5062 | 148 | 7252 | 4912 |
| 296 | −27.4 | 5025 | 149 | 7748 | 5248 |
| 297 | −27.8 | 5025 | 150 | 8320 | 5636 |
| 298 | −28.2 | 5025 | 151 | 8944 | 6058 |
| 299 | −28.6 | 5025 | 152 | 9625 | 6519 |
| 300 | −29.0 | 5025 | 153 | 10368 | 7022 |
| 301 | −29.4 | 5025 | 154 | 11179 | 7572 |
| 302 | −29.8 | 5025 | 155 | 12064 | 8171 |
| 303 | −30.1 | 5025 | 155 | 13030 | 8825 |
| 304 | −30.4 | 5025 | 156 | 14084 | 9540 |
| 305 | −30.8 | 5025 | 157 | 15236 | 10320 |
| 306 | −31.1 | 5025 | 158 | 16493 | 11171 |
| 307 | −31.3 | 5025 | 159 | 17864 | 12100 |
| 308 | −31.6 | 5025 | 160 | 19359 | 13113 |
| 309 | −31.9 | 5025 | 161 | 20989 | 14217 |
| 310 | −32.1 | 5025 | 162 | 22765 | 15419 |
| 311 | −32.3 | 5025 | 162 | 24697 | 16728 |
| 312 | −32.5 | 5025 | 163 | 26797 | 18151 |
| 313 | −32.6 | 5025 | 164 | 29078 | 19695 |
| 314 | −32.8 | 5025 | 165 | 31550 | 21370 |
| 315 | −32.9 | 5025 | 166 | 34224 | 23181 |
| 316 | −33.0 | 5025 | 167 | 37113 | 25138 |
| 317 | −33.0 | 5025 | 168 | 40225 | 27246 |
| 318 | −33.0 | 5025 | 169 | 43569 | 29511 |
| 319 | −33.0 | 5025 | 169 | 47152 | 31937 |
| 320 | −32.9 | 5025 | 170 | 50976 | 54528 |
| 321 | −32.8 | 5025 | 171 | 55043 | 37282 |
| 322 | −32.7 | 5025 | 172 | 59349 | 40199 |
| 323 | −32.5 | 5025 | 173 | 63886 | 43272 |
| 324 | −32.2 | 5025 | 174 | 68641 | 46493 |
| 325 | −31.9 | 5025 | 175 | 73594 | 49848 |
| 326 | −31.6 | 5025 | 176 | 78718 | 53318 |
| 327 | −31.2 | 5025 | 176 | 78381 | 56882 |
| 328 | −30.8 | 5025 | 177 | 82547 | 43656 |
| 329 | −30.3 | 5025 | 178 | 82651 | 46614 |
| 330 | −29.9 | 5025 | 179 | 82944 | 49644 |
| 331 | −29.4 | 5025 | 180 | 82816 | 52731 |
| 332 | −28.9 | 5025 | 181 | 82460 | 55857 |
| 333 | −28.5 | 5025 | 182 | 81875 | 59000 |
| 334 | −28.1 | 5025 | 182 | 81058 | 62140 |
| 335 | −27.6 | 5025 | 183 | 80013 | 65254 |
| 336 | −27.2 | 5025 | 184 | 82097 | 47908 |
| 337 | −26.7 | 5025 | 185 | 84698 | 50434 |
| 338 | −26.2 | 5025 | 186 | 84493 | 52960 |
| 339 | −25.8 | 5025 | 187 | 84063 | 55464 |
| 340 | −25.3 | 5025 | 188 | 86923 | 39559 |
| 341 | −24.8 | 5025 | 188 | 86689 | 41529 |
| 342 | −24.3 | 5025 | 189 | 86254 | 43496 |
| 343 | −23.8 | 5025 | 190 | 85619 | 45448 |
| 344 | −23.3 | 5025 | 191 | 84785 | 47374 |
| 345 | −22.8 | 5025 | 192 | 83759 | 49264 |
| 346 | −22.3 | 5025 | 193 | 82548 | 51107 |
| 347 | −21.8 | 5025 | 194 | 81160 | 52892 |
| 348 | −21.4 | 5025 | 194 | 82960 | 37069 |
| 349 | −20.9 | 5025 | 195 | 85269 | 38485 |
| 350 | −20.4 | 5025 | 196 | 87467 | 39876 |
| 351 | −19.9 | 5025 | 197 | 89534 | 41231 |
| 352 | −19.3 | 5025 | 198 | 89605 | 42540 |
| 353 | −18.8 | 5025 | 199 | 89476 | 43792 |
| 354 | −18.2 | 5025 | 199 | 89148 | 44981 |
| 355 | −17.6 | 5025 | 200 | 88624 | 46100 |
| 356 | −17.1 | 5025 | 201 | 87908 | 47142 |
| 357 | −16.5 | 5025 | 202 | 87457 | 48102 |
| 358 | −16.0 | 5025 | 203 | 86823 | 48978 |
| 359 | −15.5 | 5025 | 203 | 86012 | 49765 |
| 360 | −14.9 | 5025 | 204 | 86341 | 50460 |

TABLE 2B-continued

| t s | Gamma deg | m kg | Range km | Lift N | Drag N |
|---|---|---|---|---|---|
| 361 | −14.4 | 5025 | 205 | 91740 | 36809 |
| 362 | −13.8 | 5025 | 206 | 92364 | 37434 |
| 363 | −13.2 | 5025 | 207 | 92807 | 37994 |
| 364 | −12.5 | 5025 | 207 | 93067 | 38485 |
| 365 | −11.9 | 5025 | 208 | 93143 | 38905 |
| 366 | −11.3 | 5025 | 209 | 93036 | 39253 |
| 367 | −10.6 | 5025 | 210 | 92748 | 39527 |
| 368 | −10.0 | 5025 | 211 | 92285 | 39727 |
| 369 | −9.3 | 5025 | 211 | 92578 | 39853 |
| 370 | −8.7 | 5025 | 212 | 92703 | 39907 |
| 371 | −8.0 | 5025 | 213 | 92660 | 39889 |
| 372 | −7.4 | 5025 | 214 | 92454 | 39800 |
| 373 | −6.7 | 5025 | 214 | 92088 | 39642 |
| 374 | −6.1 | 5025 | 215 | 91568 | 39418 |
| 375 | −5.4 | 5025 | 216 | 90901 | 39131 |
| 376 | −4.8 | 5025 | 217 | 90094 | 38784 |
| 377 | −4.1 | 5025 | 217 | 90941 | 38381 |
| 378 | −3.5 | 5025 | 218 | 91659 | 37925 |
| 379 | −2.8 | 5025 | 219 | 92247 | 37420 |

TABLE 2C

| t s | rho kg/m3 | Thrust N | del h m | del v m/s | del gam deg | alpha deg |
|---|---|---|---|---|---|---|
| 0 | 0.14812 | 0.0 | 41 | −3 | 0.3 | 10.0 |
| 1 | 0.14727 | 0.0 | 42 | −3 | 0.2 | 10.0 |
| 2 | 0.14640 | 0.0 | 42 | −3 | 0.2 | 10.0 |
| 3 | 0.14554 | 0.0 | 42 | −3 | 0.1 | 10.0 |
| 4 | 0.14467 | 0.0 | 42 | −3 | 0.0 | 10.0 |
| 5 | 0.14382 | 130326.3 | 42 | 8 | 1.2 | 10.0 |
| 6 | 0.14298 | 130839.2 | 48 | 8 | 1.4 | 10.0 |
| 7 | 0.14201 | 131329.8 | 55 | 7 | 1.6 | 10.0 |
| 8 | 0.14091 | 131785.5 | 64 | 7 | 1.8 | 10.0 |
| 9 | 0.13965 | 129921.5 | 73 | 7 | 1.5 | 10.0 |
| 10 | 0.13822 | 130178.6 | 81 | 7 | 1.6 | 10.0 |
| 11 | 0.13665 | 130387.8 | 90 | 6 | 1.7 | 10.0 |
| 12 | 0.13492 | 128350.2 | 100 | 6 | 1.4 | 10.0 |
| 13 | 0.13303 | 128380.7 | 108 | 6 | 1.4 | 10.0 |
| 14 | 0.13101 | 128363.0 | 117 | 6 | 1.5 | 10.0 |
| 15 | 0.12886 | 128292.3 | 126 | 5 | 1.6 | 10.0 |
| 16 | 0.12659 | 128164.6 | 136 | 5 | 1.7 | 10.0 |
| 17 | 0.12418 | 127976.7 | 146 | 5 | 1.7 | 10.0 |
| 18 | 0.12165 | 127726.1 | 156 | 5 | 1.8 | 10.0 |
| 19 | 0.11901 | 127411.5 | 167 | 4 | 1.8 | 10.0 |
| 20 | 0.11624 | 127032.3 | 177 | 4 | 1.8 | 10.0 |
| 21 | 0.11338 | 126589.0 | 188 | 4 | 1.9 | 10.0 |
| 22 | 0.11042 | 126083.0 | 198 | 4 | 1.9 | 10.0 |
| 23 | 0.10738 | 125516.7 | 209 | 3 | 1.9 | 10.0 |
| 24 | 0.10427 | 124893.1 | 219 | 3 | 1.9 | 10.0 |
| 25 | 0.10110 | 124216.8 | 229 | 3 | 1.9 | 10.0 |
| 26 | 0.09789 | 123489.8 | 239 | 3 | 1.9 | 10.0 |
| 27 | 0.09466 | 122719.3 | 248 | 2 | 1.9 | 10.0 |
| 28 | 0.09141 | 121909.5 | 257 | 2 | 1.9 | 10.0 |
| 29 | 0.08815 | 121065.6 | 266 | 2 | 1.8 | 10.0 |
| 30 | 0.08491 | 150000.0 | 274 | 5 | 1.5 | 10.0 |
| 31 | 0.08170 | 151500.0 | 283 | 5 | 1.5 | 10.0 |
| 32 | 0.07850 | 153015.0 | 292 | 5 | 1.5 | 10.0 |
| 33 | 0.07533 | 200000.0 | 302 | 10 | 0.4 | 8.0 |
| 34 | 0.07220 | 202000.0 | 311 | 10 | 0.3 | 6.0 |
| 35 | 0.06911 | 204020.0 | 320 | 10 | 0.2 | 4.0 |
| 36 | 0.06606 | 206060.2 | 330 | 11 | 0.1 | 2.0 |
| 37 | 0.06306 | 208120.8 | 340 | 11 | 0.1 | 2.0 |
| 38 | 0.06011 | 206247.7 | 349 | 11 | 0.1 | 2.0 |
| 39 | 0.05723 | 204391.5 | 359 | 11 | 0.2 | 4.0 |
| 40 | 0.05440 | 202552.0 | 370 | 11 | 0.1 | 2.0 |
| 41 | 0.05164 | 200729.0 | 380 | 11 | 0.1 | 2.0 |
| 42 | 0.04895 | 198922.4 | 389 | 11 | 0.1 | 2.0 |
| 43 | 0.04634 | 197132.1 | 399 | 11 | 0.1 | 2.0 |
| 44 | 0.04381 | 195357.9 | 409 | 11 | 0.1 | 2.0 |
| 45 | 0.04135 | 193599.7 | 419 | 11 | 0.1 | 2.0 |
| 46 | 0.03898 | 191857.3 | 429 | 11 | 0.1 | 2.0 |
| 47 | 0.03670 | 190130.6 | 439 | 11 | −0.2 | 2.0 |

TABLE 2C-continued

| t s | rho kg/m3 | Thrust N | del h m | del v m/s | del gam deg | alpha deg |
|---|---|---|---|---|---|---|
| 48 | 0.03450 | 188419.4 | 447 | 11 | −0.2 | 2.0 |
| 49 | 0.03239 | 186723.7 | 456 | 11 | −0.2 | 2.0 |
| 50 | 0.03038 | 185043.1 | 464 | 11 | −0.2 | 2.0 |
| 51 | 0.02845 | 183562.8 | 472 | 11 | −0.2 | 2.0 |
| 52 | 0.02662 | 182094.3 | 481 | 11 | −0.2 | 2.0 |
| 53 | 0.02488 | 180637.5 | 489 | 11 | 0.0 | 2.0 |
| 54 | 0.02322 | 179192.4 | 498 | 11 | 0.0 | 2.0 |
| 55 | 0.02165 | 177758.9 | 506 | 11 | 0.1 | 5.0 |
| 56 | 0.02015 | 176336.8 | 518 | 11 | 0.1 | 5.0 |
| 57 | 0.01874 | 174926.1 | 527 | 11 | 0.1 | 5.0 |
| 58 | 0.01740 | 173526.7 | 537 | 11 | 0.1 | 5.0 |
| 59 | 0.01613 | 172138.5 | 547 | 11 | 0.1 | 5.0 |
| 60 | 0.01493 | 170589.3 | 556 | 11 | 0.1 | 5.0 |
| 61 | 0.01381 | 169054.0 | 566 | 11 | 0.0 | 5.0 |
| 62 | 0.01275 | 167532.5 | 575 | 11 | 0.0 | 5.0 |
| 63 | 0.01176 | 166024.7 | 585 | 11 | 0.0 | 5.0 |
| 64 | 0.01083 | 164530.5 | 594 | 11 | 0.0 | 5.0 |
| 65 | 0.00996 | 163049.7 | 603 | 11 | 0.1 | 10.0 |
| 66 | 0.00915 | 161582.2 | 613 | 11 | 0.1 | 10.0 |
| 67 | 0.00839 | 160128.0 | 623 | 11 | 0.1 | 10.0 |
| 68 | 0.00768 | 158686.8 | 633 | 10 | 0.1 | 10.0 |
| 69 | 0.00703 | 157258.7 | 643 | 10 | 0.1 | 10.0 |
| 70 | 0.00642 | 155843.3 | 652 | 10 | 0.1 | 10.0 |
| 71 | 0.00586 | 154440.8 | 662 | 10 | 0.1 | 10.0 |
| 72 | 0.00534 | 153050.8 | 671 | 10 | 0.0 | 10.0 |
| 73 | 0.00485 | 151673.3 | 681 | 10 | 0.0 | 10.0 |
| 74 | 0.00441 | 150459.9 | 690 | 10 | 0.0 | 10.0 |
| 75 | 0.00400 | 149406.7 | 699 | 10 | 0.0 | 10.0 |
| 76 | 0.00363 | 148360.9 | 708 | 11 | 0.0 | 10.0 |
| 77 | 0.00328 | 147322.3 | 716 | 11 | 0.0 | 10.0 |
| 78 | 0.00297 | 146231.1 | 727 | 11 | −0.0 | 10.0 |
| 79 | 0.00268 | 145267.1 | 736 | 11 | −0.1 | 10.0 |
| 80 | 0.00241 | 144250.2 | 745 | 11 | −0.1 | 10.0 |
| 81 | 0.00217 | 143240.4 | 753 | 11 | −0.1 | 10.0 |
| 82 | 0.00196 | 142237.7 | 762 | 11 | −0.1 | 10.0 |
| 83 | 0.00176 | 141242.1 | 771 | 11 | −0.2 | 5.0 |
| 84 | 0.00158 | 140253.4 | 779 | 11 | −0.2 | 5.0 |
| 85 | 0.00141 | 139271.6 | 787 | 11 | −0.2 | 5.0 |
| 86 | 0.00126 | 138296.7 | 795 | 11 | −0.2 | 5.0 |
| 87 | 0.00113 | 137328.6 | 803 | 11 | −0.2 | 5.0 |
| 88 | 0.00101 | 136367.3 | 812 | 11 | −0.2 | 5.0 |
| 89 | 0.00090 | 135412.8 | 820 | 11 | −0.2 | 5.0 |
| 90 | 0.00080 | 134464.9 | 828 | 11 | −0.2 | 5.0 |
| 91 | 0.00071 | 133523.6 | 836 | 11 | −0.2 | 5.0 |
| 92 | 0.00063 | 132589.0 | 844 | 11 | −0.2 | 5.0 |
| 93 | 0.00056 | 131660.8 | 852 | 11 | −0.2 | 5.0 |
| 94 | 0.00050 | 130739.2 | 860 | 11 | −0.2 | 5.0 |
| 95 | 0.00044 | 104591.4 | 868 | 7 | −0.2 | 5.0 |
| 96 | 0.00039 | 83673.1 | 872 | 4 | −0.2 | 5.0 |
| 97 | 0.00035 | 66938.5 | 874 | 2 | −0.2 | 5.0 |
| 98 | 0.00031 | 53550.8 | 873 | −0 | −0.2 | 5.0 |
| 99 | 0.00027 | 42840.6 | 871 | −2 | −0.3 | 5.0 |
| 100 | 0.00024 | 34272.5 | 867 | −3 | −0.3 | 5.0 |
| 101 | 0.00021 | 27418.0 | 862 | −4 | −0.3 | 5.0 |
| 102 | 0.00019 | 21934.4 | 856 | −5 | −0.3 | 5.0 |
| 103 | 0.00017 | 17547.5 | 849 | −5 | −0.3 | 5.0 |
| 104 | 0.00015 | 14038.0 | 842 | −6 | −0.3 | 5.0 |
| 105 | 0.00013 | 0.0 | 834 | −8 | −0.3 | 5.0 |
| 106 | 0.00012 | 0.0 | 824 | −8 | −0.3 | 5.0 |
| 107 | 0.00010 | 0.0 | 814 | −8 | −0.3 | 5.0 |
| 108 | 0.00009 | 0.0 | 804 | −8 | −0.3 | 5.0 |
| 109 | 0.00008 | 0.0 | 795 | −8 | −0.3 | 5.0 |
| 110 | 0.00007 | 0.0 | 785 | −8 | −0.3 | 5.0 |
| 111 | 0.00007 | 0.0 | 775 | −8 | −0.3 | 5.0 |
| 112 | 0.00006 | 0.0 | 765 | −8 | −0.4 | 5.0 |
| 113 | 0.00005 | 0.0 | 756 | −8 | −0.4 | 5.0 |
| 114 | 0.00005 | 0.0 | 746 | −8 | −0.4 | 5.0 |
| 115 | 0.00004 | 0.0 | 736 | −8 | −0.4 | 5.0 |
| 116 | 0.00004 | 0.0 | 726 | −8 | −0.4 | 0.0 |
| 117 | 0.00004 | 0.0 | 716 | −8 | −0.4 | 0.0 |
| 118 | 0.00003 | 0.0 | 707 | −8 | −0.4 | 0.0 |
| 119 | 0.00003 | 0.0 | 697 | −8 | −0.4 | 0.0 |
| 120 | 0.00003 | 0.0 | 687 | −8 | −0.4 | 0.0 |
| 121 | 0.00002 | 0.0 | 677 | −7 | −0.4 | 0.0 |
| 122 | 0.00002 | 0.0 | 667 | −7 | −0.4 | 0.0 |
| 123 | 0.00002 | 0.0 | 658 | −7 | −0.4 | 0.0 |

TABLE 2C-continued

| t s | rho kg/m3 | Thrust N | del h m | del v m/s | del gam deg | alpha deg |
|---|---|---|---|---|---|---|
| 124 | 0.00002 | 0.0 | 648 | −7 | −0.4 | 0.0 |
| 125 | 0.00002 | 0.0 | 638 | −7 | −0.4 | 0.0 |
| 126 | 0.00001 | 0.0 | 628 | −7 | −0.4 | 0.0 |
| 127 | 0.00001 | 0.0 | 619 | −7 | −0.5 | 0.0 |
| 128 | 0.00001 | 0.0 | 609 | −7 | −0.5 | 0.0 |
| 129 | 0.00001 | 0.0 | 599 | −7 | −0.5 | 0.0 |
| 130 | 0.00001 | 0.0 | 589 | −7 | −0.5 | 0.0 |
| 131 | 0.00001 | 0.0 | 579 | −7 | −0.5 | 0.0 |
| 132 | 0.00001 | 0.0 | 570 | −7 | −0.5 | 0.0 |
| 133 | 0.00001 | 0.0 | 560 | −7 | −0.5 | 0.0 |
| 134 | 0.00001 | 0.0 | 550 | −7 | −0.5 | 0.0 |
| 135 | 0.00001 | 0.0 | 540 | −7 | −0.5 | 0.0 |
| 136 | 0.00001 | 0.0 | 531 | −7 | −0.5 | 0.0 |
| 137 | 0.00001 | 0.0 | 521 | −7 | −0.5 | 0.0 |
| 138 | 0.00001 | 0.0 | 511 | −7 | −0.5 | 0.0 |
| 139 | 0.00001 | 0.0 | 501 | −6 | −0.6 | 0.0 |
| 140 | 0.00000 | 0.0 | 491 | −6 | −0.6 | 0.0 |
| 141 | 0.00000 | 0.0 | 482 | −6 | −0.6 | 0.0 |
| 142 | 0.00000 | 0.0 | 472 | −6 | −0.6 | 0.0 |
| 143 | 0.00000 | 0.0 | 462 | −6 | −0.6 | 0.0 |
| 144 | 0.00000 | 0.0 | 452 | −6 | −0.6 | 0.0 |
| 145 | 0.00000 | 0.0 | 443 | −6 | −0.6 | 0.0 |
| 146 | 0.00000 | 0.0 | 433 | −6 | −0.6 | 0.0 |
| 147 | 0.00000 | 0.0 | 423 | −6 | −0.6 | 0.0 |
| 148 | 0.00000 | 0.0 | 413 | −6 | −0.6 | 0.0 |
| 149 | 0.00000 | 0.0 | 403 | −6 | −0.7 | 0.0 |
| 150 | 0.00000 | 0.0 | 394 | −6 | −0.7 | 0.0 |
| 151 | 0.00000 | 0.0 | 384 | −5 | −0.7 | 0.0 |
| 152 | 0.00000 | 0.0 | 374 | −5 | −0.7 | 0.0 |
| 153 | 0.00000 | 0.0 | 364 | −5 | −0.7 | 0.0 |
| 154 | 0.00000 | 0.0 | 355 | −5 | −0.7 | 0.0 |
| 155 | 0.00000 | 0.0 | 345 | −5 | −0.7 | 0.0 |
| 156 | 0.00000 | 0.0 | 335 | −5 | −0.7 | 0.0 |
| 157 | 0.00000 | 0.0 | 325 | −5 | −0.7 | 0.0 |
| 158 | 0.00000 | 0.0 | 316 | −5 | −0.8 | 0.0 |
| 159 | 0.00000 | 0.0 | 306 | −5 | −0.8 | 0.0 |
| 160 | 0.00000 | 0.0 | 296 | −5 | −0.8 | 0.0 |
| 161 | 0.00000 | 0.0 | 286 | −4 | −0.8 | 0.0 |
| 162 | 0.00000 | 0.0 | 276 | −4 | −0.8 | 0.0 |
| 163 | 0.00000 | 0.0 | 267 | −4 | −0.8 | 0.0 |
| 164 | 0.00000 | 0.0 | 257 | −4 | −0.8 | 0.0 |
| 165 | 0.00000 | 0.0 | 247 | −4 | −0.8 | 0.0 |
| 166 | 0.00000 | 0.0 | 237 | −4 | −0.8 | 0.0 |
| 167 | 0.00000 | 0.0 | 228 | −4 | −0.8 | 0.0 |
| 168 | 0.00000 | 0.0 | 218 | −3 | −0.9 | 0.0 |
| 169 | 0.00000 | 0.0 | 208 | −3 | −0.9 | 0.0 |
| 170 | 0.00000 | 0.0 | 198 | −3 | −0.9 | 0.0 |
| 171 | 0.00000 | 0.0 | 188 | −3 | −0.9 | 0.0 |
| 172 | 0.00000 | 0.0 | 179 | −3 | −0.9 | 0.0 |
| 173 | 0.00000 | 0.0 | 169 | −3 | −0.9 | 0.0 |
| 174 | 0.00000 | 0.0 | 159 | −3 | −0.9 | 0.0 |
| 175 | 0.00000 | 0.0 | 149 | −2 | −0.9 | 0.0 |
| 176 | 0.00000 | 0.0 | 140 | −2 | −0.9 | 0.0 |
| 177 | 0.00000 | 0.0 | 130 | −2 | −0.9 | 0.0 |
| 178 | 0.00000 | 0.0 | 120 | −2 | −0.9 | 0.0 |
| 179 | 0.00000 | 0.0 | 110 | −2 | −1.0 | 0.0 |
| 180 | 0.00000 | 0.0 | 100 | −2 | −1.0 | 0.0 |
| 181 | 0.00000 | 0.0 | 91 | −2 | −1.0 | 0.0 |
| 182 | 0.00000 | 0.0 | 81 | −1 | −1.0 | 0.0 |
| 183 | 0.00000 | 0.0 | 71 | −1 | −1.0 | 0.0 |
| 184 | 0.00000 | 0.0 | 61 | −1 | −1.0 | 0.0 |
| 185 | 0.00000 | 0.0 | 51 | −1 | −1.0 | 0.0 |
| 186 | 0.00000 | 0.0 | 42 | −1 | −1.0 | 0.0 |
| 187 | 0.00000 | 0.0 | 32 | −1 | −1.0 | 0.0 |
| 188 | 0.00000 | 0.0 | 22 | −0 | −1.0 | 0.0 |
| 189 | 0.00000 | 0.0 | 12 | −0 | −1.0 | 0.0 |
| 190 | 0.00000 | 0.0 | 3 | −0 | −1.0 | 0.0 |
| 191 | 0.00000 | 0.0 | −7 | 0 | −1.0 | 0.0 |
| 192 | 0.00000 | 0.0 | −17 | 0 | −1.0 | 0.0 |
| 193 | 0.00000 | 0.0 | −27 | 0 | −1.0 | 0.0 |
| 194 | 0.00000 | 0.0 | −37 | 1 | −1.0 | 0.0 |
| 195 | 0.00000 | 0.0 | −47 | 1 | −1.0 | 0.0 |
| 196 | 0.00000 | 0.0 | −56 | 1 | −1.0 | 0.0 |
| 197 | 0.00000 | 0.0 | −66 | 1 | −1.0 | 0.0 |
| 198 | 0.00000 | 0.0 | −76 | 1 | −1.0 | 0.0 |
| 199 | 0.00000 | 0.0 | −86 | 1 | −1.0 | 0.0 |
| 200 | 0.00000 | 0.0 | −96 | 2 | −1.0 | 0.0 |
| 201 | 0.00000 | 0.0 | −105 | 2 | −1.0 | 0.0 |
| 202 | 0.00000 | 0.0 | −115 | 2 | −1.0 | 0.0 |
| 203 | 0.00000 | 0.0 | −125 | 2 | −0.9 | 0.0 |
| 204 | 0.00000 | 0.0 | −135 | 2 | −0.9 | 0.0 |
| 205 | 0.00000 | 0.0 | −145 | 2 | −0.9 | 30.0 |
| 206 | 0.00000 | 0.0 | −154 | 3 | −0.9 | 30.0 |
| 207 | 0.00000 | 0.0 | −164 | 3 | −0.9 | 30.0 |
| 208 | 0.00000 | 0.0 | −174 | 3 | −0.9 | 30.0 |
| 209 | 0.00000 | 0.0 | −184 | 3 | −0.9 | 30.0 |
| 210 | 0.00000 | 0.0 | −194 | 3 | −0.9 | 30.0 |
| 211 | 0.00000 | 0.0 | −204 | 3 | −0.9 | 30.0 |
| 212 | 0.00000 | 0.0 | −213 | 3 | −0.9 | 30.0 |
| 213 | 0.00000 | 0.0 | −223 | 4 | −0.9 | 30.0 |
| 214 | 0.00000 | 0.0 | −233 | 4 | −0.8 | 30.0 |
| 215 | 0.00000 | 0.0 | −243 | 4 | −0.8 | 30.0 |
| 216 | 0.00000 | 0.0 | −253 | 4 | −0.8 | 30.0 |
| 217 | 0.00000 | 0.0 | −262 | 4 | −0.8 | 30.0 |
| 218 | 0.00000 | 0.0 | −272 | 4 | −0.8 | 30.0 |
| 219 | 0.00000 | 0.0 | −282 | 4 | −0.8 | 30.0 |
| 220 | 0.00000 | 0.0 | −292 | 4 | −0.8 | 30.0 |
| 221 | 0.00000 | 0.0 | −302 | 5 | −0.8 | 30.0 |
| 222 | 0.00000 | 0.0 | −312 | 5 | −0.8 | 30.0 |
| 223 | 0.00000 | 0.0 | −321 | 5 | −0.8 | 30.0 |
| 224 | 0.00000 | 0.0 | −331 | 5 | −0.7 | 30.0 |
| 225 | 0.00000 | 0.0 | −341 | 5 | −0.7 | 30.0 |
| 226 | 0.00000 | 0.0 | −351 | 5 | −0.7 | 30.0 |
| 227 | 0.00000 | 0.0 | −361 | 5 | −0.7 | 30.0 |
| 228 | 0.00000 | 0.0 | −371 | 5 | −0.7 | 30.0 |
| 229 | 0.00000 | 0.0 | −380 | 5 | −0.7 | 30.0 |
| 230 | 0.00000 | 0.0 | −390 | 6 | −0.7 | 30.0 |
| 231 | 0.00000 | 0.0 | −400 | 6 | −0.7 | 30.0 |
| 232 | 0.00000 | 0.0 | −410 | 6 | −0.7 | 30.0 |
| 233 | 0.00000 | 0.0 | −420 | 6 | −0.6 | 30.0 |
| 234 | 0.00000 | 0.0 | −429 | 6 | −0.6 | 30.0 |
| 235 | 0.00000 | 0.0 | −439 | 6 | −0.6 | 30.0 |
| 236 | 0.00000 | 0.0 | −449 | 6 | −0.6 | 30.0 |
| 237 | 0.00000 | 0.0 | −459 | 6 | −0.6 | 30.0 |
| 238 | 0.00000 | 0.0 | −469 | 6 | −0.6 | 30.0 |
| 239 | 0.00000 | 0.0 | −479 | 6 | −0.6 | 30.0 |
| 240 | 0.00000 | 0.0 | −488 | 6 | −0.6 | 30.0 |
| 241 | 0.00000 | 0.0 | −498 | 6 | −0.6 | 30.0 |
| 242 | 0.00001 | 0.0 | −508 | 7 | −0.5 | 30.0 |
| 243 | 0.00001 | 0.0 | −518 | 7 | −0.5 | 30.0 |
| 244 | 0.00001 | 0.0 | −528 | 7 | −0.5 | 100.0 |
| 245 | 0.00001 | 0.0 | −537 | 7 | −0.5 | 100.0 |
| 246 | 0.00001 | 0.0 | −547 | 7 | −0.5 | 100.0 |
| 247 | 0.00001 | 0.0 | −557 | 7 | −0.5 | 100.0 |
| 248 | 0.00001 | 0.0 | −567 | 7 | −0.5 | 100.0 |
| 249 | 0.00001 | 0.0 | −577 | 7 | −0.5 | 100.0 |
| 250 | 0.00001 | 0.0 | −587 | 7 | −0.5 | 100.0 |
| 251 | 0.00001 | 0.0 | −596 | 7 | −0.5 | 100.0 |
| 252 | 0.00001 | 0.0 | −606 | 7 | −0.5 | 100.0 |
| 253 | 0.00001 | 0.0 | −616 | 7 | −0.5 | 100.0 |
| 254 | 0.00001 | 0.0 | −626 | 7 | −0.4 | 100.0 |
| 255 | 0.00001 | 0.0 | −636 | 7 | −0.4 | 100.0 |
| 256 | 0.00002 | 0.0 | −645 | 7 | −0.4 | 100.0 |
| 257 | 0.00002 | 0.0 | −655 | 7 | −0.4 | 100.0 |
| 258 | 0.00002 | 0.0 | −665 | 7 | −0.4 | 100.0 |
| 259 | 0.00002 | 0.0 | −675 | 7 | −0.4 | 100.0 |
| 260 | 0.00002 | 0.0 | −684 | 8 | −0.4 | 100.0 |
| 261 | 0.00003 | 0.0 | −694 | 8 | −0.4 | 100.0 |
| 262 | 0.00003 | 0.0 | −704 | 8 | −0.4 | 100.0 |
| 263 | 0.00003 | 125368.5 | −714 | 4 | 0.8 | 100.0 |
| 264 | 0.00003 | 124457.7 | −709 | 4 | 0.8 | 100.0 |
| 265 | 0.00004 | 123553.6 | −703 | 4 | 0.8 | 100.0 |
| 266 | 0.00004 | 122656.1 | −698 | 4 | 0.8 | 100.0 |
| 267 | 0.00005 | 121765.0 | −692 | 4 | 0.8 | 100.0 |
| 268 | 0.00005 | 120880.5 | −687 | 4 | 0.8 | 100.0 |
| 269 | 0.00006 | 120002.4 | −681 | 4 | 0.8 | 100.0 |
| 270 | 0.00006 | 119130.6 | −675 | 4 | 0.8 | 100.0 |
| 271 | 0.00007 | 118265.2 | −668 | 3 | 0.8 | 100.0 |
| 272 | 0.00007 | 117406.1 | −662 | 3 | 0.8 | 100.0 |
| 273 | 0.00008 | 116553.2 | −655 | 3 | 0.8 | 100.0 |
| 274 | 0.00009 | 115706.5 | −648 | 3 | 0.7 | 100.0 |
| 275 | 0.00010 | 114865.9 | −641 | 3 | 0.7 | 100.0 |

TABLE 2C-continued

| t s | rho kg/m3 | Thrust N | del h m | del v m/s | del gam deg | alpha deg |
|---|---|---|---|---|---|---|
| 276 | 0.00011 | 114031.5 | −634 | 3 | 0.7 | 100.0 |
| 277 | 0.00012 | 113203.1 | −627 | 3 | 0.7 | 100.0 |
| 278 | 0.00013 | 112380.8 | −619 | 3 | 0.7 | 100.0 |
| 279 | 0.00014 | 111564.4 | −612 | 3 | 0.7 | 100.0 |
| 280 | 0.00015 | 110753.9 | −604 | 2 | 0.7 | 100.0 |
| 281 | 0.00016 | 109949.4 | −596 | 2 | 0.7 | 100.0 |
| 282 | 0.00018 | 109150.6 | −588 | 2 | 0.7 | 100.0 |
| 283 | 0.00019 | 108357.7 | −580 | 2 | 0.7 | 100.0 |
| 284 | 0.00021 | 107570.6 | −571 | 2 | 0.7 | 100.0 |
| 285 | 0.00023 | 106789.1 | −562 | 2 | 0.7 | 100.0 |
| 286 | 0.00025 | 106013.4 | −554 | 2 | 0.7 | 100.0 |
| 287 | 0.00027 | 105243.2 | −545 | 2 | 0.7 | 100.0 |
| 288 | 0.00029 | 104478.7 | −536 | 1 | 0.7 | 100.0 |
| 289 | 0.00031 | 103719.7 | −526 | 1 | 0.7 | 100.0 |
| 290 | 0.00033 | 102966.3 | −517 | 1 | 0.7 | 100.0 |
| 291 | 0.00036 | 102218.3 | −507 | 1 | 0.7 | 100.0 |
| 292 | 0.00039 | 101475.7 | −497 | 1 | 0.7 | 100.0 |
| 293 | 0.00041 | 100738.5 | −487 | 1 | 0.7 | 100.0 |
| 294 | 0.00044 | 100006.7 | −477 | 0 | 0.7 | 100.0 |
| 295 | 0.00047 | 99280.2 | −467 | 0 | 0.7 | 100.0 |
| 296 | 0.00051 | 0.0 | −456 | 3 | −0.4 | 95.0 |
| 297 | 0.00054 | 0.0 | −464 | 3 | −0.4 | 90.0 |
| 298 | 0.00058 | 0.0 | −472 | 3 | −0.4 | 85.0 |
| 299 | 0.00062 | 0.0 | −480 | 3 | −0.4 | 80.0 |
| 300 | 0.00066 | 0.0 | −487 | 3 | −0.4 | 75.0 |
| 301 | 0.00071 | 0.0 | −494 | 3 | −0.4 | 70.0 |
| 302 | 0.00076 | 0.0 | −502 | 3 | −0.3 | 65.0 |
| 303 | 0.00081 | 0.0 | −509 | 3 | −0.3 | 60.0 |
| 304 | 0.00087 | 0.0 | −515 | 3 | −0.3 | 55.0 |
| 305 | 0.00094 | 0.0 | −522 | 3 | −0.3 | 50.0 |
| 306 | 0.00101 | 0.0 | −528 | 3 | −0.3 | 45.0 |
| 307 | 0.00109 | 0.0 | −534 | 3 | −0.3 | 40.0 |
| 308 | 0.00117 | 0.0 | −539 | 3 | −0.3 | 35.0 |
| 309 | 0.00127 | 0.0 | −544 | 2 | −0.2 | 30.0 |
| 310 | 0.00137 | 0.0 | −549 | 2 | −0.2 | 30.0 |
| 311 | 0.00148 | 0.0 | −553 | 2 | −0.2 | 30.0 |
| 312 | 0.00160 | 0.0 | −557 | 2 | −0.2 | 30.0 |
| 313 | 0.00173 | 0.0 | −561 | 1 | −0.1 | 30.0 |
| 314 | 0.00187 | 0.0 | −563 | 1 | −0.1 | 30.0 |
| 315 | 0.00202 | 0.0 | −566 | 1 | 0.1 | 30.0 |
| 316 | 0.00219 | 0.0 | −567 | 0 | −0.0 | 30.0 |
| 317 | 0.00237 | 0.0 | −568 | −0 | −0.0 | 30.0 |
| 318 | 0.00257 | 0.0 | −568 | −1 | 0.0 | 30.0 |
| 319 | 0.00278 | 0.0 | −568 | −1 | 0.1 | 30.0 |
| 320 | 0.00302 | 0.0 | −566 | −2 | 0.1 | 30.0 |
| 321 | 0.00327 | 0.0 | −564 | −2 | 0.1 | 30.0 |
| 322 | 0.00354 | 0.0 | −560 | −3 | 0.2 | 30.0 |
| 323 | 0.00383 | 0.0 | −556 | −3 | 0.2 | 30.0 |
| 324 | 0.00414 | 0.0 | −550 | −4 | 0.3 | 30.0 |
| 325 | 0.00447 | 0.0 | −543 | −5 | 0.4 | 30.0 |
| 326 | 0.00483 | 0.0 | −536 | −5 | 0.4 | 30.0 |
| 327 | 0.00520 | 0.0 | −527 | −6 | 0.4 | 29.1 |
| 328 | 0.00561 | 0.0 | −517 | −4 | 0.5 | 28.2 |
| 329 | 0.00603 | 0.0 | −508 | −4 | 0.5 | 27.4 |
| 330 | 0.00648 | 0.0 | −499 | −5 | 0.5 | 26.6 |
| 331 | 0.00695 | 0.0 | −490 | −6 | 0.5 | 25.8 |
| 332 | 0.00744 | 0.0 | −480 | −6 | 0.5 | 25.0 |
| 333 | 0.00797 | 0.0 | −470 | −7 | 0.4 | 24.2 |
| 334 | 0.00851 | 0.0 | −460 | −8 | 0.4 | 23.5 |
| 335 | 0.00908 | 0.0 | −450 | −8 | 0.4 | 22.8 |
| 336 | 0.00967 | 0.0 | −440 | −5 | 0.5 | 22.1 |
| 337 | 0.01029 | 0.0 | −431 | −6 | 0.5 | 21.5 |
| 338 | 0.01094 | 0.0 | −421 | −6 | 0.5 | 20.8 |
| 339 | 0.01160 | 0.0 | −411 | −7 | 0.5 | 20.2 |
| 340 | 0.01230 | 0.0 | −401 | −4 | 0.5 | 19.6 |
| 341 | 0.01301 | 0.0 | −392 | −4 | 0.5 | 19.0 |
| 342 | 0.01375 | 0.0 | −382 | −5 | 0.5 | 18.4 |
| 343 | 0.01451 | 0.0 | −373 | −5 | 0.5 | 17.9 |
| 344 | 0.01529 | 0.0 | −364 | −6 | 0.5 | 17.3 |
| 345 | 0.01610 | 0.0 | −354 | −6 | 0.5 | 16.8 |
| 346 | 0.01692 | 0.0 | −345 | −6 | 0.5 | 16.3 |
| 347 | 0.01776 | 0.0 | −336 | −7 | 0.4 | 15.8 |
| 348 | 0.01862 | 0.0 | −327 | −4 | 0.5 | 15.3 |
| 349 | 0.01950 | 0.0 | −318 | −4 | 0.5 | 14.9 |
| 350 | 0.02039 | 0.0 | −310 | −5 | 0.5 | 14.4 |
| 351 | 0.02130 | 0.0 | −300 | −5 | 0.6 | 14.0 |
| 352 | 0.02222 | 0.0 | −291 | −5 | 0.6 | 13.6 |
| 353 | 0.02315 | 0.0 | −281 | −6 | 0.6 | 13.2 |
| 354 | 0.02409 | 0.0 | −271 | −6 | 0.6 | 12.8 |
| 355 | 0.02502 | 0.0 | −261 | −6 | 0.6 | 12.4 |
| 356 | 0.02596 | 0.0 | −252 | −7 | 0.5 | 12.0 |
| 357 | 0.02690 | 0.0 | −242 | −7 | 0.5 | 11.7 |
| 358 | 0.02783 | 0.0 | −232 | −7 | 0.5 | 11.3 |
| 359 | 0.02876 | 0.0 | −223 | −7 | 0.5 | 11.0 |
| 360 | 0.02967 | 0.0 | −214 | −8 | 0.5 | 10.7 |
| 361 | 0.03058 | 0.0 | −204 | −5 | 0.6 | 10.3 |
| 362 | 0.03147 | 0.0 | −195 | −5 | 0.6 | 10.0 |
| 363 | 0.03235 | 0.0 | −185 | −5 | 0.6 | 9.7 |
| 364 | 0.03320 | 0.0 | −175 | −6 | 0.6 | 9.4 |
| 365 | 0.03403 | 0.0 | −165 | −6 | 0.6 | 9.1 |
| 366 | 0.03483 | 0.0 | −155 | −6 | 0.6 | 8.9 |
| 367 | 0.03560 | 0.0 | −145 | −6 | 0.6 | 8.6 |
| 368 | 0.03633 | 0.0 | −136 | −6 | 0.6 | 8.3 |
| 369 | 0.03703 | 0.0 | −126 | −6 | 0.6 | 8.1 |
| 370 | 0.03770 | 0.0 | −116 | −6 | 0.7 | 7.9 |
| 371 | 0.03832 | 0.0 | −107 | −7 | 0.7 | 8.0 |
| 372 | 0.03890 | 0.0 | −97 | −7 | 0.7 | 8.2 |
| 373 | 0.03944 | 0.0 | −88 | −7 | 0.7 | 8.3 |
| 374 | 0.03993 | 0.0 | −79 | −7 | 0.7 | 8.5 |
| 375 | 0.04037 | 0.0 | −70 | −7 | 0.6 | 8.7 |
| 376 | 0.04077 | 0.0 | −61 | −7 | 0.6 | 8.8 |
| 377 | 0.04112 | 0.0 | −52 | −7 | 0.7 | 9.0 |
| 378 | 0.04143 | 0.0 | −43 | −7 | 0.7 | 9.2 |
| 379 | 0.04168 | 0.0 | −35 | −7 | 0.7 | 9.4 |

TABLE 3A

| t s | h (m) m | v m/s | q Pa | norm g m/s/s | axial g m/s/s | total g m/s/s | g vector rel Cruiser |
|---|---|---|---|---|---|---|---|
| 0 | 15000 | 236 | 4125 | 1.12 | −0.12 | 1.12 | −93.93 |
| 1 | 15041 | 233 | 4002 | 1.08 | −0.12 | 1.09 | −93.93 |
| 2 | 15083 | 230 | 3881 | 1.05 | −0.11 | 1.06 | −93.93 |
| 3 | 15125 | 227 | 3761 | 1.02 | −0.11 | 1.02 | −93.93 |
| 4 | 15167 | 224 | 3645 | 0.99 | −0.11 | 0.99 | −93.93 |
| 5 | 15209 | 222 | 3531 | 1.47 | 0.98 | 1.77 | −133.74 |
| 6 | 15251 | 229 | 3762 | 1.56 | 0.98 | 1.85 | −132.18 |
| 7 | 15299 | 237 | 3988 | 1.65 | 0.98 | 1.92 | −130.75 |
| 8 | 15354 | 244 | 4206 | 1.74 | 0.98 | 2.00 | −129.47 |
| 9 | 15418 | 251 | 4414 | 1.62 | 0.98 | 1.89 | −131.29 |
| 10 | 15491 | 258 | 4608 | 1.69 | 0.98 | 1.95 | −130.22 |
| 11 | 15572 | 265 | 4789 | 1.75 | 0.98 | 2.01 | −129.27 |
| 12 | 15663 | 271 | 4956 | 1.58 | 0.98 | 1.86 | −131.86 |
| 13 | 15763 | 277 | 5105 | 1.63 | 0.98 | 1.90 | −131.09 |
| 14 | 15872 | 283 | 5240 | 1.68 | 0.98 | 1.94 | −130.41 |
| 15 | 15989 | 288 | 5360 | 1.72 | 0.98 | 1.98 | −129.81 |
| 16 | 16115 | 294 | 5462 | 1.75 | 0.98 | 2.01 | −129.30 |
| 17 | 16251 | 299 | 5545 | 1.78 | 0.98 | 2.04 | −128.87 |
| 18 | 16398 | 304 | 5610 | 1.81 | 0.98 | 2.06 | −128.52 |
| 19 | 16554 | 308 | 5655 | 1.83 | 0.98 | 2.08 | −128.26 |
| 20 | 16720 | 313 | 5680 | 1.84 | 0.98 | 2.09 | −128.07 |
| 21 | 16898 | 317 | 5686 | 1.85 | 0.98 | 2.10 | −127.95 |
| 22 | 17085 | 321 | 5672 | 1.86 | 0.98 | 2.10 | −127.91 |
| 23 | 17284 | 324 | 5639 | 1.85 | 0.98 | 2.10 | −127.95 |
| 24 | 17492 | 327 | 5588 | 1.84 | 0.98 | 2.09 | −128.05 |
| 25 | 17711 | 330 | 5521 | 1.83 | 0.98 | 2.08 | −128.22 |
| 26 | 17940 | 333 | 5438 | 1.81 | 0.98 | 2.06 | −128.45 |
| 27 | 18179 | 336 | 5341 | 1.79 | 0.98 | 2.04 | −128.75 |
| 28 | 18427 | 338 | 5231 | 1.76 | 0.98 | 2.02 | −129.12 |
| 29 | 18685 | 341 | 5111 | 1.73 | 0.98 | 1.99 | −129.54 |
| 30 | 18950 | 342 | 4980 | 1.50 | 1.28 | 1.98 | −140.55 |
| 31 | 19225 | 347 | 4925 | 1.50 | 1.31 | 1.99 | −141.11 |
| 32 | 19508 | 352 | 4865 | 1.49 | 1.33 | 2.00 | −141.71 |
| 33 | 19800 | 357 | 4800 | 0.76 | 1.84 | 1.99 | −165.47 |
| 34 | 20102 | 367 | 4854 | 0.71 | 1.88 | 2.01 | −165.37 |
| 35 | 20413 | 377 | 4906 | 0.65 | 1.92 | 2.02 | −165.29 |
| 36 | 20733 | 387 | 4953 | 0.59 | 1.95 | 2.04 | −165.24 |
| 37 | 21063 | 398 | 4996 | 0.60 | 1.99 | 2.08 | −165.26 |
| 38 | 21403 | 409 | 5033 | 0.61 | 1.98 | 2.08 | −165.02 |

TABLE 3A-continued

| t s | h (m) m | v m/s | q Pa | norm g m/s/s | axial g m/s/s | total g m/s/s | g vector rel Cruiser |
|---|---|---|---|---|---|---|---|
| 39 | 21752 | 420 | 5054 | 0.69 | 1.98 | 2.09 | −164.88 |
| 40 | 22111 | 431 | 5059 | 0.62 | 1.98 | 2.07 | −164.67 |
| 41 | 22481 | 442 | 5050 | 0.62 | 1.97 | 2.07 | −164.56 |
| 42 | 22861 | 453 | 5026 | 0.62 | 1.97 | 2.07 | −164.49 |
| 43 | 23250 | 464 | 4989 | 0.62 | 1.97 | 2.06 | −164.46 |
| 44 | 23650 | 475 | 4939 | 0.62 | 1.96 | 2.06 | −164.48 |
| 45 | 24059 | 486 | 4877 | 0.62 | 1.96 | 2.06 | −164.54 |
| 46 | 24478 | 496 | 4803 | 0.61 | 1.96 | 2.05 | −164.63 |
| 47 | 24907 | 507 | 4719 | 0.34 | 1.96 | 1.99 | −172.18 |
| 48 | 25346 | 518 | 4626 | 0.34 | 1.96 | 1.99 | −172.26 |
| 49 | 25793 | 529 | 4526 | 0.33 | 1.96 | 1.99 | −172.37 |
| 50 | 26249 | 539 | 4419 | 0.33 | 1.96 | 1.98 | −172.48 |
| 51 | 26713 | 550 | 4306 | 0.32 | 1.96 | 1.98 | −172.62 |
| 52 | 27186 | 561 | 4188 | 0.32 | 1.96 | 1.99 | −172.77 |
| 53 | 27666 | 572 | 4066 | 0.55 | 1.96 | 2.03 | −166.18 |
| 54 | 28155 | 583 | 3940 | 0.54 | 1.96 | 2.03 | −166.50 |
| 55 | 28654 | 593 | 3810 | 0.64 | 1.95 | 2.05 | −166.90 |
| 56 | 29162 | 604 | 3677 | 0.63 | 1.95 | 2.05 | −167.25 |
| 57 | 29679 | 615 | 3541 | 0.61 | 1.96 | 2.05 | −167.62 |
| 58 | 30207 | 626 | 3404 | 0.60 | 1.96 | 2.05 | −168.01 |
| 59 | 30744 | 636 | 3265 | 0.58 | 1.96 | 2.04 | −168.40 |
| 60 | 31290 | 647 | 3127 | 0.57 | 1.96 | 2.04 | −168.79 |
| 61 | 31847 | 658 | 2988 | 0.55 | 1.96 | 2.04 | −169.19 |
| 62 | 32413 | 669 | 2850 | 0.54 | 1.96 | 2.03 | −169.60 |
| 63 | 32988 | 679 | 2713 | 0.52 | 1.96 | 2.03 | −170.01 |
| 64 | 33573 | 690 | 2579 | 0.51 | 1.96 | 2.02 | −170.42 |
| 65 | 34167 | 701 | 2446 | 0.67 | 1.94 | 2.05 | −170.89 |
| 66 | 34771 | 711 | 2315 | 0.66 | 1.94 | 2.04 | −171.30 |
| 67 | 35384 | 722 | 2186 | 0.64 | 1.93 | 2.04 | −171.70 |
| 68 | 36007 | 732 | 2061 | 0.62 | 1.93 | 2.03 | −172.10 |
| 69 | 36640 | 743 | 1940 | 0.61 | 1.93 | 2.03 | −172.50 |
| 70 | 37283 | 753 | 1822 | 0.60 | 1.93 | 2.02 | −172.89 |
| 71 | 37935 | 764 | 1709 | 0.58 | 1.93 | 2.02 | −173.27 |
| 72 | 38597 | 774 | 1600 | 0.57 | 1.93 | 2.01 | −173.64 |
| 73 | 39268 | 785 | 1495 | 0.55 | 1.93 | 2.01 | −174.00 |
| 74 | 39949 | 795 | 1395 | 0.54 | 1.93 | 2.01 | −174.35 |
| 75 | 40639 | 806 | 1299 | 0.53 | 1.94 | 2.01 | −174.70 |
| 76 | 41338 | 816 | 1208 | 0.52 | 1.94 | 2.01 | −175.04 |
| 77 | 42046 | 827 | 1122 | 0.51 | 1.94 | 2.01 | −175.36 |
| 78 | 42764 | 837 | 1040 | 0.42 | 1.95 | 1.99 | −177.75 |
| 79 | 43491 | 848 | 963 | 0.42 | 1.95 | 1.99 | −177.90 |
| 80 | 44227 | 858 | 890 | 0.41 | 1.95 | 2.00 | −178.05 |
| 81 | 44971 | 869 | 821 | 0.41 | 1.95 | 2.00 | −178.19 |
| 82 | 45725 | 880 | 757 | 0.40 | 1.96 | 2.00 | −178.32 |
| 83 | 46487 | 890 | 696 | 0.23 | 1.98 | 1.99 | −178.47 |
| 84 | 47258 | 901 | 640 | 0.22 | 1.98 | 2.00 | −178.59 |
| 85 | 48037 | 912 | 588 | 0.22 | 1.99 | 2.00 | −178.69 |
| 86 | 48824 | 923 | 539 | 0.26 | 1.99 | 2.00 | −177.63 |
| 87 | 49619 | 934 | 493 | 0.25 | 1.99 | 2.00 | −177.82 |
| 88 | 50422 | 945 | 451 | 0.24 | 1.99 | 2.01 | −177.99 |
| 89 | 51234 | 956 | 412 | 0.24 | 1.99 | 2.01 | −178.16 |
| 90 | 52054 | 968 | 375 | 0.23 | 1.99 | 2.01 | −178.31 |
| 91 | 52881 | 979 | 342 | 0.23 | 2.00 | 2.01 | −178.45 |
| 92 | 53717 | 990 | 311 | 0.22 | 2.00 | 2.01 | −175.58 |
| 93 | 54561 | 1001 | 282 | 0.22 | 2.00 | 2.01 | −178.70 |
| 94 | 55413 | 1012 | 256 | 0.20 | 2.00 | 2.01 | −179.40 |
| 95 | 56273 | 1024 | 232 | 0.16 | 1.61 | 1.62 | −179.32 |
| 96 | 57141 | 1031 | 208 | 0.13 | 1.30 | 1.30 | −179.23 |
| 97 | 58014 | 1036 | 186 | 0.11 | 1.04 | 1.05 | −179.14 |
| 98 | 58888 | 1038 | 165 | 0.09 | 0.84 | 0.84 | −179.15 |
| 99 | 59761 | 1038 | 146 | 0.07 | 0.67 | 0.67 | −178.05 |
| 100 | 60632 | 1036 | 129 | 0.06 | 0.54 | 0.54 | −178.84 |
| 101 | 61499 | 1033 | 113 | 0.05 | 0.43 | 0.43 | −178.72 |
| 102 | 62360 | 1029 | 99 | 0.04 | 0.34 | 0.35 | −178.60 |
| 103 | 63216 | 1024 | 87 | 0.03 | 0.28 | 0.28 | −178.46 |
| 104 | 64065 | 1019 | 77 | 0.03 | 0.22 | 0.22 | −178.31 |
| 105 | 64907 | 1013 | 67 | 0.01 | −0.00 | 0.01 | −72.85 |
| 106 | 65741 | 1005 | 59 | 0.00 | −0.00 | 0.01 | −72.85 |
| 107 | 66565 | 997 | 52 | 0.00 | −0.00 | 0.00 | −72.85 |
| 108 | 67379 | 989 | 45 | 0.00 | −0.00 | 0.00 | −72.85 |
| 109 | 68183 | 981 | 40 | 0.00 | −0.00 | 0.00 | −72.85 |
| 110 | 68978 | 973 | 35 | 0.00 | −0.00 | 0.00 | −72.85 |
| 111 | 69763 | 965 | 31 | 0.00 | −0.00 | 0.00 | −72.85 |
| 112 | 70538 | 957 | 27 | 0.00 | −0.00 | 0.00 | 72.85 |
| 113 | 71303 | 949 | 24 | 0.00 | −0.00 | 0.00 | −72.85 |
| 114 | 72059 | 941 | 21 | 0.00 | −0.00 | 0.00 | −72.85 |
| 115 | 72805 | 933 | 19 | 0.00 | −0.00 | 0.00 | −72.85 |
| 116 | 73541 | 926 | 17 | 0.00 | −0.00 | 0.00 | 0.00 |
| 117 | 74267 | 918 | 15 | 0.00 | −0.00 | 0.00 | 0.00 |
| 118 | 74983 | 910 | 13 | 0.00 | −0.00 | 0.00 | 0.00 |
| 119 | 75690 | 903 | 12 | 0.00 | −0.00 | 0.00 | 0.00 |
| 120 | 76387 | 895 | 10 | 0.00 | −0.00 | 0.00 | 0.00 |
| 121 | 77074 | 888 | 9 | 0.00 | −0.00 | 0.00 | 0.00 |
| 122 | 77751 | 880 | 8 | 0.00 | −0.00 | 0.00 | 0.00 |
| 123 | 78419 | 873 | 7 | 0.00 | −0.00 | 0.00 | 0.00 |
| 124 | 79076 | 865 | 7 | 0.00 | −0.00 | 0.00 | 0.00 |
| 125 | 79724 | 858 | 6 | 0.00 | −0.00 | 0.00 | 0.00 |
| 126 | 80362 | 851 | 5 | 0.00 | −0.00 | 0.00 | 0.00 |
| 127 | 80991 | 843 | 5 | 0.00 | −0.00 | 0.00 | 0.00 |
| 128 | 81609 | 836 | 4 | 0.00 | −0.00 | 0.00 | 0.00 |
| 129 | 82218 | 829 | 4 | 0.00 | −0.00 | 0.00 | 0.00 |
| 130 | 82817 | 822 | 4 | 0.00 | −0.00 | 0.00 | 0.00 |
| 131 | 83406 | 815 | 3 | 0.00 | −0.00 | 0.00 | 0.00 |
| 132 | 83986 | 808 | 3 | 0.00 | −0.00 | 0.00 | 0.00 |
| 133 | 84555 | 801 | 3 | 0.00 | −0.00 | 0.00 | 0.00 |
| 134 | 85115 | 794 | 2 | 0.00 | −0.00 | 0.00 | 0.00 |
| 135 | 85665 | 788 | 2 | 0.00 | −0.00 | 0.00 | 0.00 |
| 136 | 86206 | 781 | 2 | 0.00 | −0.00 | 0.00 | 0.00 |
| 137 | 86736 | 774 | 2 | 0.00 | −0.00 | 0.00 | 0.00 |
| 138 | 87257 | 768 | 2 | 0.00 | −0.00 | 0.00 | 0.00 |
| 139 | 87768 | 761 | 2 | 0.00 | −0.00 | 0.00 | 0.00 |
| 140 | 88269 | 755 | 1 | 0.00 | −0.00 | 0.00 | 0.00 |
| 141 | 88761 | 748 | 1 | 0.00 | −0.00 | 0.00 | 0.00 |
| 142 | 89242 | 742 | 1 | 0.00 | −0.00 | 0.00 | 0.00 |
| 143 | 89714 | 736 | 1 | 0.00 | −0.00 | 0.00 | 0.00 |
| 144 | 90176 | 730 | 1 | 0.00 | −0.00 | 0.00 | 0.00 |
| 145 | 90629 | 723 | 1 | 0.00 | −0.00 | 0.00 | 0.00 |
| 146 | 91071 | 717 | 1 | 0.00 | −0.00 | 0.00 | 0.00 |
| 147 | 91504 | 712 | 1 | 0.00 | −0.00 | 0.00 | 0.00 |
| 149 | 91927 | 706 | 1 | 0.00 | −0.00 | 0.00 | 0.00 |
| 149 | 92340 | 700 | 1 | 0.00 | −0.00 | 0.00 | 0.00 |
| 150 | 92744 | 694 | 1 | 0.00 | −0.00 | 0.00 | 0.00 |
| 151 | 93137 | 689 | 1 | 0.00 | −0.00 | 0.00 | 0.00 |
| 152 | 93521 | 683 | 1 | 0.00 | −0.00 | 0.00 | 0.00 |
| 153 | 93895 | 678 | 1 | 0.00 | −0.00 | 0.00 | 0.00 |
| 154 | 94260 | 673 | 0 | 0.00 | −0.00 | 0.00 | 0.00 |
| 155 | 94614 | 667 | 0 | 0.00 | −0.00 | 0.00 | 0.00 |
| 156 | 94959 | 662 | 0 | 0.00 | −0.00 | 0.00 | 0.00 |
| 157 | 95294 | 657 | 0 | 0.00 | −0.00 | 0.00 | 0.00 |
| 158 | 95619 | 653 | 0 | 0.00 | −0.00 | 0.00 | 0.00 |
| 159 | 95935 | 648 | 0 | 0.00 | −0.00 | 0.00 | 0.00 |
| 160 | 96241 | 643 | 0 | 0.00 | −0.00 | 0.00 | 0.00 |
| 161 | 96537 | 639 | 0 | 0.00 | 0.00 | 0.00 | 0.00 |
| 162 | 96823 | 634 | 0 | 0.00 | −0.00 | 0.00 | 0.00 |
| 163 | 97099 | 630 | 0 | 0.00 | −0.00 | 0.00 | 0.00 |
| 164 | 97366 | 626 | 0 | 0.00 | −0.00 | 0.00 | 0.00 |
| 165 | 97623 | 622 | 0 | 0.00 | −0.00 | 0.00 | 0.00 |
| 166 | 97870 | 618 | 0 | 0.00 | −0.00 | 0.00 | 0.00 |
| 167 | 98107 | 614 | 0 | 0.00 | −0.00 | 0.00 | 0.00 |
| 168 | 98335 | 611 | 0 | 0.00 | −0.00 | 0.00 | 0.00 |
| 169 | 98552 | 607 | 0 | 0.00 | −0.00 | 0.00 | 0.00 |
| 170 | 98760 | 604 | 0 | 0.00 | −0.00 | 0.00 | 0.00 |
| 171 | 98959 | 601 | 0 | 0.00 | −0.00 | 0.00 | 0.00 |
| 172 | 99147 | 597 | 0 | 0.00 | −0.00 | 0.00 | 0.00 |
| 173 | 99326 | 595 | 0 | 0.00 | −0.00 | 0.00 | 0.00 |
| 174 | 99495 | 592 | 0 | 0.00 | −0.00 | 0.00 | 0.00 |
| 175 | 99654 | 589 | 0 | 0.00 | −0.00 | 0.00 | 0.00 |
| 176 | 99803 | 587 | 0 | 0.00 | −0.00 | 0.00 | 0.00 |
| 177 | 99943 | 584 | 0 | 0.00 | −0.00 | 0.00 | 0.00 |
| 178 | 100072 | 582 | 0 | 0.00 | −0.00 | 0.00 | 0.00 |
| 179 | 100192 | 580 | 0 | 0.00 | −0.00 | 0.00 | 0.00 |
| 180 | 100303 | 578 | 0 | 0.00 | −0.00 | 0.00 | 0.00 |
| 181 | 100403 | 577 | 0 | 0.00 | −0.00 | 0.00 | 0.00 |
| 182 | 100494 | 575 | 0 | 0.00 | −0.00 | 0.00 | 0.00 |
| 183 | 100575 | 574 | 0 | 0.00 | −0.00 | 0.00 | 0.00 |
| 184 | 100646 | 572 | 0 | 0.00 | −0.00 | 0.00 | 0.00 |
| 185 | 100707 | 571 | 0 | 0.00 | −0.00 | 0.00 | 0.00 |
| 186 | 100758 | 570 | 0 | 0.00 | −0.00 | 0.00 | 0.00 |
| 187 | 100800 | 570 | 0 | 0.00 | −0.00 | 0.00 | 0.00 |
| 188 | 100832 | 569 | 0 | 0.00 | −0.00 | 0.00 | 0.00 |
| 189 | 100854 | 569 | 0 | 0.00 | −0.00 | 0.00 | 0.00 |
| 190 | 100866 | 569 | 0 | 0.00 | −0.00 | 0.00 | 0.00 |

TABLE 3A-continued

| t s | h (m) m | v m/s | q Pa | norm g m/s/s | axial g m/s/s | total g m/s/s | g vector rel Cruiser |
|---|---|---|---|---|---|---|---|
| 191 | 100869 | 569 | 0 | 0.00 | −0.00 | 0.00 | 0.00 |
| 192 | 100862 | 569 | 0 | 0.00 | −0.00 | 0.00 | 0.00 |
| 193 | 100844 | 569 | 0 | 0.00 | −0.00 | 0.00 | 0.00 |
| 194 | 100818 | 569 | 0 | 0.00 | −0.00 | 0.00 | 0.00 |
| 195 | 100781 | 570 | 0 | 0.00 | −0.00 | 0.00 | 0.00 |
| 196 | 100734 | 571 | 0 | 0.00 | −0.00 | 0.00 | 0.00 |
| 197 | 100678 | 572 | 0 | 0.00 | −0.00 | 0.00 | 0.00 |
| 198 | 100612 | 573 | 0 | 0.00 | −0.00 | 0.00 | 0.00 |
| 199 | 100536 | 574 | 0 | 0.00 | −0.00 | 0.00 | 0.00 |
| 200 | 100450 | 576 | 0 | 0.00 | −0.00 | 0.00 | 0.00 |
| 201 | 100355 | 577 | 0 | 0.00 | −0.00 | 0.00 | 0.00 |
| 202 | 100249 | 579 | 0 | 0.00 | −0.00 | 0.00 | 0.00 |
| 203 | 100134 | 581 | 0 | 0.00 | −0.00 | 0.00 | 0.00 |
| 204 | 100009 | 583 | 0 | 0.00 | −0.00 | 0.00 | 0.00 |
| 205 | 99874 | 586 | 0 | 0.00 | −0.00 | 0.00 | −85.89 |
| 206 | 99730 | 588 | 0 | 0.00 | −0.00 | 0.00 | −85.89 |
| 207 | 99575 | 590 | 0 | 0.00 | −0.00 | 0.00 | −85.89 |
| 208 | 99411 | 593 | 0 | 0.00 | −0.00 | 0.00 | −85.89 |
| 209 | 99237 | 596 | 0 | 0.00 | −0.00 | 0.00 | −85.89 |
| 210 | 99053 | 599 | 0 | 0.00 | −0.00 | 0.00 | −85.89 |
| 211 | 98859 | 602 | 0 | 0.00 | −0.00 | 0.00 | −85.89 |
| 212 | 98656 | 606 | 0 | 0.00 | −0.00 | 0.00 | −85.89 |
| 213 | 98442 | 609 | 0 | 0.00 | −0.00 | 0.00 | −85.89 |
| 214 | 98219 | 613 | 0 | 0.00 | −0.00 | 0.00 | −85.89 |
| 215 | 97986 | 616 | 0 | 0.00 | −0.00 | 0.00 | −85.89 |
| 216 | 97743 | 620 | 0 | 0.00 | −0.00 | 0.00 | −85.89 |
| 217 | 97491 | 624 | 0 | 0.00 | −0.00 | 0.00 | −85.89 |
| 218 | 97228 | 628 | 0 | 0.00 | −0.00 | 0.00 | −85.89 |
| 219 | 96956 | 633 | 0 | 0.00 | −0.00 | 0.00 | −85.89 |
| 220 | 96674 | 637 | 0 | 0.00 | −0.00 | 0.00 | −85.89 |
| 221 | 96382 | 641 | 0 | 0.00 | −0.00 | 0.00 | −85.89 |
| 222 | 96080 | 646 | 0 | 0.00 | −0.00 | 0.00 | −85.89 |
| 223 | 95768 | 651 | 0 | 0.00 | −0.00 | 0.00 | −85.89 |
| 224 | 95447 | 656 | 0 | 0.00 | −0.00 | 0.00 | −85.89 |
| 225 | 95116 | 661 | 0 | 0.00 | −0.00 | 0.00 | −85.89 |
| 226 | 94775 | 666 | 0 | 0.00 | −0.00 | 0.00 | −85.89 |
| 227 | 94424 | 671 | 0 | 0.00 | −0.00 | 0.00 | −85.89 |
| 228 | 94063 | 676 | 0 | 0.00 | −0.00 | 0.00 | −85.89 |
| 229 | 93692 | 681 | 1 | 0.00 | −0.00 | 0.00 | −85.89 |
| 230 | 93312 | 687 | 1 | 0.00 | −0.00 | 0.00 | −85.89 |
| 231 | 92922 | 692 | 1 | 0.00 | −0.00 | 0.00 | −85.89 |
| 232 | 92522 | 698 | 1 | 0.00 | −0.00 | 0.00 | −85.89 |
| 233 | 92112 | 704 | 1 | 0.00 | −0.00 | 0.00 | −85.89 |
| 234 | 91692 | 710 | 1 | 0.00 | −0.00 | 0.00 | −85.89 |
| 235 | 91263 | 716 | 1 | 0.00 | −0.00 | 0.00 | −85.89 |
| 236 | 90824 | 722 | 1 | 0.00 | −0.00 | 0.00 | −85.89 |
| 237 | 90374 | 728 | 1 | 0.00 | −0.00 | 0.00 | −85.89 |
| 238 | 89915 | 734 | 1 | 0.00 | −0.00 | 0.00 | −85.89 |
| 239 | 89447 | 740 | 1 | 0.00 | −0.00 | 0.00 | −85.89 |
| 240 | 88968 | 747 | 1 | 0.00 | −0.00 | 0.00 | −85.89 |
| 241 | 88480 | 753 | 1 | 0.00 | −0.00 | 0.00 | −85.89 |
| 242 | 87981 | 759 | 1 | 0.00 | −0.00 | 0.00 | −85.89 |
| 243 | 87473 | 766 | 2 | 0.00 | −0.00 | 0.00 | −85.89 |
| 244 | 86956 | 773 | 2 | 0.00 | −0.00 | 0.00 | −85.89 |
| 245 | 86428 | 779 | 2 | 0.00 | −0.00 | 0.00 | −85.89 |
| 246 | 85890 | 786 | 2 | 0.00 | −0.00 | 0.00 | −85.89 |
| 247 | 85343 | 793 | 2 | 0.00 | −0.00 | 0.00 | −85.89 |
| 248 | 84786 | 800 | 3 | 0.00 | −0.00 | 0.00 | −85.89 |
| 249 | 84219 | 807 | 3 | 0.00 | −0.00 | 0.00 | −85.89 |
| 250 | 83642 | 814 | 3 | 0.00 | −0.00 | 0.00 | −85.89 |
| 251 | 83056 | 821 | 3 | 0.00 | −0.00 | 0.00 | −85.89 |
| 252 | 82460 | 828 | 4 | 0.00 | −0.00 | 0.00 | −85.89 |
| 253 | 81853 | 835 | 4 | 0.00 | −0.00 | 0.00 | −85.89 |
| 254 | 81237 | 842 | 5 | 0.00 | −0.00 | 0.00 | −85.89 |
| 255 | 80612 | 849 | 5 | 0.00 | −0.00 | 0.00 | −85.89 |
| 256 | 79976 | 857 | 6 | 0.00 | −0.00 | 0.00 | −85.89 |
| 257 | 79331 | 864 | 6 | 0.00 | −0.00 | 0.00 | −85.89 |
| 258 | 78676 | 872 | 7 | 0.00 | −0.00 | 0.00 | −85.89 |
| 259 | 78011 | 879 | 8 | 0.00 | −0.00 | 0.00 | −85.89 |
| 260 | 77336 | 886 | 9 | 0.00 | −0.00 | 0.01 | −85.89 |
| 261 | 76652 | 894 | 10 | 0.00 | −0.00 | 0.01 | −85.89 |
| 262 | 75958 | 902 | 11 | 0.01 | −0.00 | 0.01 | −85.89 |
| 263 | 75254 | 909 | 13 | 0.01 | −0.00 | 0.01 | −85.89 |
| 264 | 74540 | 917 | 14 | 0.01 | −0.00 | 0.01 | −85.89 |
| 265 | 73817 | 925 | 16 | 0.01 | −0.01 | 0.01 | −85.89 |
| 266 | 73084 | 932 | 18 | 0.01 | −0.01 | 0.01 | −85.89 |
| 267 | 72341 | 940 | 20 | 0.01 | −0.01 | 0.01 | −85.89 |
| 268 | 71588 | 948 | 23 | 0.01 | −0.01 | 0.01 | −85.89 |
| 269 | 70826 | 956 | 26 | 0.01 | −0.01 | 0.02 | −85.89 |
| 270 | 70054 | 963 | 29 | 0.01 | −0.01 | 0.02 | −85.89 |
| 271 | 69272 | 971 | 33 | 0.02 | −0.01 | 0.02 | −85.89 |
| 272 | 68481 | 979 | 38 | 0.02 | −0.01 | 0.02 | −85.89 |
| 273 | 67680 | 987 | 43 | 0.02 | −0.01 | 0.03 | −85.89 |
| 274 | 66869 | 995 | 49 | 0.02 | −0.02 | 0.03 | −85.89 |
| 275 | 66049 | 1003 | 56 | 0.03 | −0.02 | 0.03 | −85.89 |
| 276 | 65219 | 1011 | 64 | 0.03 | −0.02 | 0.04 | −85.89 |
| 277 | 64380 | 1019 | 73 | 0.04 | −0.02 | 0.04 | −85.89 |
| 278 | 63532 | 1027 | 84 | 0.04 | −0.03 | 0.05 | −85.89 |
| 279 | 62674 | 1035 | 96 | 0.05 | −0.03 | 0.06 | −85.89 |
| 280 | 61806 | 1042 | 110 | 0.05 | −0.04 | 0.07 | −85.89 |
| 281 | 60930 | 1050 | 127 | 0.06 | −0.04 | 0.08 | −85.89 |
| 282 | 60044 | 1058 | 146 | 0.07 | −0.05 | 0.09 | −85.89 |
| 283 | 59149 | 1066 | 168 | 0.08 | −0.06 | 0.10 | −85.89 |
| 284 | 58245 | 1074 | 193 | 0.10 | −0.07 | 0.12 | −85.89 |
| 285 | 57332 | 1081 | 223 | 0.11 | −0.08 | 0.13 | −85.89 |
| 286 | 56410 | 1089 | 257 | 0.13 | −0.09 | 0.15 | −85.89 |
| 287 | 55480 | 1097 | 298 | 0.15 | −0.10 | 0.18 | −85.89 |
| 288 | 54541 | 1104 | 344 | 0.17 | −0.12 | 0.21 | −85.89 |
| 289 | 53594 | 1111 | 399 | 0.20 | −0.13 | 0.24 | −85.89 |
| 290 | 52639 | 1118 | 462 | 0.23 | −0.16 | 0.28 | −85.89 |
| 291 | 51676 | 1125 | 535 | 0.27 | −0.18 | 0.32 | −85.89 |
| 292 | 50706 | 1132 | 621 | 0.31 | −0.21 | 0.37 | −85.89 |
| 293 | 49729 | 1138 | 721 | 0.36 | −0.24 | 0.43 | −85.89 |
| 294 | 48746 | 1144 | 837 | 0.42 | −0.28 | 0.50 | −85.89 |
| 295 | 47757 | 1150 | 971 | 0.48 | −0.33 | 0.58 | −85.89 |
| 296 | 46762 | 1155 | 1128 | 0.56 | −0.38 | 0.68 | −85.89 |
| 297 | 45763 | 1160 | 1309 | 0.65 | −0.44 | 0.79 | −85.89 |
| 298 | 44759 | 1164 | 1518 | 0.76 | −0.51 | 0.91 | −85.89 |
| 299 | 43753 | 1168 | 1760 | 0.88 | −0.59 | 1.06 | −85.89 |
| 300 | 42746 | 1170 | 2037 | 1.01 | −0.69 | 1.23 | −85.89 |
| 301 | 41737 | 1172 | 2355 | 1.17 | −0.79 | 1.42 | −85.89 |
| 302 | 40730 | 1173 | 2717 | 1.35 | −0.92 | 1.63 | −85.89 |
| 303 | 39726 | 1172 | 3127 | 1.56 | −1.05 | 1.88 | −85.89 |
| 304 | 38726 | 1170 | 3587 | 1.79 | −1.21 | 2.16 | −85.89 |
| 305 | 37734 | 1167 | 4101 | 2.04 | −1.38 | 2.47 | −85.89 |
| 306 | 36751 | 1161 | 4667 | 2.32 | −1.57 | 2.81 | −85.89 |
| 307 | 35780 | 1154 | 5284 | 2.63 | −1.78 | 3.18 | −85.89 |
| 308 | 34825 | 1145 | 5947 | 2.96 | −2.01 | 3.58 | −85.89 |
| 309 | 33890 | 1133 | 6647 | 3.31 | −2.24 | 4.00 | −85.89 |
| 310 | 32977 | 1119 | 7372 | 3.61 | −1.79 | 4.03 | −87.57 |
| 311 | 32091 | 1109 | 8205 | 3.47 | −2.00 | 4.01 | −79.31 |
| 312 | 31232 | 1097 | 9062 | 3.76 | −1.55 | 4.07 | −83.01 |
| 313 | 30399 | 1089 | 10047 | 3.67 | −1.71 | 4.05 | −77.24 |
| 314 | 29593 | 1080 | 11060 | 3.58 | −1.89 | 4.05 | −72.03 |
| 315 | 28813 | 1068 | 12084 | 3.41 | −2.06 | 3.99 | −68.37 |
| 316 | 28061 | 1055 | 13101 | 3.70 | −1.53 | 4.00 | −76.81 |
| 317 | 27337 | 1047 | 14281 | 3.68 | −1.66 | 4.03 | −74.61 |
| 318 | 26640 | 1037 | 15461 | 3.59 | −1.80 | 4.02 | −72.07 |
| 319 | 25971 | 1026 | 16618 | 3.59 | −1.94 | 4.08 | −70.07 |
| 320 | 25331 | 1013 | 17733 | 3.53 | −2.07 | 4.09 | −67.86 |
| 321 | 24720 | 999 | 18783 | 3.74 | −1.49 | 4.03 | −76.29 |
| 322 | 24139 | 990 | 20024 | 3.66 | −1.58 | 3.99 | −74.28 |
| 323 | 23587 | 980 | 21207 | 3.70 | −1.68 | 4.06 | −73.06 |
| 324 | 23063 | 968 | 22312 | 3.61 | −1.77 | 4.02 | −71.20 |
| 325 | 22569 | 956 | 23316 | 3.58 | −1.84 | 4.03 | −69.78 |
| 326 | 22104 | 943 | 24206 | 3.62 | −1.92 | 4.09 | −68.92 |
| 327 | 21669 | 929 | 24965 | 3.52 | −1.98 | 4.04 | −66.86 |
| 328 | 21263 | 914 | 25580 | 3.50 | −2.02 | 4.05 | −65.99 |
| 329 | 20888 | 898 | 26046 | 3.46 | −2.06 | 4.03 | −65.22 |
| 330 | 20541 | 881 | 26357 | 3.39 | −2.09 | 3.98 | −64.42 |
| 331 | 20224 | 864 | 26515 | 3.30 | −2.10 | 3.91 | −63.57 |
| 332 | 19935 | 847 | 26524 | 3.41 | −2.10 | 4.01 | −64.42 |
| 333 | 19673 | 830 | 26393 | 3.51 | −2.09 | 4.08 | −65.22 |
| 334 | 19439 | 812 | 26126 | 3.47 | −2.07 | 4.04 | −65.22 |
| 335 | 19233 | 794 | 25728 | 3.42 | −2.04 | 3.98 | −65.22 |
| 336 | 19056 | 776 | 25213 | 3.28 | −1.99 | 3.84 | −64.71 |
| 337 | 18905 | 759 | 24597 | 3.14 | −1.95 | 3.69 | −64.19 |
| 338 | 18779 | 741 | 23898 | 2.99 | −1.89 | 3.54 | −63.67 |
| 339 | 18677 | 724 | 23135 | 2.83 | −1.83 | 3.37 | −63.15 |
| 340 | 18596 | 707 | 22325 | 2.68 | −2.60 | 3.74 | −51.85 |
| 341 | 18534 | 683 | 20977 | 2.47 | −2.44 | 3.47 | −51.27 |
| 342 | 18490 | 659 | 19688 | 2.20 | −2.29 | 3.18 | −49.80 |

TABLE 3A-continued

| t s | h (m) m | v m/s | q Pa | norm g m/s/s | axial g m/s/s | total g m/s/s | g vector rel Cruiser |
|---|---|---|---|---|---|---|---|
| 343 | 18462 | 637 | 18466 | 1.96 | −2.15 | 2.91 | −48.34 |
| 344 | 18446 | 616 | 17316 | 1.75 | −2.02 | 2.67 | −46.88 |
| 345 | 18440 | 597 | 16242 | 1.56 | −1.89 | 2.45 | −45.43 |

TABLE 3B

| t s | Gamma deg | m kg | Range km | Lift N | Drag N |
|---|---|---|---|---|---|
| 0 | 10.0 | 11750 | 0 | 128695 | 13685 |
| 1 | 10.3 | 11750 | 0 | 124865 | 13277 |
| 2 | 10.6 | 11750 | 0 | 121080 | 12875 |
| 3 | 10.7 | 11750 | 1 | 117358 | 12479 |
| 4 | 10.8 | 11750 | 1 | 113718 | 12092 |
| 5 | 10.8 | 11750 | 1 | 146900 | 15094 |
| 6 | 12.1 | 11702 | 1 | 156500 | 16080 |
| 7 | 13.5 | 11653 | 2 | 165899 | 17046 |
| 8 | 15.1 | 11605 | 2 | 174977 | 17979 |
| 9 | 16.9 | 11556 | 2 | 160657 | 16594 |
| 10 | 18.4 | 11508 | 2 | 167715 | 17323 |
| 11 | 20.0 | 11459 | 3 | 174319 | 18005 |
| 12 | 21.7 | 11411 | 3 | 154614 | 16441 |
| 13 | 23.1 | 11364 | 3 | 159285 | 16937 |
| 14 | 24.5 | 11316 | 3 | 163503 | 17386 |
| 15 | 26.0 | 11269 | 4 | 167224 | 17781 |
| 16 | 27.6 | 11221 | 4 | 170405 | 18120 |
| 17 | 29.3 | 11174 | 4 | 173016 | 18397 |
| 18 | 31.0 | 11126 | 4 | 175031 | 18612 |
| 19 | 32.7 | 11079 | 5 | 176435 | 18761 |
| 20 | 34.5 | 11032 | 5 | 177221 | 18844 |
| 21 | 36.4 | 10985 | 5 | 177391 | 18863 |
| 22 | 38.2 | 10938 | 5 | 176957 | 18816 |
| 23 | 40.1 | 10891 | 6 | 175938 | 18708 |
| 24 | 42.0 | 10845 | 6 | 174361 | 18540 |
| 25 | 43.9 | 10798 | 6 | 172260 | 18317 |
| 26 | 45.7 | 10752 | 6 | 169673 | 18042 |
| 27 | 47.6 | 10707 | 7 | 166645 | 17720 |
| 28 | 49.5 | 10661 | 7 | 163221 | 17356 |
| 29 | 51.3 | 10616 | 7 | 159450 | 16955 |
| 30 | 53.2 | 10571 | 7 | 129484 | 14632 |
| 31 | 54.7 | 10516 | 7 | 128055 | 14470 |
| 32 | 56.1 | 10450 | 8 | 126486 | 14293 |
| 33 | 57.6 | 10403 | 8 | 49915 | 10632 |
| 34 | 58.0 | 10329 | 8 | 50486 | 10753 |
| 35 | 58.3 | 10254 | 8 | 51020 | 10867 |
| 36 | 58.4 | 10178 | 8 | 51512 | 10972 |
| 37 | 58.5 | 10102 | 9 | 51955 | 11066 |
| 38 | 58.7 | 10025 | 9 | 52338 | 11148 |
| 39 | 58.8 | 9949 | 9 | 52559 | 11195 |
| 40 | 59.0 | 9873 | 9 | 52613 | 11206 |
| 41 | 59.1 | 9798 | 9 | 52517 | 11186 |
| 42 | 59.3 | 9723 | 10 | 52272 | 11134 |
| 43 | 59.4 | 9650 | 10 | 51886 | 11052 |
| 44 | 59.5 | 9577 | 10 | 51366 | 10941 |
| 45 | 59.7 | 9504 | 10 | 50718 | 10803 |
| 46 | 59.8 | 9433 | 11 | 49953 | 10640 |
| 47 | 59.9 | 9362 | 11 | 24539 | 9988 |
| 48 | 59.7 | 9291 | 11 | 24057 | 9791 |
| 49 | 59.6 | 9221 | 11 | 23535 | 9579 |
| 50 | 59.4 | 9152 | 12 | 22979 | 9352 |
| 51 | 59.2 | 9084 | 12 | 22391 | 9113 |
| 52 | 59.0 | 9016 | 12 | 21778 | 8864 |
| 53 | 58.8 | 8948 | 13 | 42288 | 9007 |
| 54 | 58.8 | 8881 | 13 | 40977 | 8728 |
| 55 | 58.9 | 8815 | 13 | 39628 | 8441 |
| 56 | 59.0 | 8749 | 13 | 38241 | 8145 |
| 57 | 59.1 | 8684 | 14 | 36829 | 7845 |
| 58 | 59.2 | 8619 | 14 | 35399 | 7540 |
| 59 | 59.2 | 8555 | 14 | 33960 | 7233 |
| 60 | 59.3 | 8491 | 15 | 32517 | 6926 |
| 61 | 59.4 | 8428 | 15 | 31075 | 6619 |
| 62 | 59.4 | 8365 | 15 | 29641 | 6313 |
| 63 | 59.4 | 8303 | 16 | 28220 | 6011 |

TABLE 3B-continued

| t s | Gamma deg | m kg | Range km | Lift N | Drag N |
|---|---|---|---|---|---|
| 64 | 59.4 | 8242 | 16 | 26818 | 5712 |
| 65 | 59.4 | 8181 | 16 | 25440 | 5419 |
| 66 | 59.6 | 8120 | 17 | 24074 | 5128 |
| 67 | 59.7 | 8061 | 17 | 22739 | 4843 |
| 68 | 59.8 | 8001 | 17 | 21439 | 4566 |
| 69 | 59.9 | 7943 | 18 | 20176 | 4297 |
| 70 | 60.0 | 7884 | 18 | 18954 | 4037 |
| 71 | 60.0 | 7827 | 19 | 17774 | 3786 |
| 72 | 60.1 | 7769 | 19 | 16639 | 3544 |
| 73 | 60.1 | 7713 | 19 | 15549 | 3312 |
| 74 | 60.2 | 7657 | 20 | 14506 | 3090 |
| 75 | 60.2 | 7601 | 20 | 13511 | 2878 |
| 76 | 60.2 | 7545 | 21 | 12564 | 2676 |
| 77 | 60.2 | 7491 | 21 | 11666 | 2485 |
| 78 | 60.3 | 7436 | 21 | 5407 | 2201 |
| 79 | 60.2 | 7382 | 22 | 5005 | 2037 |
| 80 | 60.2 | 7328 | 22 | 4626 | 1883 |
| 81 | 60.1 | 7275 | 23 | 4269 | 1738 |
| 82 | 60.0 | 7221 | 23 | 3934 | 1601 |
| 83 | 60.0 | 7169 | 24 | 3620 | 1473 |
| 84 | 59.8 | 7116 | 24 | 3328 | 1354 |
| 85 | 59.6 | 7065 | 24 | 3055 | 1243 |
| 86 | 59.5 | 7013 | 25 | 5602 | 1193 |
| 87 | 59.3 | 6962 | 25 | 5129 | 1092 |
| 88 | 59.1 | 6911 | 26 | 4689 | 999 |
| 89 | 59.0 | 6860 | 26 | 4282 | 912 |
| 90 | 58.8 | 6810 | 27 | 3904 | 832 |
| 91 | 58.7 | 6760 | 27 | 3555 | 757 |
| 92 | 58.5 | 6711 | 28 | 3233 | 689 |
| 93 | 58.3 | 6662 | 28 | 2936 | 625 |
| 94 | 58.2 | 6613 | 29 | 1331 | 542 |
| 95 | 58.0 | 6565 | 29 | 1206 | 491 |
| 96 | 57.8 | 6526 | 30 | 1083 | 441 |
| 97 | 57.5 | 6495 | 30 | 966 | 393 |
| 98 | 57.3 | 6470 | 31 | 857 | 349 |
| 99 | 57.1 | 6450 | 32 | 758 | 308 |
| 100 | 56.8 | 6434 | 32 | 668 | 272 |
| 101 | 56.6 | 6422 | 33 | 588 | 239 |
| 102 | 56.3 | 6412 | 33 | 517 | 210 |
| 103 | 56.0 | 6403 | 34 | 454 | 185 |
| 104 | 55.7 | 6397 | 34 | 399 | 162 |
| 105 | 55.4 | 6392 | 35 | 350 | 142 |
| 106 | 55.1 | 6392 | 36 | 306 | 125 |
| 107 | 54.8 | 6392 | 36 | 268 | 109 |
| 108 | 54.5 | 6392 | 37 | 235 | 96 |
| 109 | 54.1 | 6392 | 37 | 207 | 84 |
| 110 | 53.8 | 6392 | 38 | 182 | 74 |
| 111 | 53.5 | 6392 | 38 | 160 | 65 |
| 112 | 53.1 | 6392 | 39 | 141 | 58 |
| 113 | 52.8 | 6392 | 40 | 125 | 51 |
| 114 | 52.4 | 6392 | 40 | 110 | 45 |
| 115 | 52.0 | 6392 | 41 | 98 | 40 |
| 116 | 51.7 | 6392 | 41 | 0 | 52 |
| 117 | 51.3 | 6392 | 42 | 0 | 46 |
| 118 | 50.9 | 6392 | 42 | 0 | 41 |
| 119 | 50.5 | 6392 | 43 | 0 | 37 |
| 120 | 50.1 | 6392 | 44 | 0 | 33 |
| 121 | 49.7 | 6392 | 44 | 0 | 29 |
| 122 | 49.3 | 6392 | 45 | 0 | 26 |
| 123 | 48.9 | 6392 | 45 | 0 | 23 |
| 124 | 48.5 | 6392 | 46 | 0 | 21 |
| 125 | 48.0 | 6392 | 47 | 0 | 19 |
| 126 | 47.6 | 6392 | 47 | 0 | 17 |
| 127 | 47.2 | 6392 | 48 | 0 | 15 |
| 128 | 46.7 | 6392 | 48 | 0 | 14 |
| 129 | 46.3 | 6392 | 49 | 0 | 12 |
| 130 | 45.8 | 6392 | 49 | 0 | 11 |
| 131 | 45.3 | 6392 | 50 | 0 | 10 |
| 132 | 44.8 | 6392 | 51 | 0 | 9 |
| 133 | 44.3 | 6392 | 51 | 0 | 8 |
| 134 | 43.8 | 6392 | 52 | 0 | 7 |
| 135 | 43.3 | 6392 | 52 | 0 | 7 |
| 136 | 42.8 | 6392 | 53 | 0 | 6 |
| 137 | 42.3 | 6392 | 53 | 0 | 6 |
| 138 | 41.7 | 6392 | 54 | 0 | 5 |
| 139 | 41.2 | 6392 | 55 | 0 | 5 |

TABLE 3B-continued

| t s | Gamma deg | m kg | Range km | Lift N | Drag N |
|---|---|---|---|---|---|
| 140 | 40.6 | 6392 | 55 | 0 | 4 |
| 141 | 40.1 | 6392 | 56 | 0 | 4 |
| 142 | 39.5 | 6392 | 56 | 0 | 4 |
| 143 | 38.9 | 6392 | 57 | 0 | 3 |
| 144 | 38.3 | 6392 | 57 | 0 | 3 |
| 145 | 37.7 | 6392 | 58 | 0 | 3 |
| 146 | 37.1 | 6392 | 59 | 0 | 3 |
| 147 | 36.5 | 6392 | 59 | 0 | 2 |
| 148 | 35.8 | 6392 | 60 | 0 | 2 |
| 149 | 35.2 | 6392 | 60 | 0 | 2 |
| 150 | 34.5 | 6392 | 61 | 0 | 2 |
| 151 | 33.9 | 6392 | 61 | 0 | 2 |
| 152 | 33.2 | 6392 | 62 | 0 | 2 |
| 153 | 32.5 | 6392 | 63 | 0 | 2 |
| 154 | 31.8 | 6392 | 63 | 0 | 1 |
| 155 | 31.1 | 6392 | 64 | 0 | 1 |
| 156 | 30.4 | 6392 | 64 | 0 | 1 |
| 157 | 29.7 | 6392 | 65 | 0 | 1 |
| 158 | 28.9 | 6392 | 65 | 0 | 1 |
| 159 | 28.2 | 6392 | 66 | 0 | 1 |
| 160 | 27.4 | 6392 | 67 | 0 | 1 |
| 161 | 26.6 | 6392 | 67 | 0 | 1 |
| 162 | 25.8 | 6392 | 68 | 0 | 1 |
| 163 | 25.0 | 6392 | 68 | 0 | 1 |
| 164 | 24.2 | 6392 | 69 | 0 | 1 |
| 165 | 23.4 | 6392 | 69 | 0 | 1 |
| 166 | 22.6 | 6392 | 70 | 0 | 1 |
| 167 | 21.7 | 6392 | 71 | 0 | 1 |
| 168 | 20.9 | 6392 | 71 | 0 | 1 |
| 169 | 20.0 | 6392 | 72 | 0 | 1 |
| 170 | 19.2 | 6392 | 72 | 0 | 1 |
| 171 | 18.3 | 6392 | 73 | 0 | 1 |
| 172 | 17.4 | 6392 | 73 | 0 | 1 |
| 173 | 16.5 | 6392 | 74 | 0 | 1 |
| 174 | 15.6 | 6392 | 75 | 0 | 1 |
| 175 | 14.7 | 6392 | 75 | 0 | 1 |
| 176 | 13.8 | 6392 | 76 | 0 | 1 |
| 177 | 12.8 | 6392 | 76 | 0 | 1 |
| 178 | 11.9 | 6392 | 77 | 0 | 0 |
| 179 | 11.0 | 6392 | 77 | 0 | 0 |
| 180 | 10.0 | 6392 | 78 | 0 | 0 |
| 181 | 9.0 | 6392 | 79 | 0 | 0 |
| 182 | 8.1 | 6392 | 79 | 0 | 0 |
| 183 | 7.1 | 6392 | 80 | 0 | 0 |
| 184 | 6.1 | 6392 | 80 | 0 | 0 |
| 185 | 5.2 | 6392 | 81 | 0 | 0 |
| 186 | 4.2 | 6392 | 81 | 0 | 0 |
| 187 | 3.2 | 6392 | 82 | 0 | 0 |
| 188 | 2.2 | 6392 | 82 | 0 | 0 |
| 189 | 1.2 | 6392 | 83 | 0 | 0 |
| 190 | 0.3 | 6392 | 84 | 0 | 0 |
| 191 | −0.7 | 6392 | 84 | 0 | 0 |
| 192 | −1.7 | 6392 | 85 | 0 | 0 |
| 193 | −2.7 | 6392 | 85 | 0 | 0 |
| 194 | −3.7 | 6392 | 86 | 0 | 0 |
| 195 | −4.7 | 6392 | 86 | 0 | 0 |
| 196 | −5.7 | 6392 | 87 | 0 | 0 |
| 197 | −6.6 | 6392 | 88 | 0 | 0 |
| 198 | −7.6 | 6392 | 88 | 0 | 0 |
| 199 | −8.6 | 6392 | 89 | 0 | 0 |
| 200 | −9.6 | 6392 | 89 | 0 | 0 |
| 201 | −10.5 | 6392 | 90 | 0 | 0 |
| 202 | −11.5 | 6392 | 90 | 0 | 0 |
| 203 | −12.4 | 6392 | 91 | 0 | 0 |
| 204 | −13.4 | 6392 | 92 | 0 | 0 |
| 205 | −14.3 | 6392 | 92 | 5 | 3 |
| 206 | −15.2 | 6392 | 93 | 5 | 4 |
| 207 | −16.2 | 6392 | 93 | 5 | 4 |
| 208 | −17.1 | 6392 | 94 | 6 | 4 |
| 209 | −18.0 | 6392 | 94 | 6 | 4 |
| 210 | −18.9 | 6392 | 95 | 6 | 4 |
| 211 | −19.8 | 6392 | 96 | 6 | 4 |
| 212 | −20.6 | 6392 | 96 | 6 | 4 |
| 213 | −21.5 | 6392 | 97 | 7 | 5 |
| 214 | −22.4 | 6392 | 97 | 7 | 5 |
| 215 | −23.2 | 6392 | 98 | 7 | 5 |
| 216 | −24.0 | 6392 | 98 | 8 | 5 |
| 217 | −24.9 | 6392 | 99 | 8 | 5 |
| 218 | −25.7 | 6392 | 100 | 9 | 6 |
| 219 | −26.5 | 6392 | 100 | 9 | 6 |
| 220 | −27.3 | 6392 | 101 | 9 | 6 |
| 221 | −28.1 | 6392 | 101 | 10 | 7 |
| 222 | −28.8 | 6392 | 102 | 11 | 7 |
| 223 | −29.6 | 6392 | 102 | 11 | 8 |
| 224 | −30.3 | 6392 | 103 | 12 | 8 |
| 225 | −31.1 | 6392 | 103 | 13 | 9 |
| 226 | −31.8 | 6392 | 104 | 14 | 9 |
| 227 | −32.5 | 6392 | 105 | 14 | 10 |
| 228 | −33.2 | 6392 | 105 | 15 | 10 |
| 229 | −33.9 | 6392 | 106 | 16 | 11 |
| 230 | −34.6 | 6392 | 106 | 18 | 12 |
| 231 | −35.3 | 6392 | 107 | 19 | 13 |
| 232 | −35.9 | 6392 | 107 | 20 | 14 |
| 233 | −36.6 | 6392 | 108 | 22 | 15 |
| 234 | −37.2 | 6392 | 109 | 24 | 16 |
| 235 | −37.9 | 6392 | 109 | 26 | 17 |
| 236 | −38.5 | 6392 | 110 | 28 | 19 |
| 237 | −39.1 | 6392 | 110 | 30 | 20 |
| 238 | −39.7 | 6392 | 111 | 33 | 22 |
| 239 | −40.3 | 6392 | 111 | 35 | 24 |
| 240 | −40.9 | 6392 | 112 | 38 | 26 |
| 241 | −41.4 | 6392 | 113 | 42 | 28 |
| 242 | −42.0 | 6392 | 113 | 46 | 31 |
| 243 | −42.5 | 6392 | 114 | 50 | 34 |
| 244 | −43.1 | 6392 | 114 | 55 | 37 |
| 245 | −43.6 | 6392 | 115 | 60 | 41 |
| 246 | −44.1 | 6392 | 115 | 66 | 45 |
| 247 | −44.6 | 6392 | 116 | 72 | 49 |
| 248 | −45.1 | 6392 | 116 | 80 | 54 |
| 249 | −45.6 | 6392 | 117 | 88 | 59 |
| 250 | −46.1 | 6392 | 118 | 97 | 68 |
| 251 | −46.6 | 6392 | 118 | 107 | 72 |
| 252 | −47.1 | 6392 | 119 | 118 | 80 |
| 253 | −47.5 | 6392 | 119 | 131 | 89 |
| 254 | −48.0 | 6392 | 120 | 146 | 99 |
| 255 | −48.4 | 6392 | 120 | 162 | 110 |
| 256 | −48.9 | 6392 | 121 | 180 | 122 |
| 257 | −49.3 | 6392 | 122 | 200 | 136 |
| 258 | −49.7 | 6392 | 122 | 224 | 151 |
| 259 | −50.1 | 6392 | 123 | 250 | 169 |
| 260 | −50.5 | 6392 | 123 | 279 | 189 |
| 261 | −50.9 | 6392 | 124 | 313 | 212 |
| 262 | −51.3 | 6392 | 124 | 351 | 238 |
| 263 | −51.7 | 6392 | 125 | 394 | 267 |
| 264 | −52.1 | 6392 | 125 | 443 | 300 |
| 265 | −52.5 | 6392 | 126 | 499 | 338 |
| 266 | −52.8 | 6392 | 127 | 562 | 381 |
| 267 | −53.2 | 6392 | 127 | 635 | 430 |
| 268 | −53.5 | 6392 | 128 | 717 | 486 |
| 269 | −53.9 | 6392 | 128 | 812 | 550 |
| 270 | −54.2 | 6392 | 129 | 920 | 623 |
| 271 | −54.6 | 6392 | 129 | 1044 | 707 |
| 272 | −54.9 | 6392 | 130 | 1186 | 803 |
| 273 | −55.2 | 6392 | 131 | 1349 | 914 |
| 274 | −55.5 | 6392 | 131 | 1537 | 1041 |
| 275 | −55.8 | 6392 | 132 | 1752 | 1187 |
| 276 | −56.1 | 6392 | 132 | 2001 | 1355 |
| 277 | −56.4 | 6392 | 133 | 2287 | 1549 |
| 278 | −56.7 | 6392 | 133 | 2618 | 1773 |
| 279 | −57.0 | 6392 | 134 | 3000 | 2032 |
| 280 | −57.2 | 6392 | 135 | 3442 | 2331 |
| 281 | −57.5 | 6392 | 135 | 3953 | 2678 |
| 282 | −57.8 | 6392 | 136 | 4546 | 3079 |
| 283 | −58.0 | 6392 | 136 | 5233 | 3544 |
| 284 | −58.2 | 6392 | 137 | 6030 | 4085 |
| 285 | −58.5 | 6392 | 137 | 6956 | 4712 |
| 286 | −58.7 | 6392 | 138 | 8033 | 5441 |
| 287 | −58.9 | 6392 | 138 | 9284 | 6288 |
| 288 | −59.1 | 6392 | 139 | 10740 | 7275 |
| 289 | −59.2 | 6392 | 140 | 12435 | 8422 |
| 290 | −59.4 | 6392 | 140 | 14407 | 9759 |
| 291 | −59.5 | 6392 | 141 | 16704 | 11314 |

TABLE 3B-continued

| t s | Gamma deg | m kg | Range km | Lift N | Drag N |
|---|---|---|---|---|---|
| 292 | −59.7 | 6392 | 141 | 19377 | 13125 |
| 293 | −59.8 | 6392 | 142 | 22487 | 15231 |
| 294 | −59.8 | 6392 | 142 | 26105 | 17682 |
| 295 | −59.9 | 6392 | 143 | 30308 | 20529 |
| 296 | −59.9 | 6392 | 144 | 35186 | 23833 |
| 297 | −59.9 | 6392 | 144 | 40838 | 27661 |
| 298 | −59.8 | 6392 | 145 | 47373 | 32087 |
| 299 | −59.7 | 6392 | 145 | 54908 | 37191 |
| 300 | −59.5 | 6392 | 146 | 63568 | 43057 |
| 301 | −59.2 | 6392 | 147 | 73481 | 49771 |
| 302 | −58.9 | 6392 | 147 | 84772 | 52419 |
| 303 | −58.5 | 6392 | 148 | 97554 | 66077 |
| 304 | −58.0 | 6392 | 148 | 111923 | 75809 |
| 305 | −57.4 | 6392 | 149 | 127937 | 86656 |
| 306 | −56.7 | 6392 | 150 | 145603 | 98622 |
| 307 | −55.8 | 6392 | 150 | 164856 | 111662 |
| 308 | −54.8 | 6392 | 151 | 185541 | 125673 |
| 309 | −53.7 | 6392 | 152 | 207391 | 140473 |
| 310 | −52.3 | 6392 | 152 | 226179 | 112399 |
| 311 | −50.8 | 6392 | 153 | 217605 | 125102 |
| 312 | −49.4 | 6392 | 154 | 235623 | 96888 |
| 313 | −47.8 | 6392 | 154 | 229877 | 107415 |
| 314 | −46.2 | 6392 | 155 | 224289 | 118241 |
| 315 | −44.7 | 6392 | 156 | 213642 | 129190 |
| 316 | −43.3 | 6392 | 157 | 231626 | 95648 |
| 317 | −41.7 | 6392 | 157 | 230213 | 104264 |
| 318 | −40.2 | 6392 | 158 | 225107 | 112875 |
| 319 | −38.6 | 6392 | 159 | 224681 | 121328 |
| 320 | −37.1 | 6392 | 160 | 221314 | 129469 |
| 321 | −35.6 | 6392 | 161 | 234414 | 93082 |
| 322 | −33.9 | 6392 | 161 | 229080 | 99233 |
| 323 | −32.3 | 6392 | 162 | 231580 | 105093 |
| 324 | −30.7 | 6392 | 163 | 226239 | 110567 |
| 325 | −29.1 | 6392 | 164 | 224304 | 115547 |
| 326 | −27.5 | 6392 | 165 | 226567 | 119955 |
| 327 | −25.9 | 6392 | 165 | 220691 | 123717 |
| 328 | −24.3 | 6392 | 166 | 219478 | 126765 |
| 329 | −22.7 | 6392 | 167 | 216699 | 129071 |
| 330 | −21.1 | 6392 | 168 | 212437 | 130615 |
| 331 | −19.5 | 6392 | 169 | 206815 | 131397 |
| 332 | −18.0 | 6392 | 170 | 213783 | 131442 |
| 333 | −16.4 | 6392 | 170 | 219592 | 130794 |
| 334 | −14.7 | 6392 | 171 | 217367 | 129469 |
| 335 | −12.9 | 6392 | 172 | 214057 | 127498 |
| 336 | −11.2 | 6392 | 173 | 205580 | 124947 |
| 337 | −9.5 | 6392 | 174 | 196544 | 121894 |
| 338 | −7.9 | 6392 | 174 | 187140 | 118430 |
| 339 | −6.4 | 6392 | 175 | 177540 | 114647 |
| 340 | −5.0 | 6392 | 176 | 167897 | 162989 |
| 341 | −3.7 | 6392 | 176 | 154608 | 153152 |
| 342 | −2.5 | 6392 | 177 | 137872 | 143741 |
| 343 | −1.4 | 6392 | 178 | 122826 | 134814 |
| 344 | −0.6 | 6392 | 178 | 109420 | 126420 |
| 345 | 0.1 | 6392 | 179 | 97504 | 118581 |

TABLE 3C

| t s | rho kg/m3 | Thrust N | del h m | del v m/s | del gam deg | alpha deg |
|---|---|---|---|---|---|---|
| 0 | 0.14812 | 0.0 | 41 | −3 | 0.3 | 10.0 |
| 1 | 0.14727 | 0.0 | 42 | −3 | 0.2 | 10.0 |
| 2 | 0.14640 | 0.0 | 42 | −3 | 0.2 | 10.0 |
| 3 | 0.14554 | 0.0 | 42 | −3 | 0.1 | 10.0 |
| 4 | 0.14467 | 0.0 | 42 | −3 | 0.0 | 10.0 |
| 5 | 0.14382 | 130326.3 | 42 | 8 | 1.2 | 10.0 |
| 6 | 0.14298 | 130839.2 | 48 | 8 | 1.4 | 10.0 |
| 7 | 0.14201 | 131329.8 | 55 | 7 | 1.6 | 10.0 |
| 8 | 0.14091 | 131785.5 | 64 | 7 | 1.8 | 10.0 |
| 9 | 0.13965 | 129921.5 | 73 | 7 | 1.5 | 10.0 |
| 10 | 0.13822 | 130178.6 | 81 | 7 | 1.6 | 10.0 |
| 11 | 0.13665 | 130387.8 | 90 | 6 | 1.7 | 10.0 |
| 12 | 0.13492 | 128350.2 | 100 | 6 | 1.4 | 10.0 |

TABLE 3C-continued

| t s | rho kg/m3 | Thrust N | del h m | del v m/s | del gam deg | alpha deg |
|---|---|---|---|---|---|---|
| 13 | 0.13303 | 128380.7 | 108 | 6 | 1.4 | 10.0 |
| 14 | 0.13101 | 128363.0 | 117 | 6 | 1.5 | 10.0 |
| 15 | 0.12886 | 128292.3 | 126 | 5 | 1.6 | 10.0 |
| 16 | 0.12659 | 128164.6 | 136 | 5 | 1.7 | 10.0 |
| 17 | 0.12418 | 127976.7 | 146 | 5 | 1.7 | 10.0 |
| 18 | 0.12165 | 127726.1 | 156 | 5 | 1.8 | 10.0 |
| 19 | 0.11901 | 127411.5 | 167 | 4 | 1.8 | 10.0 |
| 20 | 0.11624 | 127032.3 | 177 | 4 | 1.8 | 10.0 |
| 21 | 0.11338 | 126589.0 | 188 | 4 | 1.9 | 10.0 |
| 22 | 0.11042 | 126083.0 | 198 | 4 | 1.9 | 10.0 |
| 23 | 0.10738 | 125516.7 | 209 | 3 | 1.9 | 10.0 |
| 24 | 0.10427 | 124893.1 | 219 | 3 | 1.9 | 10.0 |
| 25 | 0.10110 | 124216.0 | 229 | 3 | 1.9 | 10.0 |
| 26 | 0.09789 | 123489.8 | 239 | 3 | 1.9 | 10.0 |
| 27 | 0.09466 | 122719.3 | 248 | 2 | 1.9 | 10.0 |
| 28 | 0.09141 | 121909.5 | 257 | 2 | 1.9 | 10.0 |
| 29 | 0.08815 | 121065.6 | 266 | 2 | 1.8 | 10.0 |
| 30 | 0.08491 | 150000.0 | 274 | 5 | 1.5 | 10.0 |
| 31 | 0.08170 | 151500.0 | 283 | 5 | 1.5 | 10.0 |
| 32 | 0.07850 | 153015.0 | 292 | 5 | 1.5 | 10.0 |
| 33 | 0.07533 | 200000.0 | 302 | 10 | 0.4 | 8.0 |
| 34 | 0.07220 | 202000.0 | 311 | 10 | 0.3 | 6.0 |
| 35 | 0.06911 | 204020.0 | 320 | 10 | 0.2 | 4.0 |
| 36 | 0.06606 | 206060.2 | 330 | 11 | 0.1 | 2.0 |
| 37 | 0.06306 | 208120.8 | 340 | 11 | 0.1 | 2.0 |
| 38 | 0.06011 | 206247.7 | 349 | 11 | 0.1 | 2.0 |
| 39 | 0.05723 | 204391.5 | 359 | 11 | 0.2 | 4.0 |
| 40 | 0.05440 | 202552.0 | 370 | 11 | 0.1 | 2.0 |
| 41 | 0.05164 | 200729.0 | 380 | 11 | 0.1 | 2.0 |
| 42 | 0.04895 | 198922.4 | 389 | 11 | 0.1 | 2.0 |
| 43 | 0.04634 | 197132.1 | 399 | 11 | 0.1 | 2.0 |
| 44 | 0.04381 | 195357.9 | 409 | 11 | 0.1 | 2.0 |
| 45 | 0.04135 | 193599.7 | 419 | 11 | 0.1 | 2.0 |
| 46 | 0.03898 | 191857.3 | 429 | 11 | 0.1 | 2.0 |
| 47 | 0.03670 | 190130.6 | 439 | 11 | −0.2 | 2.0 |
| 48 | 0.03450 | 188419.4 | 447 | 11 | −0.2 | 2.0 |
| 49 | 0.03239 | 186723.7 | 456 | 11 | −0.2 | 2.0 |
| 50 | 0.03038 | 185043.1 | 464 | 11 | −0.2 | 2.0 |
| 51 | 0.02845 | 183562.8 | 472 | 11 | −0.2 | 2.0 |
| 52 | 0.02662 | 182094.3 | 481 | 11 | −0.2 | 2.0 |
| 53 | 0.02488 | 180637.5 | 489 | 11 | 0.0 | 2.0 |
| 54 | 0.02322 | 179192.4 | 498 | 11 | 0.0 | 2.0 |
| 55 | 0.02165 | 177758.9 | 508 | 11 | 0.1 | 5.0 |
| 56 | 0.02015 | 176336.8 | 518 | 11 | 0.1 | 5.0 |
| 57 | 0.01874 | 174926.1 | 527 | 11 | 0.1 | 5.0 |
| 58 | 0.01740 | 173526.7 | 537 | 11 | 0.1 | 5.0 |
| 59 | 0.01613 | 172138.5 | 547 | 11 | 0.1 | 5.0 |
| 60 | 0.01493 | 170589.3 | 556 | 11 | 0.1 | 5.0 |
| 61 | 0.01381 | 169054.0 | 566 | 11 | 0.0 | 5.0 |
| 62 | 0.01275 | 167532.5 | 575 | 11 | 0.0 | 5.0 |
| 63 | 0.01176 | 166024.7 | 585 | 11 | 0.0 | 5.0 |
| 64 | 0.01083 | 164530.5 | 594 | 11 | 0.0 | 5.0 |
| 65 | 0.00996 | 163049.7 | 603 | 11 | 0.1 | 10.0 |
| 66 | 0.00915 | 161582.2 | 613 | 11 | 0.1 | 10.0 |
| 67 | 0.00839 | 160128.0 | 623 | 11 | 0.1 | 10.0 |
| 68 | 0.00768 | 158686.8 | 633 | 10 | 0.1 | 10.0 |
| 69 | 0.00703 | 157258.7 | 643 | 10 | 0.1 | 10.0 |
| 70 | 0.00642 | 155843.3 | 652 | 10 | 0.1 | 10.0 |
| 71 | 0.00586 | 154440.8 | 662 | 10 | 0.1 | 10.0 |
| 72 | 0.00534 | 153050.8 | 671 | 10 | 0.0 | 10.0 |
| 73 | 0.00485 | 151673.3 | 681 | 10 | 0.0 | 10.0 |
| 74 | 0.00441 | 150459.9 | 690 | 10 | 0.0 | 10.0 |
| 75 | 0.00400 | 149406.7 | 699 | 10 | 0.0 | 10.0 |
| 76 | 0.00363 | 148360.9 | 708 | 11 | 0.0 | 10.0 |
| 77 | 0.00328 | 147322.3 | 718 | 11 | 0.0 | 10.0 |
| 78 | 0.00297 | 146291.1 | 727 | 11 | −0.0 | 10.0 |
| 79 | 0.00268 | 145267.1 | 736 | 11 | −0.1 | 10.0 |
| 80 | 0.00241 | 144250.2 | 745 | 11 | −0.1 | 10.0 |
| 81 | 0.00217 | 143240.4 | 753 | 11 | −0.1 | 10.0 |
| 82 | 0.00196 | 142237.7 | 762 | 11 | −0.1 | 10.0 |
| 83 | 0.00176 | 141242.1 | 771 | 11 | −0.2 | 5.0 |
| 84 | 0.00158 | 140253.4 | 779 | 11 | −0.2 | 5.0 |
| 85 | 0.00141 | 139271.6 | 787 | 11 | −0.2 | 5.0 |
| 86 | 0.00126 | 138296.7 | 795 | 11 | −0.2 | 5.0 |
| 87 | 0.00113 | 137328.6 | 803 | 11 | −0.2 | 5.0 |
| 88 | 0.00101 | 136367.3 | 812 | 11 | −0.2 | 5.0 |

TABLE 3C-continued

| t s | rho kg/m3 | Thrust N | del h m | del v m/s | del gam deg | alpha deg |
|---|---|---|---|---|---|---|
| 89 | 0.00090 | 135412.8 | 820 | 11 | −0.2 | 5.0 |
| 90 | 0.00080 | 134464.9 | 828 | 11 | −0.2 | 5.0 |
| 91 | 0.00071 | 133523.6 | 836 | 11 | −0.2 | 5.0 |
| 92 | 0.00063 | 132589.0 | 844 | 11 | −0.2 | 5.0 |
| 93 | 0.00056 | 131660.8 | 852 | 11 | −0.2 | 5.0 |
| 94 | 0.00050 | 130739.2 | 860 | 11 | −0.2 | 5.0 |
| 95 | 0.00044 | 104591.4 | 868 | 7 | −0.2 | 5.0 |
| 96 | 0.00039 | 83673.1 | 872 | 4 | −0.2 | 5.0 |
| 97 | 0.00035 | 66938.5 | 874 | 2 | −0.2 | 5.0 |
| 98 | 0.00031 | 53550.8 | 873 | −0 | −0.2 | 5.0 |
| 99 | 0.00027 | 42840.6 | 871 | −2 | −0.3 | 5.0 |
| 100 | 0.00024 | 34272.5 | 867 | −3 | −0.3 | 5.0 |
| 101 | 0.00021 | 27418.0 | 862 | −4 | −0.3 | 5.0 |
| 102 | 0.00019 | 21934.4 | 856 | −5 | −0.3 | 5.0 |
| 103 | 0.00017 | 17547.5 | 849 | −5 | −0.3 | 5.0 |
| 104 | 0.00015 | 14038.0 | 842 | −6 | −0.3 | 5.0 |
| 105 | 0.00013 | 0.0 | 834 | −8 | −0.3 | 5.0 |
| 106 | 0.00012 | 0.0 | 824 | −8 | −0.3 | 5.0 |
| 107 | 0.00010 | 0.0 | 814 | −8 | −0.3 | 5.0 |
| 108 | 0.00009 | 0.0 | 804 | −8 | −0.3 | 5.0 |
| 109 | 0.00008 | 0.0 | 795 | −8 | −0.3 | 5.0 |
| 110 | 0.00007 | 0.0 | 785 | −8 | −0.3 | 5.0 |
| 111 | 0.00007 | 0.0 | 775 | −8 | −0.3 | 5.0 |
| 112 | 0.00006 | 0.0 | 765 | −8 | −0.4 | 5.0 |
| 113 | 0.00005 | 0.0 | 756 | −8 | −0.4 | 5.0 |
| 114 | 0.00005 | 0.0 | 746 | −8 | −0.4 | 5.0 |
| 115 | 0.00004 | 0.0 | 736 | −8 | −0.4 | 5.0 |
| 116 | 0.00004 | 0.0 | 726 | −8 | −0.4 | 0.0 |
| 117 | 0.00004 | 0.0 | 716 | −8 | −0.4 | 0.0 |
| 118 | 0.00003 | 0.0 | 707 | −8 | −0.4 | 0.0 |
| 119 | 0.00003 | 0.0 | 697 | −8 | −0.4 | 0.0 |
| 120 | 0.00003 | 0.0 | 687 | −7 | −0.4 | 0.0 |
| 121 | 0.00002 | 0.0 | 677 | −7 | −0.4 | 0.0 |
| 122 | 0.00002 | 0.0 | 667 | −7 | −0.4 | 0.0 |
| 123 | 0.00002 | 0.0 | 658 | −7 | −0.4 | 0.0 |
| 124 | 0.00002 | 0.0 | 648 | −7 | −0.4 | 0.0 |
| 125 | 0.00002 | 0.0 | 638 | −7 | −0.4 | 0.0 |
| 126 | 0.00001 | 0.0 | 628 | −7 | −0.4 | 0.0 |
| 127 | 0.00001 | 0.0 | 619 | −7 | −0.5 | 0.0 |
| 128 | 0.00001 | 0.0 | 609 | −7 | −0.5 | 0.0 |
| 129 | 0.00001 | 0.0 | 599 | −7 | −0.5 | 0.0 |
| 130 | 0.00001 | 0.0 | 589 | −7 | −0.5 | 0.0 |
| 131 | 0.00001 | 0.0 | 579 | −7 | −0.5 | 0.0 |
| 132 | 0.00001 | 0.0 | 570 | −7 | −0.5 | 0.0 |
| 133 | 0.00001 | 0.0 | 560 | −7 | −0.5 | 0.0 |
| 134 | 0.00001 | 0.0 | 550 | −7 | −0.5 | 0.0 |
| 135 | 0.00001 | 0.0 | 540 | −7 | −0.5 | 0.0 |
| 136 | 0.00001 | 0.0 | 531 | −7 | −0.5 | 0.0 |
| 137 | 0.00001 | 0.0 | 521 | −7 | −0.5 | 0.0 |
| 138 | 0.00001 | 0.0 | 511 | −7 | −0.5 | 0.0 |
| 139 | 0.00001 | 0.0 | 501 | −6 | −0.6 | 0.0 |
| 140 | 0.00000 | 0.0 | 491 | −6 | −0.6 | 0.0 |
| 141 | 0.00000 | 0.0 | 482 | −6 | −0.6 | 0.0 |
| 142 | 0.00000 | 0.0 | 472 | −6 | −0.6 | 0.0 |
| 143 | 0.00000 | 0.0 | 462 | −6 | −0.6 | 0.0 |
| 144 | 0.00000 | 0.0 | 452 | −6 | −0.6 | 0.0 |
| 145 | 0.00000 | 0.0 | 443 | −6 | −0.6 | 0.0 |
| 146 | 0.00000 | 0.0 | 433 | −6 | −0.6 | 0.0 |
| 147 | 0.00000 | 0.0 | 423 | −6 | −0.6 | 0.0 |
| 148 | 0.00000 | 0.0 | 413 | −6 | −0.6 | 0.0 |
| 149 | 0.00000 | 0.0 | 403 | −6 | −0.7 | 0.0 |
| 150 | 0.00000 | 0.0 | 394 | −6 | −0.7 | 0.0 |
| 151 | 0.00000 | 0.0 | 384 | −5 | −0.7 | 0.0 |
| 152 | 0.00000 | 0.0 | 374 | −5 | −0.7 | 0.0 |
| 153 | 0.00000 | 0.0 | 364 | −5 | −0.7 | 0.0 |
| 154 | 0.00000 | 0.0 | 355 | −5 | −0.7 | 0.0 |
| 155 | 0.00000 | 0.0 | 345 | −5 | −0.7 | 0.0 |
| 156 | 0.00000 | 0.0 | 335 | −5 | −0.7 | 0.0 |
| 157 | 0.00000 | 0.0 | 325 | −5 | −0.7 | 0.0 |
| 158 | 0.00000 | 0.0 | 316 | −5 | −0.8 | 0.0 |
| 159 | 0.00000 | 0.0 | 306 | −5 | −0.8 | 0.0 |
| 160 | 0.00000 | 0.0 | 296 | −5 | −0.8 | 0.0 |
| 161 | 0.00000 | 0.0 | 286 | −4 | −0.8 | 0.0 |
| 162 | 0.00000 | 0.0 | 276 | −4 | −0.8 | 0.0 |
| 163 | 0.00000 | 0.0 | 267 | −4 | −0.8 | 0.0 |
| 164 | 0.00000 | 0.0 | 257 | −4 | −0.8 | 0.0 |
| 165 | 0.00000 | 0.0 | 247 | −4 | −0.8 | 0.0 |
| 166 | 0.00000 | 0.0 | 237 | −4 | −0.8 | 0.0 |
| 167 | 0.00000 | 0.0 | 228 | −4 | −0.8 | 0.0 |
| 168 | 0.00000 | 0.0 | 218 | −3 | −0.9 | 0.0 |
| 169 | 0.00000 | 0.0 | 208 | −3 | −0.9 | 0.0 |
| 170 | 0.00000 | 0.0 | 198 | −3 | −0.9 | 0.0 |
| 171 | 0.00000 | 0.0 | 188 | −3 | −0.9 | 0.0 |
| 172 | 0.00000 | 0.0 | 179 | −3 | −0.9 | 0.0 |
| 173 | 0.00000 | 0.0 | 169 | −3 | −0.9 | 0.0 |
| 174 | 0.00000 | 0.0 | 159 | −3 | −0.9 | 0.0 |
| 175 | 0.00000 | 0.0 | 149 | −2 | −0.9 | 0.0 |
| 176 | 0.00000 | 0.0 | 140 | −2 | −0.9 | 0.0 |
| 177 | 0.00000 | 0.0 | 130 | −2 | −0.9 | 0.0 |
| 178 | 0.00000 | 0.0 | 120 | −2 | −0.9 | 0.0 |
| 179 | 0.00000 | 0.0 | 110 | −2 | −1.0 | 0.0 |
| 180 | 0.00000 | 0.0 | 100 | −2 | −1.0 | 0.0 |
| 181 | 0.00000 | 0.0 | 91 | −2 | −1.0 | 0.0 |
| 182 | 0.00000 | 0.0 | 81 | −1 | −1.0 | 0.0 |
| 183 | 0.00000 | 0.0 | 71 | −1 | −1.0 | 0.0 |
| 184 | 0.00000 | 0.0 | 61 | −1 | −1.0 | 0.0 |
| 185 | 0.00000 | 0.0 | 51 | −1 | −1.0 | 0.0 |
| 186 | 0.00000 | 0.0 | 42 | −1 | −1.0 | 0.0 |
| 187 | 0.00000 | 0.0 | 32 | −1 | −1.0 | 0.0 |
| 188 | 0.00000 | 0.0 | 22 | −0 | −1.0 | 0.0 |
| 189 | 0.00000 | 0.0 | 12 | −0 | −1.0 | 0.0 |
| 190 | 0.00000 | 0.0 | 3 | −0 | −1.0 | 0.0 |
| 191 | 0.00000 | 0.0 | −7 | 0 | −1.0 | 0.0 |
| 192 | 0.00000 | 0.0 | −17 | 0 | −1.0 | 0.0 |
| 193 | 0.00000 | 0.0 | −27 | 0 | −1.0 | 0.0 |
| 194 | 0.00000 | 0.0 | −37 | 1 | −1.0 | 0.0 |
| 195 | 0.00000 | 0.0 | −47 | 1 | −1.0 | 0.0 |
| 196 | 0.00000 | 0.0 | −56 | 1 | −1.0 | 0.0 |
| 197 | 0.00000 | 0.0 | −66 | 1 | −1.0 | 0.0 |
| 198 | 0.00000 | 0.0 | −76 | 1 | −1.0 | 0.0 |
| 199 | 0.00000 | 0.0 | −86 | 1 | −1.0 | 0.0 |
| 200 | 0.00000 | 0.0 | −96 | 2 | −1.0 | 0.0 |
| 201 | 0.00000 | 0.0 | −105 | 2 | −1.0 | 0.0 |
| 202 | 0.00000 | 0.0 | −115 | 2 | −1.0 | 0.0 |
| 203 | 0.00000 | 0.0 | −125 | 2 | −0.9 | 0.0 |
| 204 | 0.00000 | 0.0 | −135 | 2 | −0.9 | 0.0 |
| 205 | 0.00000 | 0.0 | −145 | 2 | −0.9 | 30.0 |
| 206 | 0.00000 | 0.0 | −154 | 3 | −0.9 | 30.0 |
| 207 | 0.00000 | 0.0 | −164 | 3 | −0.9 | 30.0 |
| 208 | 0.00000 | 0.0 | −174 | 3 | −0.9 | 30.0 |
| 209 | 0.00000 | 0.0 | −184 | 3 | −0.9 | 30.0 |
| 210 | 0.00000 | 0.0 | −194 | 3 | −0.9 | 30.0 |
| 211 | 0.00000 | 0.0 | −204 | 3 | −0.9 | 30.0 |
| 212 | 0.00000 | 0.0 | −213 | 3 | −0.9 | 30.0 |
| 213 | 0.00000 | 0.0 | −223 | 4 | −0.9 | 30.0 |
| 214 | 0.00000 | 0.0 | −233 | 4 | −0.8 | 30.0 |
| 215 | 0.00000 | 0.0 | −243 | 4 | −0.8 | 30.0 |
| 216 | 0.00000 | 0.0 | −253 | 4 | −0.8 | 30.0 |
| 217 | 0.00000 | 0.0 | −262 | 4 | −0.8 | 30.0 |
| 218 | 0.00000 | 0.0 | −272 | 4 | −0.8 | 30.0 |
| 219 | 0.00000 | 0.0 | −282 | 4 | −0.8 | 30.0 |
| 220 | 0.00000 | 0.0 | −292 | 4 | −0.8 | 30.0 |
| 221 | 0.00000 | 0.0 | −302 | 5 | −0.8 | 30.0 |
| 222 | 0.00000 | 0.0 | −312 | 5 | −0.8 | 30.0 |
| 223 | 0.00000 | 0.0 | −321 | 5 | −0.8 | 30.0 |
| 224 | 0.00000 | 0.0 | −331 | 5 | −0.7 | 30.0 |
| 225 | 0.00000 | 0.0 | −341 | 5 | −0.7 | 30.0 |
| 226 | 0.00000 | 0.0 | −351 | 5 | −0.7 | 30.0 |
| 227 | 0.00000 | 0.0 | −361 | 5 | −0.7 | 30.0 |
| 228 | 0.00000 | 0.0 | −371 | 5 | −0.7 | 30.0 |
| 229 | 0.00000 | 0.0 | −380 | 5 | −0.7 | 30.0 |
| 230 | 0.00000 | 0.0 | −390 | 6 | −0.7 | 30.0 |
| 231 | 0.00000 | 0.0 | −400 | 6 | −0.7 | 30.0 |
| 232 | 0.00000 | 0.0 | −410 | 6 | −0.7 | 30.0 |
| 233 | 0.00000 | 0.0 | −420 | 6 | −0.6 | 30.0 |
| 234 | 0.00000 | 0.0 | −429 | 6 | −0.6 | 30.0 |
| 235 | 0.00000 | 0.0 | −439 | 6 | −0.6 | 30.0 |
| 236 | 0.00000 | 0.0 | −449 | 6 | −0.6 | 30.0 |
| 237 | 0.00000 | 0.0 | −459 | 6 | −0.6 | 30.0 |
| 238 | 0.00000 | 0.0 | −469 | 6 | −0.6 | 30.0 |
| 239 | 0.00000 | 0.0 | −479 | 6 | −0.6 | 30.0 |
| 240 | 0.00000 | 0.0 | −488 | 6 | −0.6 | 30.0 |

TABLE 3C-continued

| t s | rho kg/m3 | Thrust N | del h m | del v m/s | del gam deg | alpha deg |
|---|---|---|---|---|---|---|
| 241 | 0.00000 | 0.0 | −498 | 6 | −0.6 | 30.0 |
| 242 | 0.00001 | 0.0 | −508 | 7 | −0.5 | 30.0 |
| 243 | 0.00001 | 0.0 | −518 | 7 | −0.5 | 30.0 |
| 244 | 0.00001 | 0.0 | −528 | 7 | −0.5 | 30.0 |
| 245 | 0.00001 | 0.0 | −537 | 7 | −0.5 | 30.0 |
| 246 | 0.00001 | 0.0 | −547 | 7 | −0.5 | 30.0 |
| 247 | 0.00001 | 0.0 | −557 | 7 | −0.5 | 30.0 |
| 248 | 0.00001 | 0.0 | −567 | 7 | −0.5 | 30.0 |
| 249 | 0.00001 | 0.0 | −577 | 7 | −0.5 | 30.0 |
| 250 | 0.00001 | 0.0 | −588 | 7 | −0.5 | 30.0 |
| 251 | 0.00001 | 0.0 | −596 | 7 | −0.5 | 30.0 |
| 252 | 0.00001 | 0.0 | −606 | 7 | −0.5 | 30.0 |
| 253 | 0.00001 | 0.0 | −616 | 7 | −0.5 | 30.0 |
| 254 | 0.00001 | 0.0 | −626 | 7 | −0.4 | 30.0 |
| 255 | 0.00001 | 0.0 | −636 | 7 | −0.4 | 30.0 |
| 256 | 0.00002 | 0.0 | −645 | 7 | −0.4 | 30.0 |
| 257 | 0.00002 | 0.0 | −655 | 7 | −0.4 | 30.0 |
| 258 | 0.00002 | 0.0 | −665 | 7 | −0.4 | 30.0 |
| 259 | 0.00002 | 0.0 | −675 | 7 | −0.4 | 30.0 |
| 260 | 0.00002 | 0.0 | −684 | 8 | −0.4 | 30.0 |
| 261 | 0.00003 | 0.0 | −694 | 8 | −0.4 | 30.0 |
| 262 | 0.00003 | 0.0 | −704 | 8 | −0.4 | 30.0 |
| 263 | 0.00003 | 0.0 | −714 | 8 | −0.4 | 30.0 |
| 264 | 0.00003 | 0.0 | −723 | 8 | −0.4 | 30.0 |
| 265 | 0.00004 | 0.0 | −733 | 8 | −0.4 | 30.0 |
| 266 | 0.00004 | 0.0 | −743 | 8 | −0.4 | 30.0 |
| 267 | 0.00005 | 0.0 | −753 | 8 | −0.4 | 30.0 |
| 268 | 0.00005 | 0.0 | −762 | 8 | −0.3 | 30.0 |
| 269 | 0.00006 | 0.0 | −772 | 8 | −0.3 | 30.0 |
| 270 | 0.00006 | 0.0 | −782 | 8 | −0.3 | 30.0 |
| 271 | 0.00007 | 0.0 | −791 | 8 | −0.3 | 30.0 |
| 272 | 0.00008 | 0.0 | −801 | 8 | −0.3 | 30.0 |
| 273 | 0.00009 | 0.0 | −811 | 8 | −0.3 | 30.0 |
| 274 | 0.00010 | 0.0 | −820 | 8 | −0.3 | 30.0 |
| 275 | 0.00011 | 0.0 | −830 | 8 | −0.3 | 30.0 |
| 276 | 0.00013 | 0.0 | −839 | 8 | −0.3 | 30.0 |
| 277 | 0.00014 | 0.0 | −849 | 8 | −0.3 | 30.0 |
| 278 | 0.00016 | 0.0 | −858 | 8 | −0.3 | 30.0 |
| 279 | 0.00018 | 0.0 | −867 | 8 | −0.3 | 30.0 |
| 280 | 0.00020 | 0.0 | −877 | 8 | −0.3 | 30.0 |
| 281 | 0.00023 | 0.0 | −886 | 8 | −0.3 | 30.0 |
| 282 | 0.00026 | 0.0 | −895 | 8 | −0.2 | 30.0 |
| 283 | 0.00030 | 0.0 | −904 | 8 | −0.2 | 30.0 |
| 284 | 0.00034 | 0.0 | −913 | 8 | −0.2 | 30.0 |
| 285 | 0.00038 | 0.0 | −922 | 8 | −0.2 | 30.0 |
| 286 | 0.00043 | 0.0 | −930 | 8 | −0.2 | 30.0 |
| 287 | 0.00049 | 0.0 | −939 | 7 | −0.2 | 30.0 |
| 288 | 0.00056 | 0.0 | −947 | 7 | −0.2 | 30.0 |
| 289 | 0.00065 | 0.0 | −955 | 7 | −0.2 | 30.0 |
| 290 | 0.00074 | 0.0 | −963 | 7 | −0.1 | 30.0 |
| 291 | 0.00085 | 0.0 | −970 | 7 | −0.1 | 30.0 |
| 292 | 0.00097 | 0.0 | −977 | 6 | −0.1 | 30.0 |
| 293 | 0.00111 | 0.0 | −983 | 6 | −0.1 | 30.0 |
| 294 | 0.00128 | 0.0 | −989 | 6 | −0.0 | 30.0 |
| 295 | 0.00147 | 0.0 | −995 | 5 | −0.0 | 30.0 |
| 296 | 0.00169 | 0.0 | −999 | 5 | 0.0 | 30.0 |
| 297 | 0.00195 | 0.0 | −1003 | 4 | 0.1 | 30.0 |
| 298 | 0.00224 | 0.0 | −1006 | 3 | 0.1 | 30.0 |
| 299 | 0.00258 | 0.0 | −1008 | 3 | 0.2 | 30.0 |
| 300 | 0.00297 | 0.0 | −1008 | 2 | 0.2 | 30.0 |
| 301 | 0.00343 | 0.0 | −1007 | 1 | 0.3 | 30.0 |
| 302 | 0.00395 | 0.0 | −1004 | −1 | 0.4 | 30.0 |
| 303 | 0.00455 | 0.0 | −1000 | −2 | 0.5 | 30.0 |
| 304 | 0.00524 | 0.0 | −993 | −4 | 0.6 | 30.0 |
| 305 | 0.00603 | 0.0 | −983 | −5 | 0.7 | 30.0 |
| 306 | 0.00692 | 0.0 | −971 | −7 | 0.9 | 30.0 |
| 307 | 0.00793 | 0.0 | −955 | −9 | 1.0 | 30.0 |
| 308 | 0.00908 | 0.0 | −936 | −12 | 1.2 | 30.0 |
| 309 | 0.01036 | 0.0 | −913 | −14 | 1.3 | 30.0 |
| 310 | 0.01178 | 0.0 | −885 | −10 | 1.5 | 24.0 |
| 311 | 0.01334 | 0.0 | −860 | −12 | 1.4 | 19.2 |
| 312 | 0.01506 | 0.0 | −833 | −8 | 1.6 | 15.4 |
| 313 | 0.01693 | 0.0 | −807 | −10 | 1.5 | 12.3 |
| 314 | 0.01897 | 0.0 | −780 | −11 | 1.5 | 9.8 |
| 315 | 0.02117 | 0.0 | −752 | −13 | 1.4 | 9.5 |
| 316 | 0.02353 | 0.0 | −724 | −8 | 1.6 | 9.2 |
| 317 | 0.02606 | 0.0 | −697 | −10 | 1.6 | 9.0 |
| 318 | 0.02875 | 0.0 | −669 | −11 | 1.5 | 8.7 |
| 319 | 0.03159 | 0.0 | −640 | −13 | 1.5 | 8.4 |
| 320 | 0.03457 | 0.0 | −611 | −14 | 1.5 | 8.2 |
| 321 | 0.03767 | 0.0 | −581 | −9 | 1.6 | 7.9 |
| 322 | 0.04089 | 0.0 | −552 | −10 | 1.6 | 7.7 |
| 323 | 0.04419 | 0.0 | −524 | −11 | 1.6 | 7.5 |
| 324 | 0.04758 | 0.0 | −494 | −12 | 1.6 | 7.2 |
| 325 | 0.05101 | 0.0 | −465 | −13 | 1.6 | 7.0 |
| 326 | 0.05446 | 0.0 | −435 | −14 | 1.6 | 6.8 |
| 327 | 0.05790 | 0.0 | −405 | −15 | 1.6 | 6.1 |
| 328 | 0.06131 | 0.0 | −376 | −16 | 1.6 | 6.0 |
| 329 | 0.06464 | 0.0 | −346 | −16 | 1.6 | 6.0 |
| 330 | 0.06787 | 0.0 | −317 | −17 | 1.6 | 6.0 |
| 331 | 0.07097 | 0.0 | −289 | −17 | 1.5 | 6.0 |
| 332 | 0.07392 | 0.0 | −262 | −18 | 1.6 | 6.0 |
| 333 | 0.07670 | 0.0 | −234 | −18 | 1.7 | 6.0 |
| 334 | 0.07927 | 0.0 | −205 | −18 | 1.7 | 6.0 |
| 335 | 0.08160 | 0.0 | −178 | −18 | 1.7 | 6.0 |
| 336 | 0.08366 | 0.0 | −151 | −18 | 1.7 | 6.0 |
| 337 | 0.08546 | 0.0 | −126 | −17 | 1.6 | 6.0 |
| 338 | 0.08699 | 0.0 | −102 | −17 | 1.5 | 6.0 |
| 339 | 0.08825 | 0.0 | −81 | −17 | 1.4 | 6.0 |
| 340 | 0.08926 | 0.0 | −62 | −25 | 1.3 | 6.0 |
| 341 | 0.09004 | 0.0 | −44 | −23 | 1.2 | 6.0 |
| 342 | 0.09060 | 0.0 | −28 | −22 | 1.0 | 6.0 |
| 343 | 0.09096 | 0.0 | −16 | −21 | 0.8 | 6.0 |
| 344 | 0.09116 | 0.0 | −6 | −20 | 0.7 | 6.0 |
| 345 | 0.09124 | 0.0 | 1 | −19 | 0.5 | 6.0 |

We claim:

1. A method for controlling the acceleration of a vehicle reentering the sensible atmosphere, comprising executing a lofting translational rocket burn after achieving apogee and at an altitude of greater than about 40 km whereby the vehicle reenters the sensible atmosphere at a maximum accelerative force of less than 4 g.

2. The method of claim 1 further comprising executing a power dive rocket burn after entry of the vehicle into the sensible atmosphere.

3. The method of claim 1 or 2 wherein the lofting translational rocket burn is executed at an altitude of greater than about 50 km.

4. The method of claim 1 or 2 wherein the lofting translational rocket burn is initiated and completed at an altitude of greater than about 40 km.

5. The method of claim 3 wherein the lofting translational rocket burn is initiated and completed at an altitude of greater than about 50 km.

6. The method of claim 1 or 2 wherein the lofting translational rocket burn increases downrange velocity.

7. The method of claim 1 or 2 wherein the lofting translational rocket burn provides a positive increase in the amount of aerodynamic lift.

8. The method of claim 1 or 2 wherein the vehicle reenters the sensible atmosphere at a maximum accelerative force of less than 2 g.

9. A method for controlling the acceleration of a vehicle reentering the sensible atmosphere, comprising executing a power dive rocket burn after entry of the vehicle into the sensible atmosphere whereby the vehicle reenters the sensible atmosphere at a maximum accelerative force of less than 4 g.

10. The method of claim 9 wherein the vehicle reenters the sensible atmosphere at a maximum accelerative force of less than 2 g.

11. A method for increasing the acceleration of a vehicle reentering the sensible atmosphere, comprising initiating a downward translational rocket bum after achieving apogee and pore to reentering the sensible atmosphere so as to increase the maximum decelerative drag force imposed upon the vehicle during reentry.

12. A method for increasing the deceleration of a vehicle reentering the sensible atmosphere, comprising executing an upward translational rocket burn after reentering the sensible atmosphere so as to augment the decelerative drag force imposed upon the vehicle during reentry.

13. A method for extending the period of minimized dynamic pressure observed at apogee by a vehicle traveling proximate the edge of the sensible atmosphere, comprising executing a translational rocket burn through apogee wherein the thrust of the bum is sufficient to substantially counterbalance the downward accelerative force of gravity and thereby extend the period of minimized dynamic pressure observed at apogee.

* * * * *